US011463464B2

(12) United States Patent
Zadeh et al.

(10) Patent No.: US 11,463,464 B2
(45) Date of Patent: *Oct. 4, 2022

(54) ANOMALY DETECTION BASED ON CHANGES IN AN ENTITY RELATIONSHIP GRAPH

(71) Applicant: Splunk Inc., San Francisco, CA (US)

(72) Inventors: Joseph Auguste Zadeh, Sunnyvale, CA (US); Rodolfo Soto, Miramar, FL (US); George Apostolopoulos, San Jose, CA (US); John Clifton Pierce, San Jose, CA (US)

(73) Assignee: SPLUNK INC., San Francisco, CA (US)

(*) Notice: Subject to any disclaimer, the term of this patent is extended or adjusted under 35 U.S.C. 154(b) by 353 days.

This patent is subject to a terminal disclaimer.

(21) Appl. No.: 16/883,887

(22) Filed: May 26, 2020

(65) Prior Publication Data
US 2020/0287927 A1 Sep. 10, 2020

Related U.S. Application Data

(63) Continuation of application No. 16/250,989, filed on Jan. 17, 2019, now Pat. No. 10,693,900, which is a
(Continued)

(51) Int. Cl.
*H04L 29/06* (2006.01)
*H04L 9/40* (2022.01)
(Continued)

(52) U.S. Cl.
CPC ........ *H04L 63/1425* (2013.01); *H04L 43/045* (2013.01); *H04L 43/08* (2013.01);
(Continued)

(58) Field of Classification Search
CPC ... H04L 63/1425; H04L 43/045; H04L 43/08; H04L 61/103; H04L 61/15; H04L 67/30;
(Continued)

(56) References Cited

U.S. PATENT DOCUMENTS 7,686,214 B1 3/2010 Shao et al.
8,509,444 B2 8/2013 Nishimoto et al.
(Continued)

OTHER PUBLICATIONS

Advisory Action dated Aug. 2, 2016 for U.S. Appl. No. 14/929,203 of Muddu et al., filed Oct. 30, 2015.
(Continued)

*Primary Examiner* — Shin-Hon (Eric) Chen
(74) *Attorney, Agent, or Firm* — Perkins Coie LLP

(57) ABSTRACT

Techniques are described for analyzing data regarding activity in an IT environment to determine information regarding the entities associated with the activity and using the information to detect anomalous activity that may be indicative of malicious activity. In an embodiment, a plurality of events reflecting activity by a plurality of entities in an IT environment are processed to resolve the identities of the entities, discover how the entities fit within a topology of the IT environment, and determine what the entities are. This information is then used to generate an entity relationship graph that includes nodes representing the entities in the IT environment and edges connecting the nodes representing interaction relationships between the entities. In some embodiments, baselines are established by monitoring the activity between entities. This baseline information can be represented in the entity relationship graph in the form of directionality applied to the edges. The entity relationship graph can then be monitored to detect anomalous activity.

28 Claims, 28 Drawing Sheets

Related U.S. Application Data continuation of application No. 15/420,039, filed on Jan. 30, 2017, now Pat. No. 10,237,294.

(51) Int. Cl.
| | |
|---|---|
| *H04L 43/08* | (2022.01) |
| *H04L 43/045* | (2022.01) |
| *H04L 67/30* | (2022.01) |
| *H04L 61/45* | (2022.01) |
| *H04L 61/103* | (2022.01) |
| *H04L 61/5014* | (2022.01) |
| *H04L 43/106* | (2022.01) |
| *H04L 41/12* | (2022.01) |
| *H04L 61/5007* | (2022.01) |
| *H04L 101/622* | (2022.01) |

(52) U.S. Cl.
CPC ............ *H04L 61/103* (2013.01); *H04L 61/15* (2013.01); *H04L 67/30* (2013.01); *H04L 41/12* (2013.01); *H04L 43/106* (2013.01); *H04L 61/2007* (2013.01); *H04L 61/2015* (2013.01); *H04L 61/6022* (2013.01)

(58) Field of Classification Search
CPC ... H04L 41/12; H04L 43/106; H04L 61/2007; H04L 61/2015; H04L 61/6022
See application file for complete search history.

(56) References Cited

U.S. PATENT DOCUMENTS

| | | | |
|---|---|---|---|
| 9,031,382 B1 | 5/2015 | Kaiser et al. | |
| 9,231,962 B1 | 1/2016 | Yen et al. | |
| 9,407,652 B1* | 8/2016 | Kesin ................. | H04L 61/2007 |
| 9,729,549 B2* | 8/2017 | Davis ..................... | H04L 67/22 |
| 9,860,257 B1 | 1/2018 | Kumar et al. | |
| 2003/0231647 A1 | 12/2003 | Petrovykh | |
| 2005/0080806 A1 | 4/2005 | Doganata et al. | |
| 2006/0248096 A1 | 11/2006 | Adam | |
| 2006/0288415 A1 | 12/2006 | Wong | |
| 2007/0073519 A1 | 3/2007 | Long | |
| 2008/0060058 A1 | 3/2008 | Shea et al. | |
| 2008/0147841 A1 | 6/2008 | Nishino et al. | |
| 2008/0155335 A1 | 6/2008 | Klein et al. | |
| 2008/0183704 A1 | 7/2008 | Miller et al. | |
| 2008/0209517 A1 | 8/2008 | Nightingale et al. | |
| 2009/0254970 A1 | 10/2009 | Agarwal et al. | |
| 2010/0223244 A1 | 9/2010 | Sinha et al. | |
| 2011/0246669 A1 | 10/2011 | Kanada et al. | |
| 2012/0089980 A1 | 4/2012 | Sharp et al. | |
| 2012/0117009 A1 | 5/2012 | Dutt et al. | |
| 2012/0266209 A1 | 10/2012 | Gooding et al. | |
| 2013/0055399 A1 | 2/2013 | Zaitsev | |
| 2013/0133052 A1* | 5/2013 | Davis ................. | H04L 63/0861 726/7 |
| 2013/0191887 A1* | 7/2013 | Davis ..................... | H04L 63/08 726/5 |
| 2013/0318603 A1 | 11/2013 | Merza | |
| 2014/0188779 A1 | 7/2014 | Sakuraba | |
| 2015/0047026 A1 | 2/2015 | Neil et al. | |
| 2015/0081431 A1 | 3/2015 | Akahoshi et al. | |
| 2015/0095338 A1 | 4/2015 | Baggott et al. | |
| 2015/0220529 A1 | 8/2015 | Eltabakh et al. | |
| 2015/0229662 A1* | 8/2015 | Hitt ..................... | H04L 63/1425 726/23 |
| 2015/0256413 A1* | 9/2015 | Du ......................... | H04L 41/12 370/242 |
| 2016/0132877 A1 | 5/2016 | Carrott | |
| 2016/0162582 A1 | 6/2016 | Chatterjee et al. | |
| 2016/0219066 A1 | 7/2016 | Vasseur et al. | |
| 2016/0253232 A1 | 9/2016 | Puri et al. | |
| 2016/0359872 A1* | 12/2016 | Yadav ................. | H04L 63/1408 |
| 2017/0048270 A1 | 2/2017 | Boyadjiev et al. | |
| 2017/0063904 A1 | 3/2017 | Tryfonas et al. | |
| 2017/0063910 A1* | 3/2017 | Muddu ............... | G06F 3/04842 |
| 2017/0063912 A1 | 3/2017 | Tryfonas et al. | |
| 2017/0126712 A1 | 5/2017 | Crabtree et al. | |
| 2017/0279844 A1* | 9/2017 | Bower, III .......... | H04L 63/1441 |
| 2017/0288979 A1 | 10/2017 | Yoshihira et al. | |
| 2017/0295193 A1* | 10/2017 | Yang ...................... | H04L 69/22 |
| 2017/0324759 A1* | 11/2017 | Puri ..................... | H04L 63/1425 |
| 2018/0027006 A1* | 1/2018 | Zimmermann ..... | H04L 63/0227 726/11 |
| 2018/0069888 A1 | 3/2018 | Muddu et al. | |
| 2018/0146000 A1 | 5/2018 | Muddu et al. | |
| 2018/0219897 A1 | 8/2018 | Muddu et al. | |
| 2019/0364060 A1 | 11/2019 | Muddu et al. | |

OTHER PUBLICATIONS

Advisory Action dated May 1, 2018 for U.S. Appl. No. 14/929,187 of Muddu et al., filed Oct. 30, 2015.
Final Office Action dated Feb. 12, 2018 for U.S. Appl. No. 14/929,187 of Muddu et al., filed Oct. 30, 2015.
Notice of Allowance dated May 28, 2019 for U.S. Appl. No. 15/926,961 of Muddu et al., filed Mar. 20, 2018.
Final Office Action dated May 5, 2016, U.S. Appl. No. 14/929,203 of Muddu, S. et al. filed Oct. 30, 2015.
Final Office Action dated Nov. 30, 2018 for U.S. Appl. No. 15/800,010 of Muddu et al., filed Oct. 31, 2017.
Non-Final Office Action dated Aug. 10, 2018 for U.S. Appl. No. 15/800,010 of Muddu et al., filed Oct. 31 ,2017.
Non-Final Office Action dated Aug. 22, 2016 of U.S. Appl. No. 14/929,203 of Muddu et al., filed Oct. 30, 2015.
Non-Final Office Action dated Jan. 7, 2016, U.S. Appl. No. 14/929,203 of Muddu, S. et al., filed Oct. 30, 2015.
Non-Final Office Action dated Jul. 28, 2017 for U.S. Appl. No. 14/929,187 of Muddu et al., filed Oct. 30, 2015.
Non-Final Office Action dated May 19, 2017, U.S. Appl. No. 14/928,985 of Muddu et al., filed Oct. 30, 2015.
Non-Final Office Action dated Nov. 24, 2017 for U.S. Appl. No. 15/418,546 of Muddu et al., filed Jan. 27, 2017.
Non-Final Office Action dated Jan. 11, 2019 for U.S. Appl. No. 15/860,049 of Muddu et al., filed Jan. 2, 2018.
Non-Final Office Action dated Jan. 11, 2019 for U.S. Appl. No. 15/926,961 of Muddu et al., filed Mar. 20, 2018.
Non-Final Office Action dated Sep. 17, 2019 for U.S. Appl. No. 16/250,989 of Zadeh et al., filed Jan. 17, 2019.
Notice of Allowance dated Apr. 18, 2018 for U.S. Appl. No. 15/418,546 of Muddu et al., filed Jan. 27, 2017.
Notice of Allowance dated Aug. 17, 2017, for U.S. Appl. No. 14/928,985 of Muddu et al., filed Oct. 30, 2015.
Notice of Allowance dated Aug. 8, 2018 for U.S. Appl. No. 15/418,546 of Muddu et al., filed Jan. 27, 2017.
Notice of Allowance dated Feb. 6, 2019 for U.S. Appl. No. 15/800,010 of Muddu et al., filed Oct. 31, 2017.
Notice of Allowance dated Jan. 31, 2020 for U.S. Appl. No. 16/250,989 of Zadeh et al., filed Jan. 17, 2019.
Notice of Allowance dated Jan. 6, 2017 for U.S. Appl. No. 14/929,203 of Muddu et al., filed Oct. 30, 2015.
Notice of Allowance dated Nov. 5, 2018 for U.S. Appl. No. 15/420,039 of Zadeh et al., filed Jan. 30, 2017.
Notice of Allowance dated May 8, 2019 for U.S. Appl. No. 15/860,049 of Muddu et al., filed Jan. 2, 2018.
Palantir Technologies, "Product Brochure for Palantir Cyber," 9 pages, 2013.

* cited by examiner

FIG. 6A

| Data Summary | | |
|---|---|---|
| Hosts (5) | Sources (8) | Sourcetypes (3) | filter

| Host ◊ | | Count ◊ | Last Update ◊ |
|---|---|---|---|
| mailsv | ul ˅ | 9,829 | 4/29/14 1:32:47.000 PM |
| vendor_sales | ul ˅ | 30,244 | 4/29/14 1:32:46.000 PM |
| www1 | ul ˅ | 24,221 | 4/29/14 1:32:44.000 PM |
| www2 | ul ˅ | 22,595 | 4/29/14 1:32:47.000 PM |
| www3 | ul ˅ | 22,975 | 4/29/14 1:32:45.000 PM |

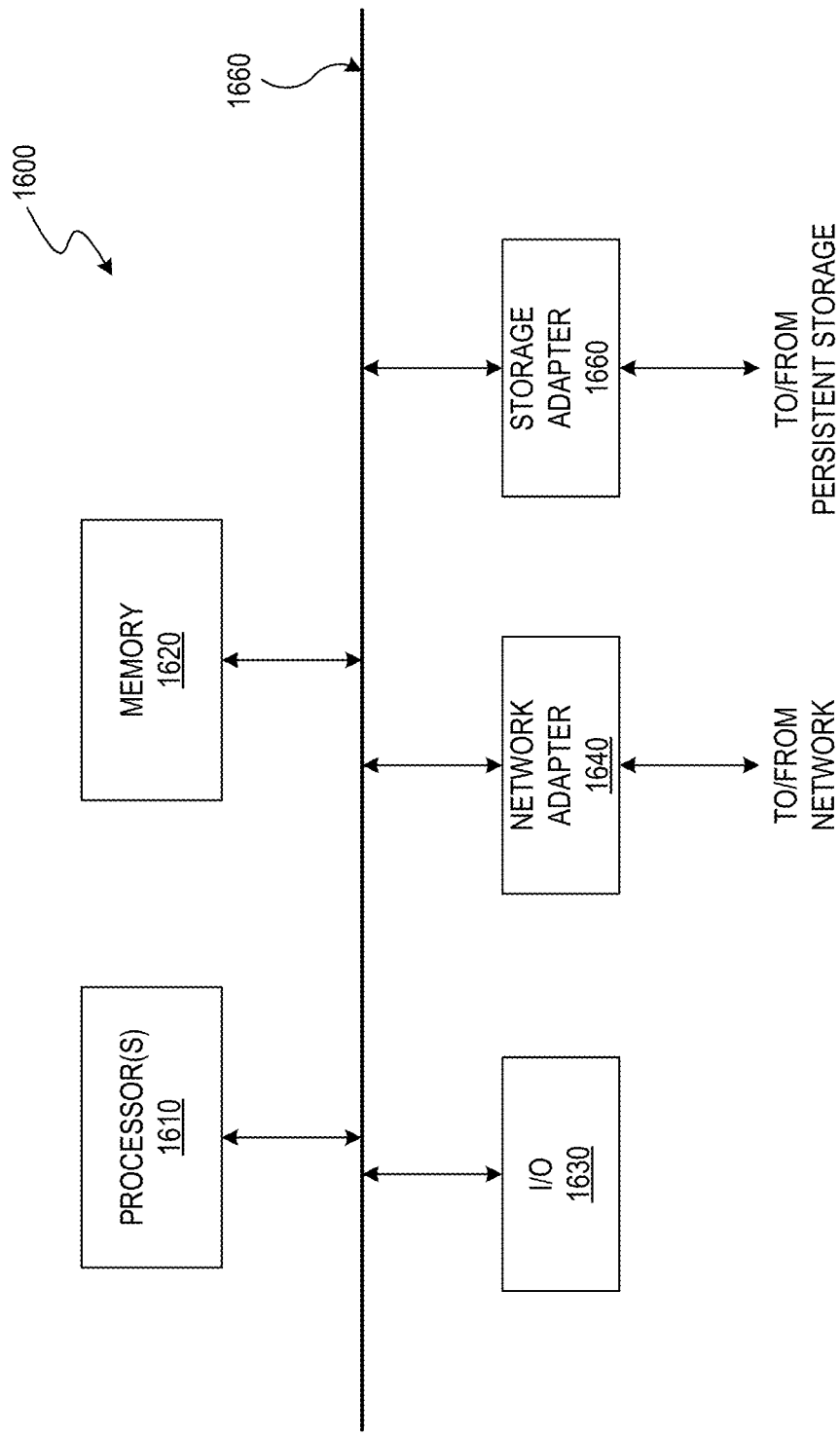

FIG. 22

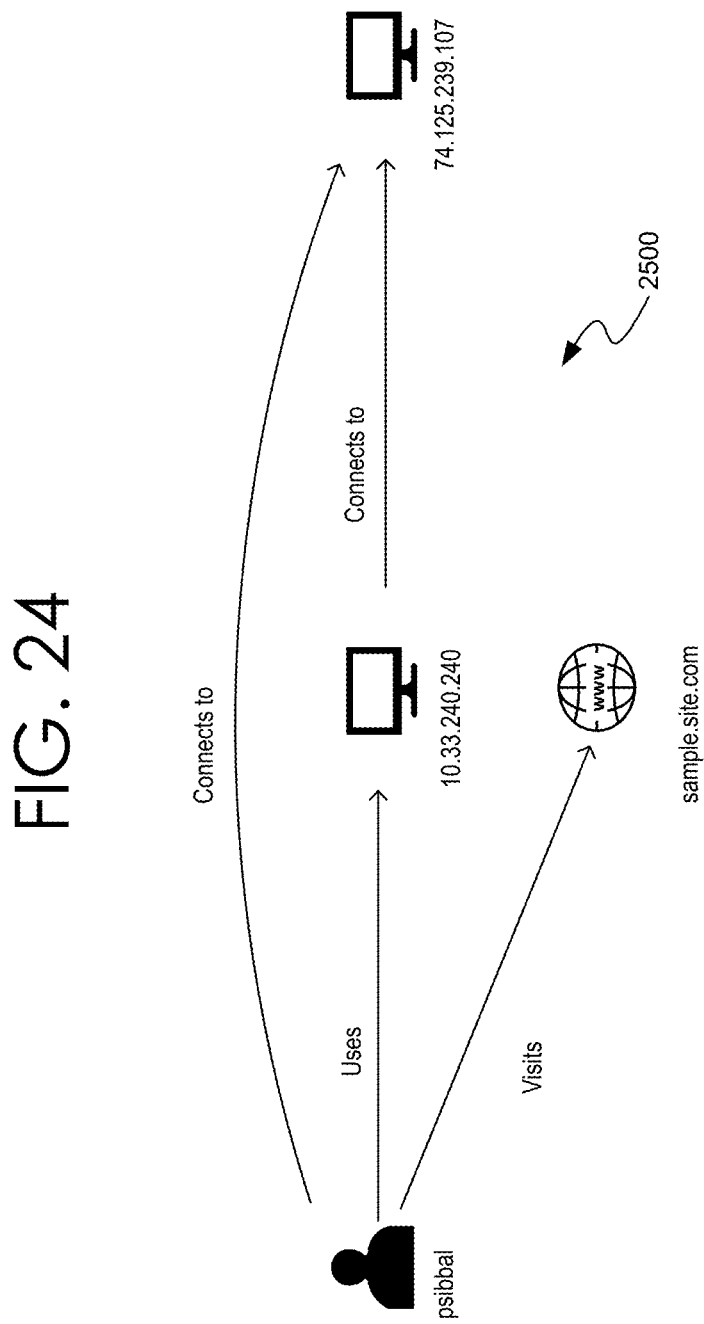

ANOMALY DETECTION BASED ON CHANGES IN AN ENTITY RELATIONSHIP GRAPH

CROSS-REFERENCE TO RELATED APPLICATION

This application is a continuation of U.S. patent application Ser. No. 16/250,989 filed on Jan. 17, 2019, and titled "ANOMALY DETECTION BASED ON INFORMATION TECHNOLOGY ENVIRONMENT TOPOLOGY", which is a continuation of U.S. patent application Ser. No. 15/420,039 filed on Jan. 30, 2017, issued as U.S. Pat. No. 10,237,294, and titled "FINGERPRINTING ENTITIES BASED ON ACTIVITY IN AN INFORMATION TECHNOLOGY ENVIRONMENT", which are each incorporated by reference herein in their entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

At least one embodiment of the present disclosure pertains to distributed data processing systems, and more particularly, to intelligence generation and activity discovery from events in a distributed data processing system.

BACKGROUND

Activity detection, both friendly and malicious, has long been a priority for computer network administrators. In known public and private computer networks, users employ devices such as desktop computers, laptop computers, tablets, smartphones, browsers, etc. to interact with others through computers and servers that are coupled to the network. Digital data, typically in the form of data packets, are passed along the network by interconnected network devices.

Unfortunately, however, malicious activities can cause harm to the network's software or hardware, or its users. Malicious activities may include unauthorized access or subsequent unpermitted use of network resources and data. Network administrators seek to detect such activities, for example, by searching for patterns of behavior that are abnormal or otherwise vary from the expected use pattern of a particular entity, such as an organization or subset thereof, individual user, IP address, node or group of nodes in the network, etc.

Security appliances are used in known systems to provide network security. The appliance approach involves installing security appliances (which are typically servers or computers configured for providing security) at one or more locations in the network. Once installed, the appliance monitors traffic that traverses the network. Functions provided by the appliance may include malware detection, intrusion detection, unauthorized access or unauthorized use of data, among others. Unfortunately, security appliances cannot easily be scaled to handle temporary or permanent increases in network traffic. Increased network traffic often requires a security vendor to perform an appliance swap or an equally time-consuming appliance upgrade. Appliances also tend to have only limited network visibility because they are typically configured to monitor data traversing the link on which a respective appliance is installed only. Such an appliance will be unaware of activities occurring on other network segments monitored by other appliances and thus cannot use the additional context information pertaining to activities occurring on other network segments to detect a cleverly-designed piece of malware that may be difficult to detect from purely localized information.

Installed software products, rather than security hardware appliances, provide another approach to security for data networks. These products, such as anti-virus or anti-malware software, typically are installed on terminal devices (e.g., desktop and laptop computers, tablets, or smart phones). Data traversing the network between the terminal device is monitored by the installed products to detect malware in either inbound or outbound data. Unfortunately, installed software products also do not perform well in terms of scalability or network visibility. Installed products tend to be disposed locally on the terminal devices and thus also tend to have fairly localized views of the data on the network. They also tend to be installed on hardware that cannot be upgraded easily.

BRIEF DESCRIPTION OF THE DRAWINGS

In the drawings:

FIG. 6A illustrates a search screen in accordance with the disclosed embodiments;

FIG. 6B illustrates a data summary dialog that enables a user to select various data sources in accordance with the disclosed embodiments;

FIG. 15B illustrates an incident review dashboard in accordance with the disclosed embodiments;

FIG. 16 shows high-level example of a hardware architecture of a processing system that can be used to implement the disclosed techniques;

FIG. 22 shows yet another example workflow for entity identity resolution;

FIG. 24 shows an example event including raw machine data reflecting activity in an IT environment;

FIG. 25 shows an example event-specific relationship graph based on the event shown in FIG. 24;

DETAILED DESCRIPTION

Figure 1:
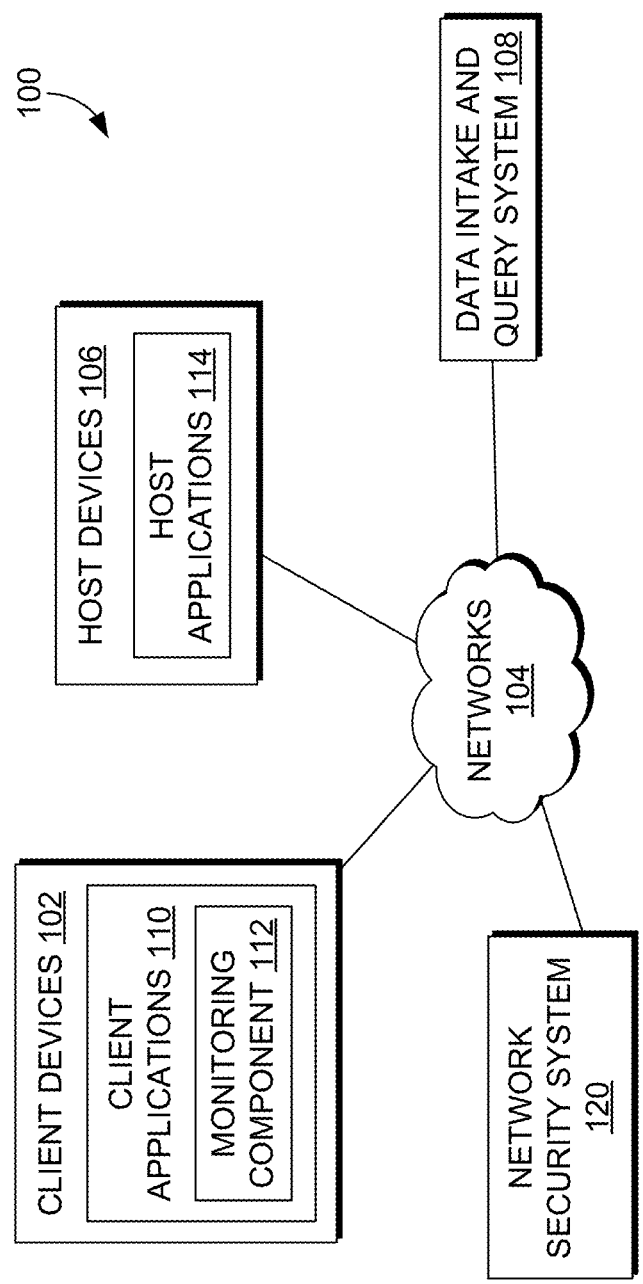
FIG. 1 illustrates a networked computer environment in which an embodiment may be implemented.

Embodiments are described herein according to the following outline:
1.0. GENERAL OVERVIEW
  1.1. ENTITY FINGERPRINTING OVERVIEW
2.0. OPERATING ENVIRONMENT
  2.1. HOST DEVICES
  2.2. CLIENT DEVICES
  2.3. CLIENT DEVICE APPLICATIONS
  2.4. DATA SERVER SYSTEM
  2.5. DATA INGESTION
    2.5.1. INPUT
    2.5.2. PARSING
    2.5.3. INDEXING
  2.6. QUERY PROCESSING
  2.7 FIELD EXTRACTION
  2.8. EXAMPLE SEARCH SCREEN
  2.9. DATA MODELS
  2.10. ACCELERATION TECHNIQUES
    2.10.1. AGGREGATION TECHNIQUE
    2.10.2. KEYWORD INDEX
    2.10.3. HIGH PERFORMANCE ANALYTICS STORE
    2.10.4. ACCELERATING REPORT GENERATION
  2.11. CLOUD-BASED SYSTEM OVERVIEW
  2.12. SEARCHING EXTERNALLY ARCHIVED DATA
    2.12.1. ERP PROCESS FEATURES
  2.13. SECURITY FEATURES
    2.13.1 SECURITY SYSTEM
    2.13.2 ENTERPRISE SECURITY APPLICATION
    2.13.3. IT SERVICE MONITORING
  2.14. COMPUTER PROCESSING SYSTEMS
3.0 ENTITY FINGERPRINTING
  3.1 IDENTITY RESOLUTION
  3.2 TOPOLOGY DISCOVERY
  3.3 BEHAVIORAL PROFILING
  3.4 CLIENT/SERVER RELATIONSHIP DISCOVERY
  3.5 MONITORING AN ENTITY RELATIONSHIP GRAPH 1.0. General Overview Modern data centers and other computing environments can comprise anywhere from a few host computer systems to thousands of systems configured to process data, service requests from remote clients, and perform numerous other computational tasks. During operation, various components within these computing environments often generate significant volumes of machine-generated data. For example, machine data is generated by various components in the information technology (IT) environments, such as servers, sensors, routers, mobile devices, Internet of Things (IoT) devices, etc. Machine-generated data can include system logs, network packet data, sensor data, application program data, error logs, stack traces, system performance data, etc. In general, machine-generated data can also include performance data, diagnostic information, and many other types of data that can be analyzed to diagnose performance problems, monitor user interactions, and to derive other insights.

A number of tools are available to analyze machine data, that is, machine-generated data. In order to reduce the size of the potentially vast amount of machine data that may be generated, many of these tools typically pre-process the data based on anticipated data-analysis needs. For example, pre-specified data items may be extracted from the machine data and stored in a database to facilitate efficient retrieval and analysis of those data items at search time. However, the rest of the machine data typically is not saved and discarded during pre-processing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time can provide greater flexibility because it enables an analyst to search all of the machine data, instead of searching only a pre-specified set of data items. This may enable an analyst to investigate different aspects of the machine data that previously were unavailable for analysis.

However, analyzing and searching massive quantities of machine data presents a number of challenges. For example, a data center, servers, or network appliances may generate many different types and formats of machine data (e.g., system logs, network packet data (e.g., wire data, etc.), sensor data, application program data, error logs, stack traces, system performance data, operating system data, virtualization data, etc.) from thousands of different components, which can collectively be very time-consuming to analyze. These components may also be referred to herein as entities. In another example, mobile devices may generate large amounts of information relating to data accesses, application performance, operating system performance, network performance, etc. There can be millions of mobile devices that report these types of information.

These challenges can be addressed by using an event-based data intake and query system, such as the SPLUNK® ENTERPRISE system developed by Splunk Inc. of San Francisco, Calif. The SPLUNK® ENTERPRISE system is the leading platform for providing real-time operational intelligence that enables organizations to collect, index, and search machine-generated data from various websites, applications, servers, networks, and mobile devices that power their businesses. The SPLUNK® ENTERPRISE system is particularly useful for analyzing data which is commonly found in system log files, network data, and other data input sources. Although many of the techniques described herein are explained with reference to a data intake and query system similar to the SPLUNK® ENTERPRISE system, these techniques are also applicable to other types of data systems.

In the SPLUNK® ENTERPRISE system, machine-generated data are collected and stored as "events". An event comprises a portion of the machine-generated data and is associated with a specific point in time. For example, events may be derived from "time series data," where the time series data comprises a sequence of data points (e.g., performance measurements from a computer system, etc.) that are associated with successive points in time. In general, each event can be associated with a timestamp that is derived from the raw data in the event, determined through interpolation between temporally proximate events having known timestamps, or determined based on other configurable rules for associating timestamps with events, etc.

In some instances, machine data can have a predefined format, where data items with specific data formats are stored at predefined locations in the data. For example, the machine data may include data stored as fields in a database table. In other instances, machine data may not have a predefined format, that is, the data is not at fixed, predefined locations, but the data does have repeatable patterns and is not random. This means that some machine data can comprise various data items of different data types and that may be stored at different locations within the data. For example, when the data source is an operating system log, an event can include one or more lines from the operating system log containing raw data that includes different types of performance and diagnostic information associated with a specific point in time.

Examples of components which may generate machine data from which events can be derived include, but are not limited to, web servers, application servers, databases, firewalls, routers, operating systems, and software applications that execute on computer systems, mobile devices, sensors, Internet of Things (IoT) devices, etc. The data generated by such data sources can include, for example and without limitation, server log files, activity log files, configuration files, messages, network packet data, performance measurements, sensor measurements, etc.

The SPLUNK® ENTERPRISE system uses flexible schema to specify how to extract information from the event data. A flexible schema may be developed and redefined as needed. Note that a flexible schema may be applied to event data "on the fly," when it is needed (e.g., at search time, index time, ingestion time, etc.). When the schema is not applied to event data until search time it may be referred to as a "late-binding schema."

During operation, the SPLUNK® ENTERPRISE system starts with raw input data (e.g., one or more system logs, streams of network packet data, sensor data, application program data, error logs, stack traces, system performance data, etc.). The system divides this raw data into blocks (e.g., buckets of data, each associated with a specific time frame, etc.), and parses the raw data to produce timestamped events. The system stores the timestamped events in a data store. The system enables users to run queries against the stored data to, for example, retrieve events that meet criteria specified in a query, such as containing certain keywords or having specific values in defined fields. As used herein throughout, data that is part of an event is referred to as "event data". In this context, the term "field" refers to a location in the event data containing one or more values for a specific data item. As will be described in more detail herein, the fields are defined by extraction rules (e.g., regular expressions) that derive one or more values from the portion of raw machine data in each event that has a particular field specified by an extraction rule. The set of values so produced are semantically-related (such as IP address), even though the raw machine data in each event may be in different formats (e.g., semantically-related values may be in different positions in the events derived from different sources).

As noted above, the SPLUNK® ENTERPRISE system utilizes a late-binding schema to event data while performing queries on events. One aspect of a late-binding schema is applying "extraction rules" to event data to extract values for specific fields during search time. More specifically, the extraction rules for a field can include one or more instructions that specify how to extract a value for the field from the event data. An extraction rule can generally include any type of instruction for extracting values from data in events. In some cases, an extraction rule comprises a regular expression where a sequence of characters form a search pattern, in which case the rule is referred to as a "regex rule." The system applies the regex rule to the event data to extract values for associated fields in the event data by searching the event data for the sequence of characters defined in the regex rule.

In the SPLUNK® ENTERPRISE system, a field extractor may be configured to automatically generate extraction rules for certain field values in the events when the events are being created, indexed, or stored, or possibly at a later time. Alternatively, a user may manually define extraction rules for fields using a variety of techniques. In contrast to a conventional schema for a database system, a late-binding schema is not defined at data ingestion time. Instead, the late-binding schema can be developed on an ongoing basis until the time a query is actually executed. This means that extraction rules for the fields in a query may be provided in the query itself, or may be located during execution of the query. Hence, as a user learns more about the data in the events, the user can continue to refine the late-binding schema by adding new fields, deleting fields, or modifying the field extraction rules for use the next time the schema is used by the system. Because the SPLUNK® ENTERPRISE system maintains the underlying raw data and uses late-binding schema for searching the raw data, it enables a user to continue investigating and learn valuable insights about the raw data.

In some embodiments, a common field name may be used to reference two or more fields containing equivalent data items, even though the fields may be associated with different types of events that possibly have different data formats and different extraction rules. By enabling a common field name to be used to identify equivalent fields from different types of events generated by disparate data sources, the system facilitates use of a "common information model" (CIM) across the disparate data sources (further discussed with respect to FIG. 5).

1.1. Entity Fingerprinting Overview

Modern information technology (IT) environments can include hundreds and perhaps thousands of entities (e.g., devices, users, applications, data, etc.) communicating with each other. This can present a number of challenges related to asset inventory and management which can directly impact network security. For example, many larger organizations face the issue of shadow IT. Shadow IT refers to situations where information technology systems and solutions are built and used inside organizations without explicit organizational approval. The larger and more complex the IT environment (e.g., more devices and users) the greater the challenge of shadow IT.

Consider, for example, a IT environment for a large-scale healthcare organization such as a hospital. Increasingly, assets such as biomedical devices are configured to connect to the local networks in such environments, and by extension to other entities outside of the managed local network. In many cases, the users of such devices connect the devices without organizational approval or actively try to skirt certain controls to make their lives easier. This can, in part, lead to the issue of shadow IT. The hospital's network now has a number of devices connected that may or may not conform with organization standards. As mentioned, this not only affects inventory and management of assets, but in some cases can expose the organization network to external attacks.

Introduced herein are techniques for addressing these challenges that include, among other things, analyzing data (e.g. events) reflecting activity in an IT environment to identify entities associated with the activity, determining information about the entities, and discovering how the entities are arranged within a logical structure (i.e. topology) of the IT environment in which they are operating. Once entities are profiled and the topology of the IT environment is discovered, this information can be modeled and used to detect anomalous communications activity within the IT environment.

2.0. Operating Environment

FIG. 1 illustrates a networked computer system 100 in which an embodiment may be implemented. Those skilled in the art would understand that FIG. 1 represents one example of a networked computer system and other embodiments may use different arrangements.

The networked computer system 100 comprises one or more computing devices. These one or more computing devices comprise any combination of hardware and software configured to implement the various logical components described herein. For example, the one or more computing devices may include one or more memories that store instructions for implementing the various components described herein, one or more hardware processors configured to execute the instructions stored in the one or more memories, and various data repositories in the one or more memories for storing data structures utilized and manipulated by the various components.

In an embodiment, one or more client devices 102 are coupled to one or more host devices 106 and a data intake and query system 108 via one or more networks 104. Networks 104 broadly represent one or more LANs, WANs, cellular networks (e.g., LTE, HSPA, 3G, and other cellular technologies), and/or networks using any of wired, wireless, terrestrial microwave, or satellite links, and may include the public Internet.

2.1. Host Devices

In the illustrated embodiment, a system 100 includes one or more host devices 106. Host devices 106 may broadly include any number of computers, virtual machine instances, and/or data centers that are configured to host or execute one or more instances of host applications 114. In general, a host device 106 may be involved, directly or indirectly, in processing requests received from client devices 102. Each host device 106 may comprise, for example, one or more of a network device, a web server, an application server, a database server, etc. A collection of host devices 106 may be configured to implement a network-based service. For example, a provider of a network-based service may configure one or more host devices 106 and host applications 114 (e.g., one or more web servers, application servers, database servers, etc.) to collectively implement the network-based application.

In general, client devices 102 communicate with one or more host applications 114 to exchange information. The communication between a client device 102 and a host application 114 may, for example, be based on the Hypertext Transfer Protocol (HTTP) or any other network protocol. Content delivered from the host application 114 to a client device 102 may include, for example, HTML documents, media content, etc. The communication between a client device 102 and host application 114 may include sending various requests and receiving data packets. For example, in general, a client device 102 or application running on a client device may initiate communication with a host application 114 by making a request for a specific resource (e.g., based on an HTTP request), and the application server may respond with the requested content stored in one or more response packets.

In the illustrated embodiment, one or more of host applications 114 may generate various types of performance data during operation, including event logs, network data, sensor data, and other types of machine-generated data. For example, a host application 114 comprising a web server may generate one or more web server logs in which details of interactions between the web server and any number of client devices 102 is recorded. As another example, a host device 106 comprising a router may generate one or more router logs that record information related to network traffic managed by the router. As yet another example, a host application 114 comprising a database server may generate one or more logs that record information related to requests sent from other host applications 114 (e.g., web servers or application servers) for data managed by the database server.

2.2. Client Devices

Client devices 102 of FIG. 1 represent any computing device capable of interacting with one or more host devices 106 via a network 104. Examples of client devices 102 may include, without limitation, smart phones, tablet computers, handheld computers, wearable devices, laptop computers, desktop computers, servers, portable media players, gaming devices, and so forth. In general, a client device 102 can provide access to different content, for instance, content provided by one or more host devices 106, etc. Each client device 102 may comprise one or more client applications 110, described in more detail in a separate section hereinafter.

2.3. Client Device Applications

In an embodiment, each client device 102 may host or execute one or more client applications 110 that are capable of interacting with one or more host devices 106 via one or more networks 104. For instance, a client application 110 may be or comprise a web browser that a user may use to navigate to one or more websites or other resources provided by one or more host devices 106. As another example, a client application 110 may comprise a mobile application or "app." For example, an operator of a network-based service hosted by one or more host devices 106 may make available one or more mobile apps that enable users of client devices 102 to access various resources of the network-based service. As yet another example, client applications 110 may include background processes that perform various operations without direct interaction from a user. A client application 110 may include a "plug-in" or "extension" to another application, such as a web browser plug-in or extension.

In an embodiment, a client application 110 may include a monitoring component 112. At a high level, the monitoring component 112 comprises a software component or other logic that facilitates generating performance data related to a client device's operating state, including monitoring network traffic sent and received from the client device and collecting other device and/or application-specific information. Monitoring component 112 may be an integrated component of a client application 110, a plug-in, an extension, or any other type of add-on component. Monitoring component 112 may also be a stand-alone process.

In one embodiment, a monitoring component 112 may be created when a client application 110 is developed, for example, by an application developer using a software development kit (SDK). The SDK may include custom monitoring code that can be incorporated into the code implementing a client application 110. When the code is converted to an executable application, the custom code implementing the monitoring functionality can become part of the application itself.

In some cases, an SDK or other code for implementing the monitoring functionality may be offered by a provider of a data intake and query system, such as a system 108. In such cases, the provider of the system 108 can implement the custom code so that performance data generated by the monitoring functionality is sent to the system 108 to facilitate analysis of the performance data by a developer of the client application or other users.

In an embodiment, the custom monitoring code may be incorporated into the code of a client application 110 in a number of different ways, such as the insertion of one or more lines in the client application code that call or otherwise invoke the monitoring component 112. As such, a developer of a client application 110 can add one or more lines of code into the client application 110 to trigger the monitoring component 112 at desired points during execution of the application. Code that triggers the monitoring component may be referred to as a monitor trigger. For instance, a monitor trigger may be included at or near the beginning of the executable code of the client application 110 such that the monitoring component 112 is initiated or triggered as the application is launched, or included at other points in the code that correspond to various actions of the client application, such as sending a network request or displaying a particular interface.

In an embodiment, the monitoring component 112 may monitor one or more aspects of network traffic sent and/or received by a client application 110. For example, the monitoring component 112 may be configured to monitor data packets transmitted to and/or from one or more host applications 114. Incoming and/or outgoing data packets can be read or examined to identify network data contained within the packets, for example, and other aspects of data packets can be analyzed to determine a number of network performance statistics. Monitoring network traffic may enable information to be gathered particular to the network performance associated with a client application 110 or set of applications.

In an embodiment, network performance data refers to any type of data that indicates information about the network and/or network performance. Network performance data may include, for instance, a URL requested, a connection type (e.g., HTTP, HTTPS, etc.), a connection start time, a connection end time, an HTTP status code, request length, response length, request headers, response headers, connection status (e.g., completion, response time(s), failure, etc.), and the like. Upon obtaining network performance data indicating performance of the network, the network performance data can be transmitted to a data intake and query system 108 for analysis.

Upon developing a client application 110 that incorporates a monitoring component 112, the client application 110 can be distributed to client devices 102. Applications generally can be distributed to client devices 102 in any manner, or they can be pre-loaded. In some cases, the application may be distributed to a client device 102 via an application marketplace or other application distribution system. For instance, an application marketplace or other application distribution system might distribute the application to a client device based on a request from the client device to download the application.

Examples of functionality that enables monitoring performance of a client device are described in U.S. Pat. No. 9,838,292, entitled "UTILIZING PACKET HEADERS TO MONITOR NETWORK TRAFFIC IN ASSOCIATION WITH A CLIENT DEVICE", which is hereby incorporated by reference in its entirety for all purposes.

In an embodiment, the monitoring component 112 may also monitor and collect performance data related to one or more aspects of the operational state of a client application 110 and/or client device 102. For example, a monitoring component 112 may be configured to collect device performance information by monitoring one or more client device operations, or by making calls to an operating system and/or one or more other applications executing on a client device 102 for performance information. Device performance information may include, for instance, a current wireless signal strength of the device, a current connection type and network carrier, current memory performance information, a geographic location of the device, a device orientation, and any other information related to the operational state of the client device.

In an embodiment, the monitoring component 112 may also monitor and collect other device profile information including, for example, a type of client device, a manufacturer and model of the device, versions of various software applications installed on the device, and so forth.

In general, a monitoring component 112 may be configured to generate performance data in response to a monitor trigger in the code of a client application 110 or other triggering application event, as described above, and to store the performance data in one or more data records. Each data record, for example, may include a collection of field-value pairs, each field-value pair storing a particular item of performance data in association with a field for the item. For example, a data record generated by a monitoring component 112 may include a "networkLatency" field (not shown in the Figure) in which a value is stored. This field indicates a network latency measurement associated with one or more network requests. The data record may include a "state" field to store a value indicating a state of a network connection, and so forth for any number of aspects of collected performance data.

2.4. Data Server System

Figure 2:
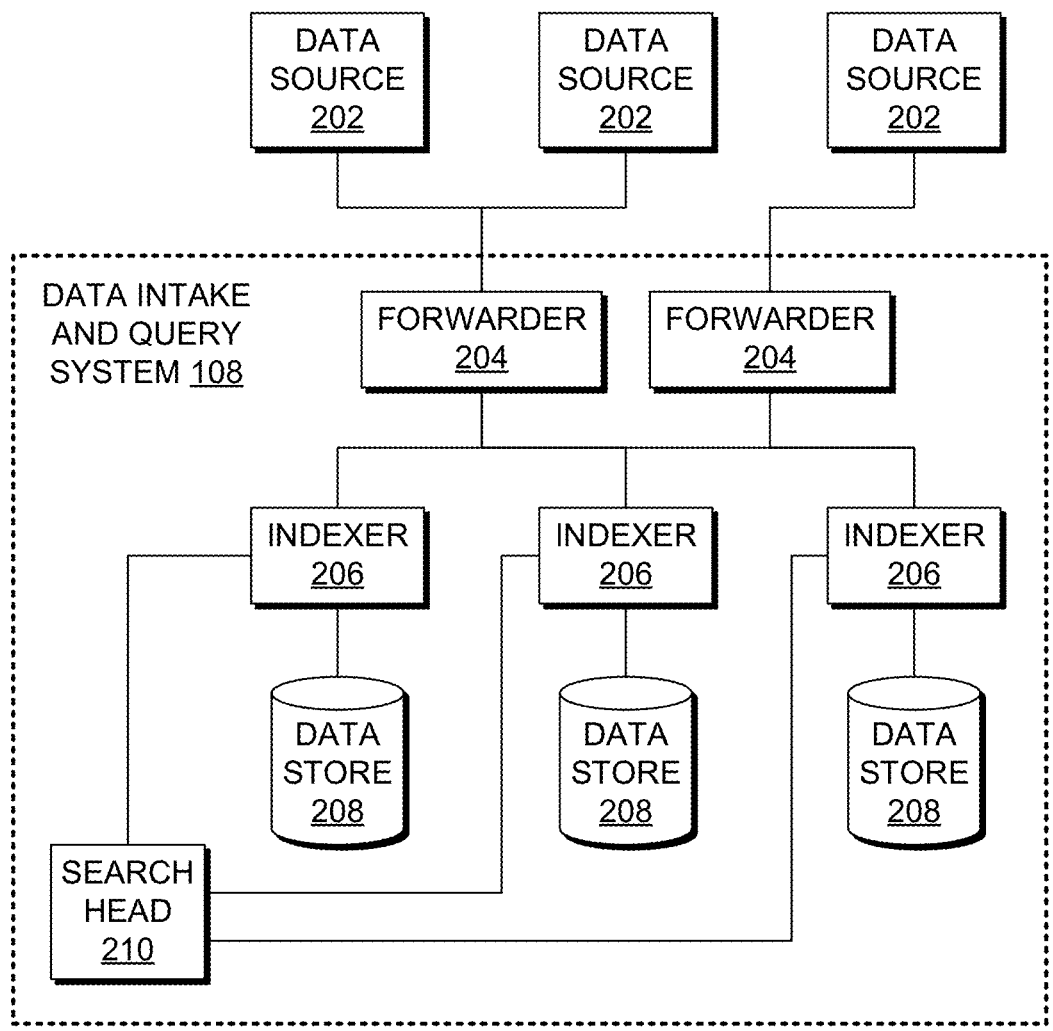
FIG. 2 illustrates a block diagram of an example data intake and query system in which an embodiment may be implemented.

FIG. 2 depicts a block diagram of an exemplary data intake and query system 108, similar to the SPLUNK® ENTERPRISE system. System 108 includes one or more forwarders 204 that receive data from a variety of input data sources 202, and one or more indexers 206 that process and store the data in one or more data stores 208. These forwarders and indexers can comprise separate computer systems, or may alternatively comprise separate processes executing on one or more computer systems.

Each data source 202 broadly represents a distinct source of data that can be consumed by a system 108. Examples of a data source 202 include, without limitation, data files, directories of files, data sent over a network, event logs, registries, etc.

During operation, the forwarders 204 identify which indexers 206 receive data collected from a data source 202 and forward the data to the appropriate indexers. Forwarders 204 can also perform operations on the data before forwarding, including removing extraneous data, detecting timestamps in the data, parsing data, indexing data, routing data based on criteria relating to the data being routed, and/or performing other data transformations.

In an embodiment, a forwarder 204 may comprise a service accessible to client devices 102 and host devices 106 via a network 104. For example, one type of forwarder 204 may be capable of consuming vast amounts of real-time data from a potentially large number of client devices 102 and/or host devices 106. The forwarder 204 may, for example, comprise a computing device which implements multiple data pipelines or "queues" to handle forwarding of network data to indexers 206. A forwarder 204 may also perform many of the functions that are performed by an indexer. For example, a forwarder 204 may perform keyword extractions on raw data or parse raw data to create events. A forwarder 204 may generate time stamps for events. Additionally, or alternatively, a forwarder 204 may perform routing of events to indexers. Data store 208 may contain events derived from machine data from a variety of sources all pertaining to the same component in an IT environment, and this data may be produced by the machine in question or by other components in the IT environment.

2.5. Data Ingestion

Figure 3:
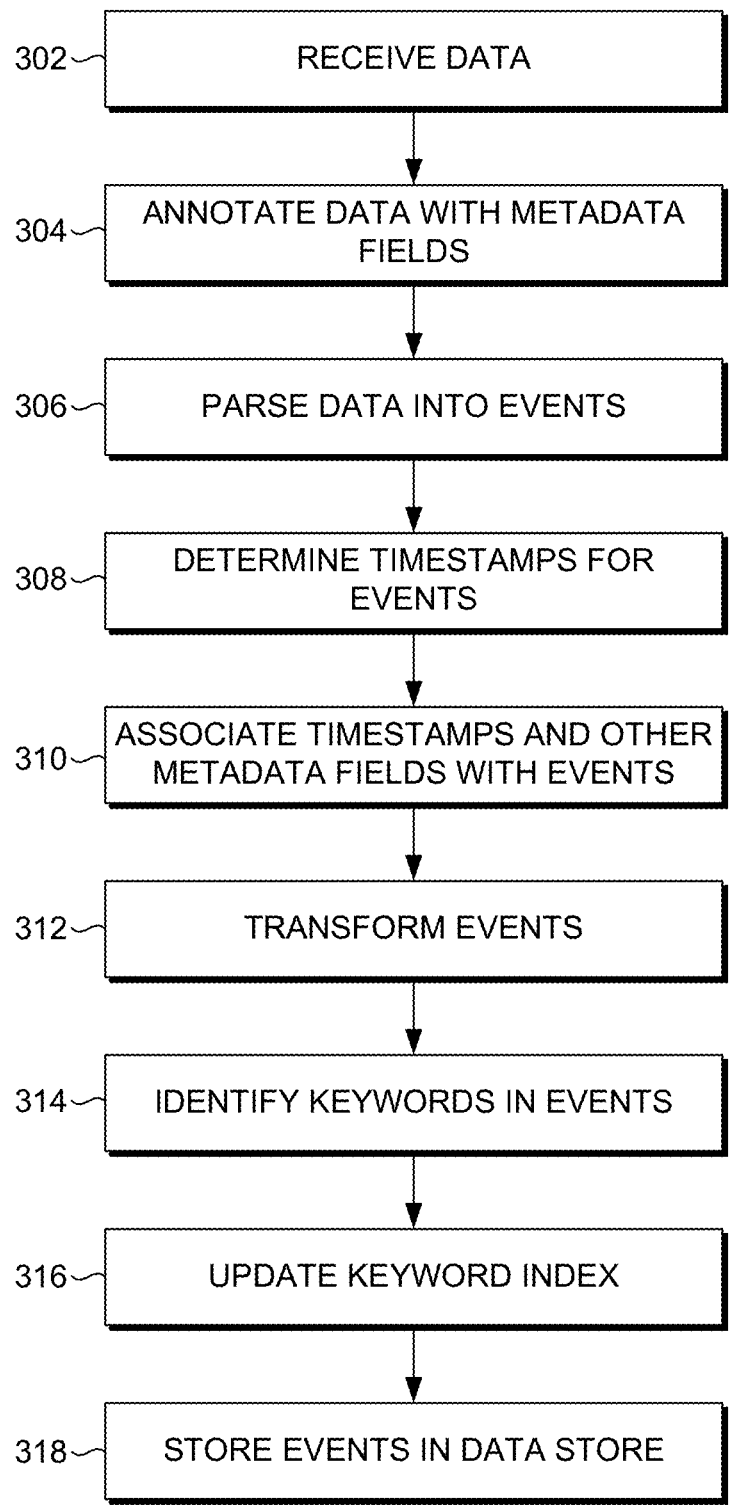
FIG. 3 is a flow diagram that illustrates how indexers process, index, and store data received from forwarders in accordance with the disclosed embodiments.

FIG. 3 depicts a flow chart illustrating an example data flow performed by Data Intake and Query system 108, in accordance with the disclosed embodiments. The data flow illustrated in FIG. 3 is provided for illustrative purposes only; those skilled in the art would understand that one or more of the steps of the processes illustrated in FIG. 3 may be removed or the ordering of the steps may be changed. Furthermore, for the purposes of illustrating a clear example, one or more particular system components are described in the context of performing various operations during each of the data flow stages. For example, a forwarder is described as receiving and processing data during an input phase; an indexer is described as parsing and indexing data during parsing and indexing phases; and a search head is described as performing a search query during a search phase. However, other system arrangements and distributions of the processing steps across system components may be used.

2.5.1. Input

At block 302, a forwarder receives data from an input source, such as a data source 202 shown in FIG. 2. A forwarder initially may receive the data as a raw data stream generated by the input source. For example, a forwarder may receive a data stream from a log file generated by an application server, from a stream of network data from a network device, or from any other source of data. In one embodiment, a forwarder receives the raw data and may segment the data stream into "blocks", or "buckets," possibly of a uniform data size, to facilitate subsequent processing steps.

At block 304, a forwarder or other system component annotates each block generated from the raw data with one or more metadata fields. These metadata fields may, for example, provide information related to the data block as a whole and may apply to each event that is subsequently derived from the data in the data block. For example, the metadata fields may include separate fields specifying each of a host, a source, and a source type related to the data block. A host field may contain a value identifying a host name or IP address of a device that generated the data. A source field may contain a value identifying a source of the data, such as a pathname of a file or a protocol and port related to received network data. A source type field may contain a value specifying a particular source type label for the data. Additional metadata fields may also be included during the input phase, such as a character encoding of the data, if known, and possibly other values that provide information relevant to later processing steps. In an embodiment, a forwarder forwards the annotated data blocks to another system component (typically an indexer) for further processing.

The SPLUNK® ENTERPRISE system allows forwarding of data from one SPLUNK® ENTERPRISE instance to another, or even to a third-party system. SPLUNK® ENTERPRISE system can employ different types of forwarders in a configuration.

In an embodiment, a forwarder may contain the essential components needed to forward data. It can gather data from a variety of inputs and forward the data to a SPLUNK® ENTERPRISE server for indexing and searching. It also can tag metadata (e.g., source, source type, host, etc.).

Additionally, or optionally, in an embodiment, a forwarder has the capabilities of the aforementioned forwarder as well as additional capabilities. The forwarder can parse data before forwarding the data (e.g., associate a time stamp with a portion of data and create an event, etc.) and can route data based on criteria such as source or type of event. It can also index data locally while forwarding the data to another indexer.

2.5.2. Parsing

At block 306, an indexer receives data blocks from a forwarder and parses the data to organize the data into events. In an embodiment, to organize the data into events, an indexer may determine a source type associated with each data block (e.g., by extracting a source type label from the metadata fields associated with the data block, etc.) and refer to a source type configuration corresponding to the identified source type. The source type definition may include one or more properties that indicate to the indexer to automatically determine the boundaries of events within the data. In general, these properties may include regular expression-based rules or delimiter rules where, for example, event boundaries may be indicated by predefined characters or character strings. These predefined characters may include punctuation marks or other special characters including, for example, carriage returns, tabs, spaces, line breaks, etc. If a source type for the data is unknown to the indexer, an indexer may infer a source type for the data by examining the structure of the data. Then, it can apply an inferred source type definition to the data to create the events.

At block 308, the indexer determines a timestamp for each event. Similar to the process for creating events, an indexer may again refer to a source type definition associated with the data to locate one or more properties that indicate instructions for determining a timestamp for each event. The properties may, for example, instruct an indexer to extract a time value from a portion of data in the event, to interpolate time values based on timestamps associated with temporally proximate events, to create a timestamp based on a time the event data was received or generated, to use the timestamp of a previous event, or use any other rules for determining timestamps.

At block 310, the indexer associates with each event one or more metadata fields including a field containing the timestamp (in some embodiments, a timestamp may be included in the metadata fields) determined for the event. These metadata fields may include a number of "default fields" that are associated with all events, and may also include one more custom fields as defined by a user. Similar to the metadata fields associated with the data blocks at block 304, the default metadata fields associated with each event may include a host, source, and source type field including or in addition to a field storing the timestamp.

At block 312, an indexer may optionally apply one or more transformations to data included in the events created at block 306. For example, such transformations can include removing a portion of an event (e.g., a portion used to define event boundaries, extraneous characters from the event, other extraneous text, etc.), masking a portion of an event (e.g., masking a credit card number), removing redundant portions of an event, etc. The transformations applied to event data may, for example, be specified in one or more configuration files and referenced by one or more source type definitions.

2.5.3. Indexing

At blocks 314 and 316, an indexer can optionally generate a keyword index to facilitate fast keyword searching for event data. To build a keyword index, at block 314, the indexer identifies a set of keywords in each event. At block 316, the indexer includes the identified keywords in an index, which associates each stored keyword with reference pointers to events containing that keyword (or to locations within events where that keyword is located, other location identifiers, etc.). When an indexer subsequently receives a keyword-based query, the indexer can access the keyword index to quickly identify events containing the keyword.

In some embodiments, the keyword index may include entries for name-value pairs found in events, where a name-value pair can include a pair of keywords connected by a symbol, such as an equals sign or colon. This way, events containing these name-value pairs can be quickly located. In some embodiments, fields can automatically be generated for some or all of the name-value pairs at the time of indexing. For example, if the string "dest=10.0.1.2" is found in an event, a field named "dest" may be created for the event, and assigned a value of "10.0.1.2".

At block 318, the indexer stores the events with an associated timestamp in a data store 208. Timestamps enable a user to search for events based on a time range. In one embodiment, the stored events are organized into "buckets," where each bucket stores events associated with a specific time range based on the timestamps associated with each event. This may not only improve time-based searching, but also allows for events with recent timestamps, which may have a higher likelihood of being accessed, to be stored in a faster memory to facilitate faster retrieval. For example, buckets containing the most recent events can be stored in flash memory rather than on a hard disk.

Each indexer 206 may be responsible for storing and searching a subset of the events contained in a corresponding data store 208. By distributing events among the indexers and data stores, the indexers can analyze events for a query in parallel. For example, using map-reduce techniques, each indexer returns partial responses for a subset of events to a search head that combines the results to produce an answer for the query. By storing events in buckets for specific time ranges, an indexer may further optimize data retrieval process by searching buckets corresponding to time ranges that are relevant to a query.

Moreover, events and buckets can also be replicated across different indexers and data stores to facilitate high availability and disaster recovery as described in U.S. Pat. No. 9,130,971, entitled "SITE-BASED SEARCH AFFINITY," and in U.S. Pat. No. 9,124,612, entitled "MULTI-SITE CLUSTERING", each of which is hereby incorporated by reference in its entirety for all purposes.

2.6. Query Processing

Figure 4:
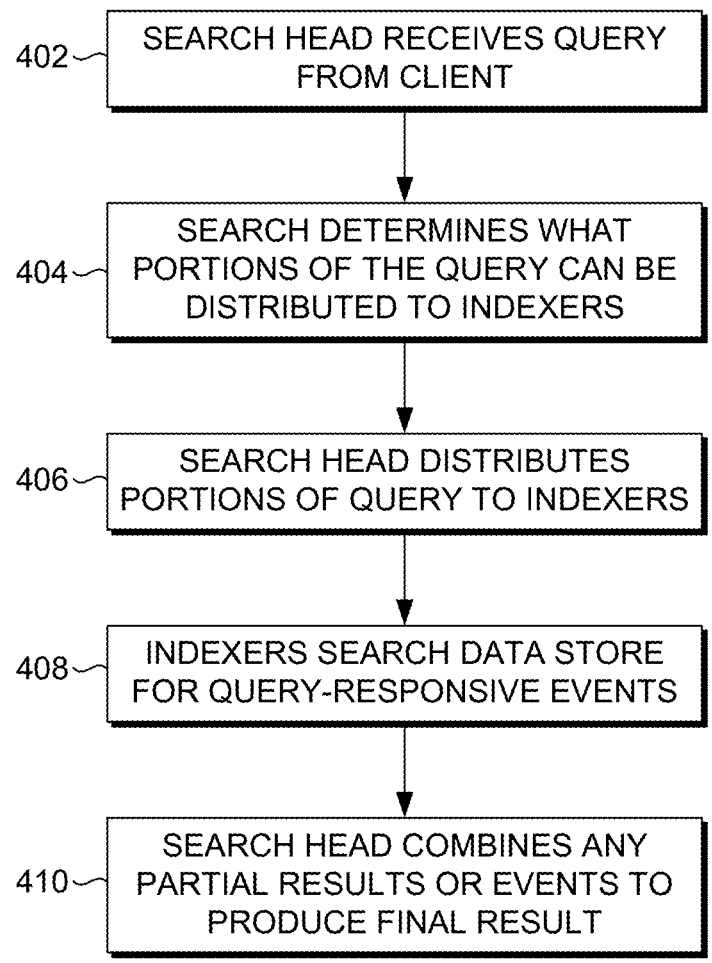
FIG. 4 is a flow diagram that illustrates how a search head and indexers perform a search query in accordance with the disclosed embodiments.

FIG. 4 is a flow diagram that illustrates an examplary process that a search head and one or more indexers may perform during a search query. At block 402, a search head receives a search query from a client. At block 404, the search head analyzes the search query to determine what portion(s) of the query can be delegated to indexers and what portions of the query can be executed locally by the search head. At block 406, the search head distributes the determined portions of the query to the appropriate indexers. In an embodiment, a search head cluster may take the place of an independent search head where each search head in the search head cluster coordinates with peer search heads in the search head cluster to schedule jobs, replicate search results, update configurations, fulfill search requests, etc. In an embodiment, the search head (or each search head) communicates with a master node (also known as a cluster master, not shown in Fig.) that provides the search head with a list of indexers to which the search head can distribute the determined portions of the query. The master node maintains a list of active indexers and can also designate which indexers may have responsibility for responding to queries over certain sets of events. A search head may communicate with the master node before the search head distributes queries to indexers to discover the addresses of active indexers.

At block 408, the indexers to which the query was distributed, search data stores associated with them for events that are responsive to the query. To determine which events are responsive to the query, the indexer searches for events that match the criteria specified in the query. These criteria can include matching keywords or specific values for certain fields. The searching operations at block 408 may use the late-binding schema to extract values for specified fields from events at the time the query is processed. In an embodiment, one or more rules for extracting field values may be specified as part of a source type definition. The indexers may then either send the relevant events back to the search head, or use the events to determine a partial result, and send the partial result back to the search head.

At block 410, the search head combines the partial results and/or events received from the indexers to produce a final result for the query. This final result may comprise different types of data depending on what the query requested. For example, the results can include a listing of matching events returned by the query, or some type of visualization of the data from the returned events. In another example, the final result can include one or more calculated values derived from the matching events.

The results generated by the system 108 can be returned to a client using different techniques. For example, one technique streams results or relevant events back to a client in real-time as they are identified. Another technique waits to report the results to the client until a complete set of results (which may include a set of relevant events or a result based on relevant events) is ready to return to the client. Yet another technique streams interim results or relevant events back to the client in real-time until a complete set of results is ready, and then returns the complete set of results to the client. In another technique, certain results are stored as "search jobs" and the client may retrieve the results by referring the search jobs.

The search head can also perform various operations to make the search more efficient. For example, before the search head begins execution of a query, the search head can determine a time range for the query and a set of common keywords that all matching events include. The search head may then use these parameters to query the indexers to obtain a superset of the eventual results. Then, during a filtering stage, the search head can perform field-extraction operations on the superset to produce a reduced set of search results. This speeds up queries that are performed on a periodic basis.

2.7 Field Extraction

The search head 210 allows users to search and visualize event data extracted from raw machine data received from homogenous data sources. It also allows users to search and visualize event data extracted from raw machine data received from heterogeneous data sources. The search head 210 includes various mechanisms, which may additionally reside in an indexer 206, for processing a query. Splunk Processing Language (SPL), used in conjunction with the SPLUNK® ENTERPRISE system, can be utilized to make a query. SPL is a pipelined search language in which a set of inputs is operated on by a first command in a command line, and then a subsequent command following the pipe symbol "|" operates on the results produced by the first command, and so on for additional commands. Other query languages, such as the Structured Query Language ("SQL"), can be used to create a query.

In response to receiving the search query, search head 210 uses extraction rules to extract values for the fields associated with a field or fields in the event data being searched. The search head 210 obtains extraction rules that specify how to extract a value for certain fields from an event. Extraction rules can comprise regex rules that specify how to extract values for the relevant fields. In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

The search head 210 can apply the extraction rules to event data that it receives from indexers 206. Indexers 206 may apply the extraction rules to events in an associated data store 208. Extraction rules can be applied to all the events in a data store, or to a subset of the events that have been filtered based on some criteria (e.g., event time stamp values, etc.). Extraction rules can be used to extract one or more values for a field from events by parsing the event data and examining the event data for one or more patterns of characters, numbers, delimiters, etc., that indicate where the field begins and, optionally, ends.

Figure 5:
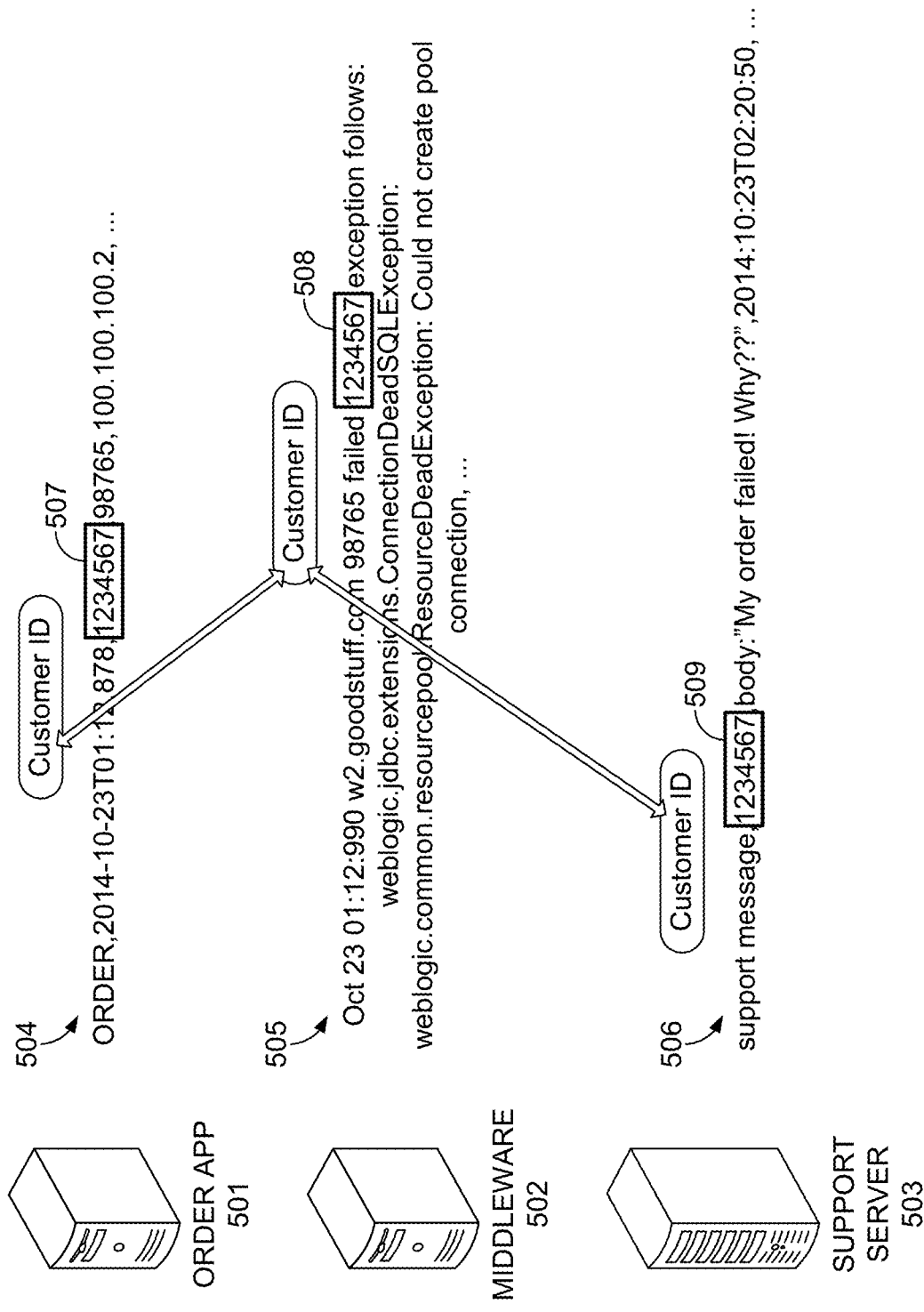
FIG. 5 illustrates a scenario where a common customer ID is found among log data received from three disparate sources in accordance with the disclosed embodiments.

FIG. 5 illustrates an example of raw machine data received from disparate data sources. In this example, a user submits an order for merchandise using a vendor's shopping application program 501 running on the user's system. In this example, the order was not delivered to the vendor's server due to a resource exception at the destination server that is detected by the middleware code 502. The user then sends a message to the customer support 503 to complain about the order failing to complete. The three systems 501, 502, and 503 are disparate systems that do not have a common logging format. The order application 501 sends log data 504 to the SPLUNK® ENTERPRISE system in one format, the middleware code 502 sends error log data 505 in a second format, and the support server 503 sends log data 506 in a third format.

Using the log data received at one or more indexers 206 from the three systems the vendor can uniquely obtain an insight into user activity, user experience, and system behavior. The search head 210 allows the vendor's administrator to search the log data from the three systems that one or more indexers 206 are responsible for searching, thereby obtaining correlated information, such as the order number and corresponding customer ID number of the person placing the order. The system also allows the administrator to see a visualization of related events via a user interface. The administrator can query the search head 210 for customer ID field value matches across the log data from the three systems that are stored at the one or more indexers 206. The customer ID field value exists in the data gathered from the three systems, but the customer ID field value may be located in different areas of the data given differences in the architecture of the systems—there is a semantic relationship between the customer ID field values generated by the three systems. The search head 210 requests event data from the one or more indexers 206 to gather relevant event data from the three systems. It then applies extraction rules to the event data in order to extract field values that it can correlate. The search head may apply a different extraction rule to each set of events from each system when the event data format differs among systems. In this example, the user interface can display to the administrator the event data corresponding to the common customer ID field values 507, 508, and 509, thereby providing the administrator with insight into a customer's experience.

Note that query results can be returned to a client, a search head, or any other system component for further processing. In general, query results may include a set of one or more events, a set of one or more values obtained from the events, a subset of the values, statistics calculated based on the values, a report containing the values, or a visualization, such as a graph or chart, generated from the values.

2.8. Example Search Screen

Figure 6A:
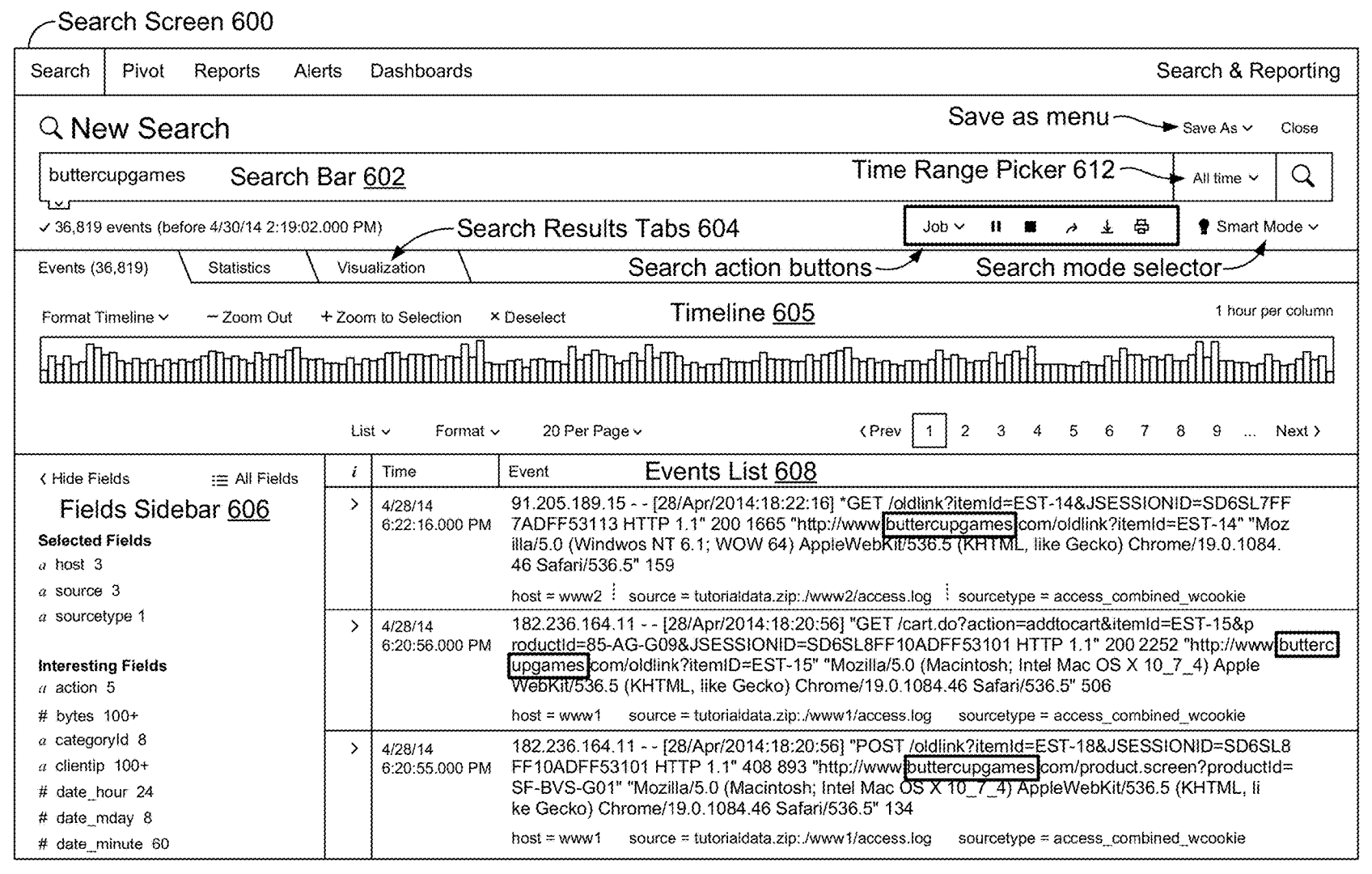

FIG. 6A illustrates an example search screen 600 in accordance with the disclosed embodiments. Search screen 600 includes a search bar 602 that accepts user input in the form of a search string. It also includes a time range picker 612 that enables the user to specify a time range for the search. For "historical searches" the user can select a specific time range, or alternatively a relative time range, such as "today," "yesterday" or "last week." For "real-time searches," the user can select the size of a preceding time window to search for real-time events. Search screen 600 also initially displays a "data summary" dialog as is illustrated in FIG. 6B that enables the user to select different sources for the event data, such as by selecting specific hosts and log files.

After the search is executed, the search screen 600 in FIG. 6A can display the results through search results tabs 604, wherein search results tabs 604 includes: an "events tab" that displays various information about events returned by the search; a "statistics tab" that displays statistics about the search results; and a "visualization tab" that displays various visualizations of the search results. The events tab illustrated in FIG. 6A displays a timeline graph 605 that graphically illustrates the number of events that occurred in one-hour intervals over the selected time range. It also displays an events list 608 that enables a user to view the raw data in each of the returned events. It additionally displays a fields sidebar 606 that includes statistics about occurrences of specific fields in the returned events, including "selected fields" that are pre-selected by the user, and "interesting fields" that are automatically selected by the system based on pre-specified criteria.

2.9. Data Models

A data model is a hierarchically structured search-time mapping of semantic knowledge about one or more datasets. It encodes the domain knowledge necessary to build a variety of specialized searches of those datasets. Those searches, in turn, can be used to generate reports.

A data model is composed of one or more "objects" (or "data model objects") that define or otherwise correspond to a specific set of data.

Objects in data models can be arranged hierarchically in parent/child relationships. Each child object represents a subset of the dataset covered by its parent object. The top-level objects in data models are collectively referred to as "root objects."

Child objects have inheritance. Data model objects are defined by characteristics that mostly break down into constraints and attributes. Child objects inherit constraints and attributes from their parent objects and have additional constraints and attributes of their own. Child objects provide a way of filtering events from parent objects. Because a child object always provides an additional constraint in addition to the constraints it has inherited from its parent object, the dataset it represents is always a subset of the dataset that its parent represents.

For example, a first data model object may define a broad set of data pertaining to e-mail activity generally, and another data model object may define specific datasets within the broad dataset, such as a subset of the e-mail data pertaining specifically to e-mails sent. Examples of data models can include electronic mail, authentication, databases, intrusion detection, malware, application state, alerts, compute inventory, network sessions, network traffic, performance, audits, updates, vulnerabilities, etc. Data models and their objects can be designed by knowledge managers in an organization, and they can enable downstream users to quickly focus on a specific set of data. For example, a user can simply select an "e-mail activity" data model object to access a dataset relating to e-mails generally (e.g., sent or received), or select an "e-mails sent" data model object (or data sub-model object) to access a dataset relating to e-mails sent.

A data model object may be defined by (1) a set of search constraints, and (2) a set of fields. Thus, a data model object can be used to quickly search data to identify a set of events and to identify a set of fields to be associated with the set of events. For example, an "e-mails sent" data model object may specify a search for events relating to e-mails that have been sent, and specify a set of fields that are associated with the events. Thus, a user can retrieve and use the "e-mails sent" data model object to quickly search source data for events relating to sent e-mails, and may be provided with a listing of the set of fields relevant to the events in a user interface screen.

A child of the parent data model may be defined by a search (typically a narrower search) that produces a subset of the events that would be produced by the parent data model's search. The child's set of fields can include a subset of the set of fields of the parent data model and/or additional fields. Data model objects that reference the subsets can be arranged in a hierarchical manner, so that child subsets of events are proper subsets of their parents. A user iteratively applies a model development tool (not shown in Fig.) to prepare a query that defines a subset of events and assigns an object name to that subset. A child subset is created by further limiting a query that generated a parent subset. A late-binding schema of field extraction rules is associated with each object or subset in the data model.

Data definitions in associated schemas can be taken from the common information model (CIM) or can be devised for a particular schema and optionally added to the CIM. Child objects inherit fields from parents and can include fields not present in parents. A model developer can select fewer extraction rules than are available for the sources returned by the query that defines events belonging to a model. Selecting a limited set of extraction rules can be a tool for simplifying and focusing the data model, while allowing a user flexibility to explore the data subset. Development of a data model is further explained in U.S. Pat. Nos. 8,788,525 and 8,788,526, both entitled "DATA MODEL FOR MACHINE DATA FOR SEMANTIC SEARCH", both issued on 22 Jul. 2014, U.S. Pat. No. 8,983,994, entitled "GENERATION OF A DATA MODEL FOR SEARCHING MACHINE DATA", issued on 17 Mar. 2015, U.S. Pat. No. 9,129,980, entitled "GENERATION OF A DATA MODEL APPLIED TO QUERIES", issued on 8 Sep. 2015, and U.S. Pat. No. 9,589,012, entitled "GENERATION OF A DATA MODEL APPLIED TO OBJECT QUERIES", issued on 7 Mar. 2017, each of which is hereby incorporated by reference in its entirety for all purposes. See, also, Knowledge Manager Manual, Build a Data Model, Splunk Enterprise 6.1.3 pp. 150-204 (Aug. 25, 2014).

A data model can also include reports. One or more report formats can be associated with a particular data model and be made available to run against the data model. A user can use child objects to design reports with object datasets that already have extraneous data pre-filtered out. In an embodiment, the data intake and query system 108 provides the user with the ability to produce reports (e.g., a table, chart, visualization, etc.) without having to enter SPL, SQL, or other query language terms into a search screen. Data models are used as the basis for the search feature.

2.10. Acceleration Techniques

The above-described system provides significant flexibility by enabling a user to analyze massive quantities of minimally processed data "on the fly" at search time instead of storing pre-specified portions of the data in a database at ingestion time. This flexibility enables a user to see valuable insights, correlate data, and perform subsequent queries to examine interesting aspects of the data that may not have been apparent at ingestion time.

However, performing extraction and analysis operations at search time can involve a large amount of data and require a large number of computational operations, which can cause delays in processing the queries. Advantageously, SPLUNK® ENTERPRISE system employs a number of unique acceleration techniques that have been developed to speed up analysis operations performed at search time. These techniques include: (1) performing search operations in parallel across multiple indexers; (2) using a keyword index; (3) using a high-performance analytics store; and (4) accelerating the process of generating reports. These novel techniques are described in more detail below.

2.10.1. Aggregation Technique

Figure 7:
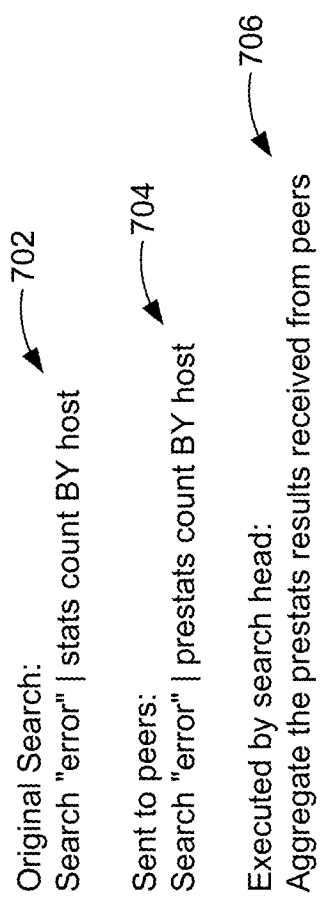
FIG. 7 illustrates an example search query received from a client and executed by search peers in accordance with the disclosed embodiments.

To facilitate faster query processing, a query can be structured such that multiple indexers perform the query in parallel, while aggregation of search results from the multiple indexers is performed locally at the search head. For example, FIG. 7 illustrates how a search query 702 received from a client at a search head 210 can split into two phases, including: (1) subtasks 704 (e.g., data retrieval or simple filtering) that may be performed in parallel by indexers 206 for execution, and (2) a search results aggregation operation 706 to be executed by the search head when the results are ultimately collected from the indexers.

During operation, upon receiving search query 702, a search head 210 determines that a portion of the operations involved with the search query may be performed locally by the search head. The search head modifies search query 702 by substituting "stats" (create aggregate statistics over results sets received from the indexers at the search head) with "prestats" (create statistics by the indexer from local results set) to produce search query 704, and then distributes search query 704 to distributed indexers, which are also referred to as "search peers." Note that search queries may generally specify search criteria or operations to be performed on events that meet the search criteria. Search queries may also specify field names, as well as search criteria for the values in the fields or operations to be performed on the values in the fields. Moreover, the search head may distribute the full search query to the search peers as illustrated in FIG. 4, or may alternatively distribute a modified version (e.g., a more restricted version) of the search query to the search peers. In this example, the indexers are responsible for producing the results and sending them to the search head. After the indexers return the results to the search head, the search head aggregates the received results 706 to form a single search result set. By executing the query in this manner, the system effectively distributes the computational operations across the indexers while minimizing data transfers.

2.10.2. Keyword Index

As described above with reference to the flow charts in FIG. 3 and FIG. 4, data intake and query system 108 can construct and maintain one or more keyword indices to quickly identify events containing specific keywords. This technique can greatly speed up the processing of queries involving specific keywords. As mentioned above, to build a keyword index, an indexer first identifies a set of keywords. Then, the indexer includes the identified keywords in an index, which associates each stored keyword with references to events containing that keyword, or to locations within events where that keyword is located. When an indexer subsequently receives a keyword-based query, the indexer can access the keyword index to quickly identify events containing the keyword.

2.10.3. High Performance Analytics Store

To speed up certain types of queries, some embodiments of system 108 create a high-performance analytics store, which is referred to as a "summarization table," that contains entries for specific field-value pairs. Each of these entries keeps track of instances of a specific value in a specific field in the event data and includes references to events containing the specific value in the specific field. For example, an example entry in a summarization table can keep track of occurrences of the value "94107" in a "ZIP code" field of a set of events and the entry includes references to all of the events that contain the value "94107" in the ZIP code field. This optimization technique enables the system to quickly process queries that seek to determine how many events have a particular value for a particular field. To this end, the system can examine the entry in the summarization table to count instances of the specific value in the field without having to go through the individual events or perform data extractions at search time. Also, if the system needs to process all events that have a specific field-value combination, the system can use the references in the summarization table entry to directly access the events to extract further information without having to search all of the events to find the specific field-value combination at search time.

In some embodiments, the system maintains a separate summarization table for each of the above-described time-specific buckets that stores events for a specific time range. A bucket-specific summarization table includes entries for specific field-value combinations that occur in events in the specific bucket. Alternatively, the system can maintain a separate summarization table for each indexer. The indexer-specific summarization table includes entries for the events in a data store that are managed by the specific indexer. Indexer-specific summarization tables may also be bucket-specific.

The summarization table can be populated by running a periodic query that scans a set of events to find instances of a specific field-value combination, or alternatively instances of all field-value combinations for a specific field. A periodic query can be initiated by a user, or can be scheduled to occur automatically at specific time intervals. A periodic query can also be automatically launched in response to a query that asks for a specific field-value combination.

In some cases, when the summarization tables may not cover all of the events that are relevant to a query, the system can use the summarization tables to obtain partial results for the events that are covered by summarization tables, but may also have to search through other events that are not covered by the summarization tables to produce additional results. These additional results can then be combined with the partial results to produce a final set of results for the query. The summarization table and associated techniques are described in more detail in U.S. Pat. No. 8,682,925, entitled "DISTRIBUTED HIGH PERFORMANCE ANALYTICS STORE", issued on 25 Mar. 2014, U.S. Pat. No. 9,128,985, entitled "SUPPLEMENTING A HIGH PERFORMANCE ANALYTICS STORE WITH EVALUATION OF INDIVIDUAL EVENTS TO RESPOND TO AN EVENT QUERY", issued on 8 Sep. 2015, and U.S. Pat. No. 9,990,386, entitled "STORAGE MEDIUM AND CONTROL DEVICE", issued on 5 Jun. 2018, each of which is hereby incorporated by reference in its entirety.

2.10.4. Accelerating Report Generation

In some embodiments, a data server system such as the SPLUNK® ENTERPRISE system can accelerate the process of periodically generating updated reports based on query results. To accelerate this process, a summarization engine automatically examines the query to determine whether generation of updated reports can be accelerated by creating intermediate summaries. If reports can be accelerated, the summarization engine periodically generates a summary covering data obtained during a latest non-overlapping time period. For example, where the query seeks events meeting a specified criterion, a summary for the time period includes only events within the time period that meet the specified criteria. Similarly, if the query seeks statistics calculated from the events, such as the number of events that match the specified criteria, then the summary for the time period includes the number of events in the period that match the specified criteria.

In addition to the creation of the summaries, the summarization engine schedules the periodic updating of the report associated with the query. During each scheduled report update, the query engine determines whether intermediate summaries have been generated covering portions of the time period covered by the report update. If so, then the report is generated based on the information contained in the summaries. Also, if additional event data has been received and has not yet been summarized, and is required to generate the complete report, the query can be run on this additional event data. Then, the results returned by this query on the additional event data, along with the partial results obtained from the intermediate summaries, can be combined to generate the updated report. This process is repeated each time the report is updated. Alternatively, if the system stores events in buckets covering specific time ranges, then the summaries can be generated on a bucket-by-bucket basis. Note that producing intermediate summaries can save the work involved in re-running the query for previous time periods, so advantageously only the newer event data needs to be processed while generating an updated report. These report acceleration techniques are described in more detail in U.S. Pat. No. 8,589,403, entitled "COMPRESSED JOURNALING IN EVENT TRACKING FILES FOR METADATA RECOVERY AND REPLICATION", issued on 19 Nov. 2013, U.S. Pat. No. 8,412,696, entitled "REAL TIME SEARCHING AND REPORTING", issued on 2 Apr. 2011, and U.S. Pat. Nos. 8,589,375 and 8,589,432, both also entitled "REAL TIME SEARCHING AND REPORTING", both issued on 19 Nov. 2013, each of which is hereby incorporated by reference in its entirety.

2.11. Cloud-Based System Overview

The example data intake and query system 108 described in reference to FIG. 2 comprises several system components, including one or more forwarders, indexers, and search heads. In some environments, a user of a data intake and query system 108 may install and configure, on computing devices owned and operated by the user, one or more software applications that implement some or all of these system components. For example, a user may install a software application on server computers owned by the user and configure each server to operate as one or more of a forwarder, an indexer, a search head, etc. This arrangement generally may be referred to as an "on-premises" solution. That is, the system 108 is installed and operates on computing devices directly controlled by the user of the system. Some users may prefer an on-premises solution because it may provide a greater level of control over the configuration of certain aspects of the system (e.g., security, privacy, standards, controls, etc.). However, other users may instead prefer an arrangement in which the user is not directly responsible for providing and managing the computing devices upon which various components of system 108 operate.

In one embodiment, to provide an alternative to an entirely on-premises environment for system 108, one or more of the components of a data intake and query system instead may be provided as a cloud-based service. In this context, a cloud-based service refers to a service hosted by one more computing resources that are accessible to end users over a network, for example, by using a web browser or other application on a client device to interface with the remote computing resources. For example, a service provider may provide a cloud-based data intake and query system by managing computing resources configured to implement various aspects of the system (e.g., forwarders, indexers, search heads, etc.) and by providing access to the system to end users via a network. Typically, a user may pay a subscription or other fee to use such a service. Each subscribing user of the cloud-based service may be provided with an account that enables the user to configure a customized cloud-based system based on the user's preferences.

Figure 8:
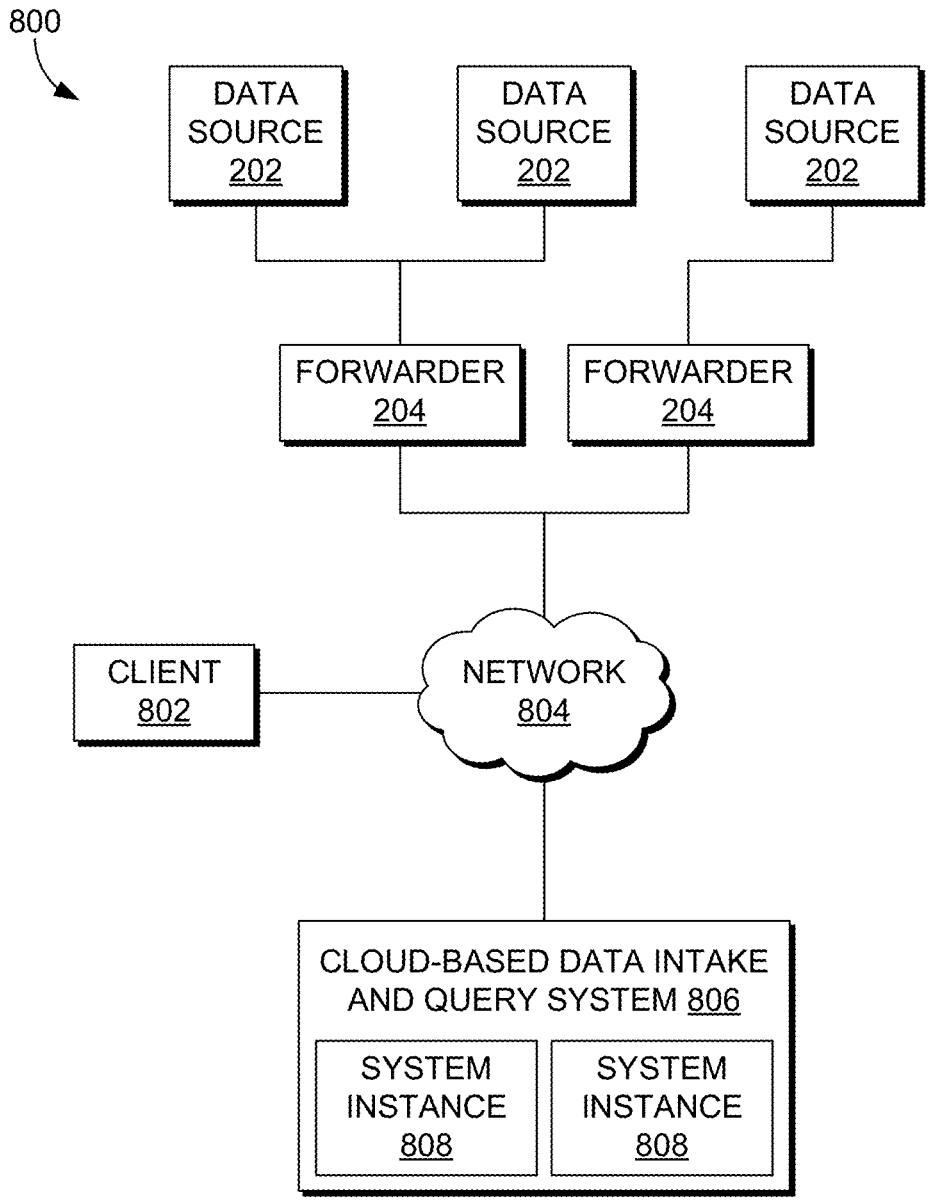
FIG. 8 illustrates a block diagram of an example cloud-based data intake and query system in which an embodiment may be implemented.

FIG. 8 illustrates a block diagram of an example cloud-based data intake and query system. Similar to the system of FIG. 2, the networked computer system 800 includes input data sources 202 and forwarders 204. These input data sources and forwarders may be in a subscriber's private computing environment. Alternatively, they might be directly managed by the service provider as part of the cloud service. In the example system 800, one or more forwarders 204 and client devices 802 are coupled to a cloud-based data intake and query system 806 via one or more networks 804. Network 804 broadly represents one or more LANs, WANs, cellular networks, intranetworks, internetworks, etc., using any of wired, wireless, terrestrial microwave, satellite links, etc., and may include the public Internet, and is used by client devices 802 and forwarders 204 to access the system 806. Similar to the system of 108, each of the forwarders 204 may be configured to receive data from an input source and to forward the data to other components of the system 806 for further processing.

In an embodiment, a cloud-based data intake and query system 806 may comprise a plurality of system instances 808. In general, each system instance 808 may include one or more computing resources managed by a provider of the cloud-based system 806 made available to a particular subscriber. The computing resources comprising a system instance 808 may, for example, include one or more servers or other devices configured to implement one or more forwarders, indexers, search heads, and other components of a data intake and query system, similar to system 108. As indicated above, a subscriber may use a web browser or other application of a client device 802 to access a web portal or other interface that enables the subscriber to configure an instance 808.

Providing a data intake and query system as described in reference to system 108 as a cloud-based service presents a number of challenges. Each of the components of a system 108 (e.g., forwarders, indexers and search heads) may at times refer to various configuration files stored locally at each component. These configuration files typically may involve some level of user configuration to accommodate particular types of data a user desires to analyze and to account for other user preferences. However, in a cloud-based service context, users typically may not have direct access to the underlying computing resources implementing the various system components (e.g., the computing resources comprising each system instance 808) and may desire to make such configurations indirectly, for example, using one or more web-based interfaces. Thus, the techniques and systems described herein for providing user interfaces that enable a user to configure source type definitions are applicable to both on-premises and cloud-based service contexts, or some combination thereof (e.g., a hybrid system where both an on-premises environment such as SPLUNK® ENTERPRISE and a cloud-based environment such as SPLUNK CLOUD® are centrally visible).

2.12. Searching Externally Archived Data

Figure 9:
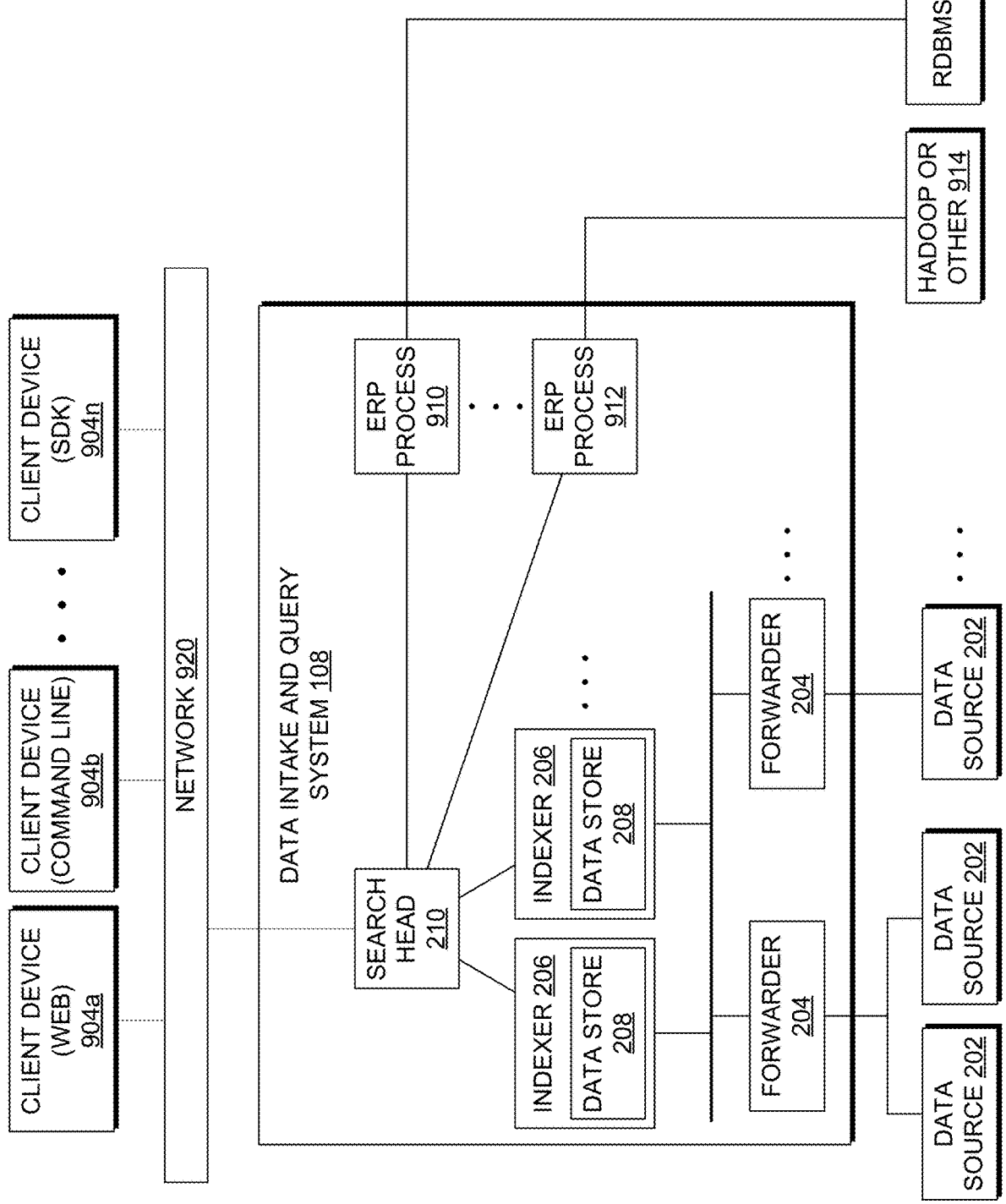
FIG. 9 illustrates a block diagram of an example data intake and query system that performs searches across external data systems in accordance with the disclosed embodiments.

FIG. 9 shows a block diagram of an example of a data intake and query system 108 that provides transparent search facilities for data systems that are external to the data intake and query system. Such facilities are available in the HUNK® system provided by Splunk Inc. of San Francisco, Calif. HUNK® represents an analytics platform that enables business and IT teams to rapidly explore, analyze, and visualize data in Hadoop and NoSQL data stores.

The search head 210 of the data intake and query system receives search requests from one or more client devices 904 over network connections 920. As discussed above, the data intake and query system 108 may reside in an enterprise location, in the cloud, etc. FIG. 9 illustrates that multiple client devices 904a, 904b, . . . , 904n may communicate with the data intake and query system 108. The client devices 904 may communicate with the data intake and query system using a variety of connections. For example, one client device in FIG. 9 is illustrated as communicating over an Internet (Web) protocol, another client device is illustrated as communicating via a command line interface, and another client device is illustrated as communicating via a system developer kit (SDK).

The search head 210 analyzes the received search request to identify request parameters. If a search request received from one of the client devices 904 references an index maintained by the data intake and query system, then the search head 210 connects to one or more indexers 206 of the data intake and query system for the index referenced in the request parameters. That is, if the request parameters of the search request reference an index, then the search head accesses the data in the index via the indexer. The data intake and query system 108 may include one or more indexers 206, depending on system access resources and requirements. As described further below, the indexers 206 retrieve data from their respective local data stores 208 as specified in the search request. The indexers and their respective data stores can comprise one or more storage devices and typically reside on the same system, though they may be connected via a local network connection.

If the request parameters of the received search request reference an external data collection, which is not accessible to the indexers 206 or under the management of the data intake and query system, then the search head 210 can access the external data collection through an External Result Provider (ERP) process 910. An external data collection may be referred to as a "virtual index" (plural, "virtual indices"). An ERP process provides an interface through which the search head 210 may access virtual indices.

Thus, a search reference to an index of the system relates to a locally stored and managed data collection. In contrast, a search reference to a virtual index relates to an externally stored and managed data collection, which the search head may access through one or more ERP processes 910, 912. FIG. 9 shows two ERP processes 910, 912 that connect to respective remote (external) virtual indices, which are indicated as a Hadoop or another system 914 (e.g., Amazon™ S3, Amazon™ EMR, other Hadoop Compatible File Systems (HCFS), etc.) and a relational database management system (RDBMS) 916. Other virtual indices may include other file organizations and protocols, such as Structured Query Language (SQL) and the like. The ellipses between the ERP processes 910, 912 indicate optional additional ERP processes of the data intake and query system 108. An ERP process may be a computer process that is initiated or spawned by the search head 210 and is executed by the search data intake and query system 108. Alternatively, or additionally, an ERP process may be a process spawned by the search head 210 on the same or different host system as the search head 210 resides.

The search head 210 may spawn a single ERP process in response to multiple virtual indices referenced in a search request, or the search head may spawn different ERP processes for different virtual indices. Generally, virtual indices that share common data configurations or protocols may share ERP processes. For example, all search query references to a Hadoop file system may be processed by the same ERP process, if the ERP process is suitably configured. Likewise, all search query references to an SQL database may be processed by the same ERP process. In addition, the search head may provide a common ERP process for common external data source types (e.g., a common vendor may utilize a common ERP process, even if the vendor includes different data storage system types, such as Hadoop and SQL). Common indexing schemes also may be handled by common ERP processes, such as flat text files or Weblog files.

The search head 210 determines the number of ERP processes to be initiated via the use of configuration parameters that are included in a search request message. Generally, there is a one-to-many relationship between an external results provider "family" and ERP processes. There is also a one-to-many relationship between an ERP process and corresponding virtual indices that are referred to in a search request. For example, using RDBMS, assume two independent instances of such a system by one vendor, such as one RDBMS for production and another RDBMS used for development. In such a situation, it is likely preferable (but optional) to use two ERP processes to maintain the independent operation as between production and development data. Both of the ERPs, however, will belong to the same family, because the two RDBMS system types are from the same vendor.

The ERP processes 910, 912 receive a search request from the search head 210. The search head may optimize the received search request for execution at the respective external virtual index. Alternatively, the ERP process may receive a search request as a result of analysis performed by the search head or by a different system process. The ERP processes 910, 912 can communicate with the search head 210 via conventional input/output routines (e.g., standard in/standard out, etc.). In this way, the ERP process receives the search request from a client device such that the search request may be efficiently executed at the corresponding external virtual index.

The ERP processes 910, 912 may be implemented as a process of the data intake and query system. Each ERP process may be provided by the data intake and query system, or may be provided by process or application providers who are independent of the data intake and query system. Each respective ERP process may include an interface application installed at a computer of the external result provider that ensures proper communication between the search support system and the external result provider. The ERP processes 910, 912 generate appropriate search requests in the protocol and syntax of the respective virtual indices 914, 916, each of which corresponds to the search request received by the search head 210. Upon receiving search results from their corresponding virtual indices, the respective ERP process passes the result to the search head 210, which may return or display the results, or a processed set of results, based on the returned results to the respective client device.

Client devices 904 may communicate with the data intake and query system 108 through a network interface 920, e.g., one or more LANs, WANs, cellular networks, intranetworks, and/or internetworks using any of wired, wireless, terrestrial microwave, satellite links, etc., and may include the public Internet.

The analytics platform utilizing the External Result Provider process described in more detail in U.S. Pat. No. 8,738,629, entitled "EXTERNAL RESULT PROVIDED PROCESS FOR RETRIEVING DATA STORED USING A DIFFERENT CONFIGURATION OR PROTOCOL", issued on 27 May 2014, U.S. Pat. No. 8,738,587, entitled "PROCESSING A SYSTEM SEARCH REQUEST BY RETRIEVING RESULTS FROM BOTH A NATIVE INDEX AND A VIRTUAL INDEX", issued on 25 Jul. 2013, U.S. Pat. No. 10,049,160, entitled "PROCESSING A SYSTEM SEARCH REQUEST ACROSS DISPARATE DATA COLLECTION SYSTEMS", issued on 14 Aug. 2018, and U.S. Pat. No. 9,514,189, entitled "PROCESSING A SYSTEM SEARCH REQUEST INCLUDING EXTERNAL DATA SOURCES", issued on 6 Dec. 2016, each of which is hereby incorporated by reference in its entirety for all purposes.

2.12.1. ERP Process Features

The ERP processes described above may include two operation modes: a streaming mode and a reporting mode. The ERP processes can operate in streaming mode only, in reporting mode only, or in both modes simultaneously. Operating in both modes simultaneously is referred to as mixed mode operation. In a mixed mode operation, the ERP at some point can stop providing the search head with streaming results and only provide reporting results thereafter, or the search head at some point may start ignoring streaming results it has been using and only use reporting results thereafter.

The streaming mode returns search results in real time, with minimal processing, in response to the search request. The reporting mode provides results of a search request with processing of the search results prior to providing them to the requesting search head, which in turn provides results to the requesting client device. ERP operation with such multiple modes provides greater performance flexibility with regard to report time, search latency, and resource utilization.

In a mixed mode operation, both streaming mode and reporting mode are operating simultaneously. The streaming mode results (e.g., the raw data obtained from the external data source) are provided to the search head, which can then process the results data (e.g., break the raw data into events, timestamp it, filter it, etc.) and integrate the results data with the results data from other external data sources, and/or from data stores of the search head. The search head performs such processing and can immediately start returning interim (streaming mode) results to the user at the requesting client device; simultaneously, the search head is waiting for the ERP process to process the data it is retrieving from the external data source as a result of the concurrently executing reporting mode.

In some instances, the ERP process initially operates in a mixed mode, such that the streaming mode operates to enable the ERP quickly to return interim results (e.g., some of the raw or unprocessed data necessary to respond to a search request) to the search head, enabling the search head to process the interim results and begin providing to the client or search requester interim results that are responsive to the query. Meanwhile, in this mixed mode, the ERP also operates concurrently in reporting mode, processing portions of raw data in a manner responsive to the search query. Upon determining that it has results from the reporting mode available to return to the search head, the ERP may halt processing in the mixed mode at that time (or some later time) by stopping the return of data in streaming mode to the search head and switching to reporting mode only. The ERP at this point starts sending interim results in reporting mode to the search head, which in turn may then present this processed data responsive to the search request to the client or search requester. Typically, the search head switches from using results from the ERP's streaming mode of operation to results from the ERP's reporting mode of operation when the higher bandwidth results from the reporting mode outstrip the amount of data processed by the search head in the streaming mode of ERP operation.

A reporting mode may have a higher bandwidth because the ERP does not have to spend time transferring data to the search head for processing all the raw data. In addition, the ERP may optionally direct another processor to do the processing.

The streaming mode of operation does not need to be stopped to gain the higher bandwidth benefits of a reporting mode; the search head could simply stop using the streaming mode results—and start using the reporting mode results— when the bandwidth of the reporting mode has caught up with or exceeded the amount of bandwidth provided by the streaming mode. Thus, a variety of triggers and ways to accomplish a search head's switch from using streaming mode results to using reporting mode results may be appreciated by one skilled in the art.

The reporting mode can involve the ERP process (or an external system) performing event breaking, time stamping, filtering of events to match the search query request, and calculating statistics on the results. The user can request particular types of data, such as if the search query itself involves types of events, or the search request may ask for statistics on data, such as on events that meet the search request. In either case, the search head understands the query language used in the received query request, which may be a proprietary language. One exemplary query language is Splunk Processing Language (SPL) developed by the assignee of the application, Splunk Inc. The search head typically understands how to use that language to obtain data from the indexers, which store data in a format used by the SPLUNK® Enterprise system.

The ERP processes support the search head, as the search head is not ordinarily configured to understand the format in which data is stored in external data sources such as Hadoop or SQL data systems. Rather, the ERP process performs that translation from the query submitted in the search support system's native format (e.g., SPL if SPLUNK® ENTERPRISE is used as the search support system) to a search query request format that will be accepted by the corresponding external data system. The external data system typically stores data in a different format from that of the search support system's native index format, and it utilizes a different query language (e.g., SQL or MapReduce, rather than SPL or the like).

As noted, the ERP process can operate in the streaming mode alone. After the ERP process has performed the translation of the query request and received raw results from the streaming mode, the search head can integrate the returned data with any data obtained from local data sources (e.g., native to the search support system), other external data sources, and other ERP processes (if such operations were required to satisfy the terms of the search query). An advantage of mixed mode operation is that, in addition to streaming mode, the ERP process is also executing concurrently in reporting mode. Thus, the ERP process (rather than the search head) is processing query results (e.g., performing event breaking, timestamping, filtering, possibly calculating statistics if required to be responsive to the search query request, etc.). It should be apparent to those skilled in the art that additional time is needed for the ERP process to perform the processing in such a configuration. Therefore, the streaming mode will allow the search head to start returning interim results to the user at the client device before the ERP process can complete sufficient processing to start returning any search results. The switchover between streaming and reporting mode happens when the ERP process determines that the switchover is appropriate, such as when the ERP process determines it can begin returning meaningful results from its reporting mode.

The operation described above illustrates the source of operational latency: streaming mode has low latency (immediate results) and usually has relatively low bandwidth (fewer results can be returned per unit of time). In contrast, the concurrently running reporting mode has relatively high latency (it has to perform a lot more processing before returning any results) and usually has relatively high bandwidth (more results can be processed per unit of time). For example, when the ERP process does begin returning report results, it returns more processed results than in the streaming mode, because, e.g., statistics only need to be calculated to be responsive to the search request. That is, the ERP process doesn't have to take time to first return raw data to the search head. As noted, the ERP process could be configured to operate in streaming mode alone and return just the raw data for the search head to process in a way that is responsive to the search request. Alternatively, the ERP process can be configured to operate in the reporting mode only. Also, the ERP process can be configured to operate in streaming mode and reporting mode concurrently, as described, with the ERP process stopping the transmission of streaming results to the search head when the concurrently running reporting mode has caught up and started providing results. The reporting mode does not require the processing of all raw data that is responsive to the search query request before the ERP process starts returning results; rather, the reporting mode usually performs processing of chunks of events and returns the processing results to the search head for each chunk.

For example, an ERP process can be configured to merely return the contents of a search result file verbatim, with little or no processing of results. That way, the search head performs all processing (such as parsing byte streams into events, filtering, etc.). The ERP process can be configured to perform additional intelligence, such as analyzing the search request and handling all the computation that a native search indexer process would otherwise perform. In this way, the configured ERP process provides greater flexibility in features while operating according to desired preferences, such as response latency and resource requirements.

2.13. Security Features

Various types of networks and enterprises can be susceptible to attacks, in some cases, by users with trusted access. Such attacks often go undetected by existing security products and systems. Indeed, traditional security products often suffer from various limitations, including the inability to detect unknown threats and insider threats, as well as the inability to scale or process huge amount of data. Whether access is obtained by using compromised accounts/systems or by leveraging existing privileges to conduct malicious activities, attackers often do not need to employ additional malware which might otherwise present an easily detected presence in the target system or network. Accordingly, attacks which rely on the use of seemingly valid access are difficult to detect, identify, and correct or remediate in a timely manner.

Machine-learning based network security systems can perform user behavioral analytics (UBA), or more generally user/entity behavioral analytics (UEBA), to detect security related anomalies and threats, regardless of whether such anomalies and threats are previously known or unknown. Such network security systems can be deployed at any of various locations in an information technology environment. In the case of a private network (e.g., a corporate intranet), at least parts of the various described systems can be implemented at a strategic location (e.g., a router or a gateway coupled to an administrator's computer console) that can monitor or control the network traffic within the private intranet. In the case of cloud-based application where an organization may rely on Internet-based computer servers for data storage and data processing, at least parts of the various described systems can be implemented at, for example, the cloud-based servers. Additionally, or alternatively, the various described systems can be implemented in a private network but nonetheless receive/monitor events that occur on the cloud-based servers. In some embodiments, the various described systems can monitor a hybrid of both intranet and cloud-based network traffic.

In this description, an "anomaly" is defined as a detected or identified variation from an expected pattern of activity on the part of an entity associated with an information technology environment, which may or may not constitute a threat. This entity activity that departs from expected patterns of activity can be referred to as "anomalous activity." For example, an anomaly may include an event or set of events of possible concern that may be actionable or warrant further investigation. Examples of anomalies include alarms, blacklisted applications/domains/IP addresses, domain name anomalies, excessive uploads or downloads, website attacks, land speed violations, machine generated beacons, login errors, multiple outgoing connections, unusual activity time/sequence/file access/network activity, etc.

An anomaly or a set of anomalies can be evaluated and may result in a determination of a threat indicator or a threat. A threat is an interpretation of one or more anomalies or threat indicators. Threat indicators and threats are escalations of events of concern. Examples of threats include data exfiltration (e.g., by compromised account, by malware, or by a suspicious user or device), public-facing website attack, suspicious behavior by an insider, and breach of a rule (e.g. access by a blacklisted user or an unauthorized file transfer). Like an anomaly, a threat can be associated with one or more entities, including users, devices, and applications.

2.13.1 Security System

Figure 10:
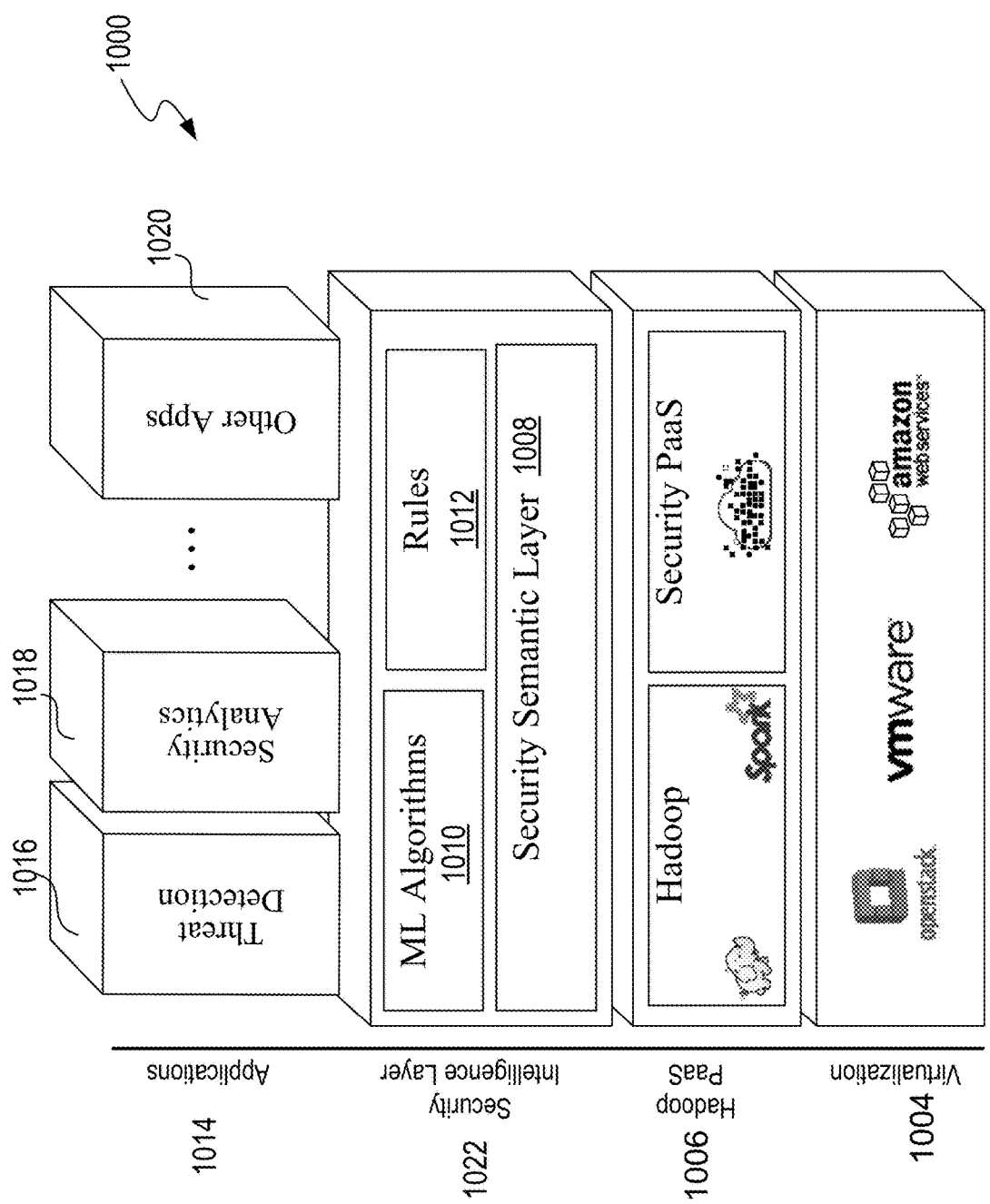
FIG. 10 shows an example of functional layers of a network security system.

FIG. 10 illustrates a high-level view of an architecture 1000 of an example network security system 120 that may be part of the networked computer system 100 described with respect to FIG. 1. Note that in FIG. 1, the network security system 120 is show as separate from data intake and query system 108 for illustrative purposes, however it shall be appreciated that their respective functionalities may be combined into fewer or more systems than as shown. In some embodiments systems 108 and 120 may be implemented at a single computing device or distributed across multiple network-connected computing devices. Similarly, the respective functionalities of systems 108 and 120 may be implemented as one or more services by one or more service providers. These services may be accessible to end-users via any of client applications 110 or host applications 114. For example, in some embodiments, services associated with systems 108 and 120 may be offered by a single service provider as part of an integrated network security platform.

In FIG. 10, a cloud computing infrastructure is shown, represented in part by a virtualization layer 1004. Various cloud computing operating systems or platforms, such as OpenStack™, VMware™, Amazon Web Services™, Google Cloud™, or the like, may be employed in virtualization layer 1004 to create public clouds or private clouds. Generally speaking, these cloud computing operating systems and others permit processing and storage to be implemented on top of a set of shared resources. Among its many advantages, cloud computing permits or facilitates redundancy, fault tolerance, easy scalability, low implementation cost and freedom from geographic restrictions.

Above the virtualization layer 1004, a software framework layer 1006 implements the software services executing on the virtualization layer 1004. Examples of such software services include open-source software such as Apache Hadoop™, Apache Spark™, and Apache Storm™ Apache Hadoop™ is an example of an open-source software framework for distributed storage and distributed processing of very large data sets on computer clusters built from commodity hardware. Apache Storm™ is an example of a distributed real-time computation engine that processes data stream record-by-record. Apache Spark™ is an example of a large-scale data processing engine that collects events together for processing in batches. These are only examples of software that may be employed in implementations of the software framework layer 606.

A security intelligence layer 1022 implements a security semantic layer 1008, a machine learning layer 1010, and a rules layer 1012. The security semantic layer 1008 can perform the extract, transform, and load (ETL) functions that prepare the incoming event data for further processing by downstream consumers. Note that the term ETL here is used in an illustrative sense to facilitate understanding, as the ETL stage described herein may include functionality in addition to or different from traditional ETL techniques. The machine learning layer 1010 represents one of the consumers of the data output of the security semantic layer 1008. The rules layer 1012 represents another possible consumer of data output from the security semantic layer 608. In an example, event data may be received by the security semantic layer 1008, and prepared (or "pre-processed") to be further processed by the machine learning layer 1010 or rules layer 1012.

Figure 11:
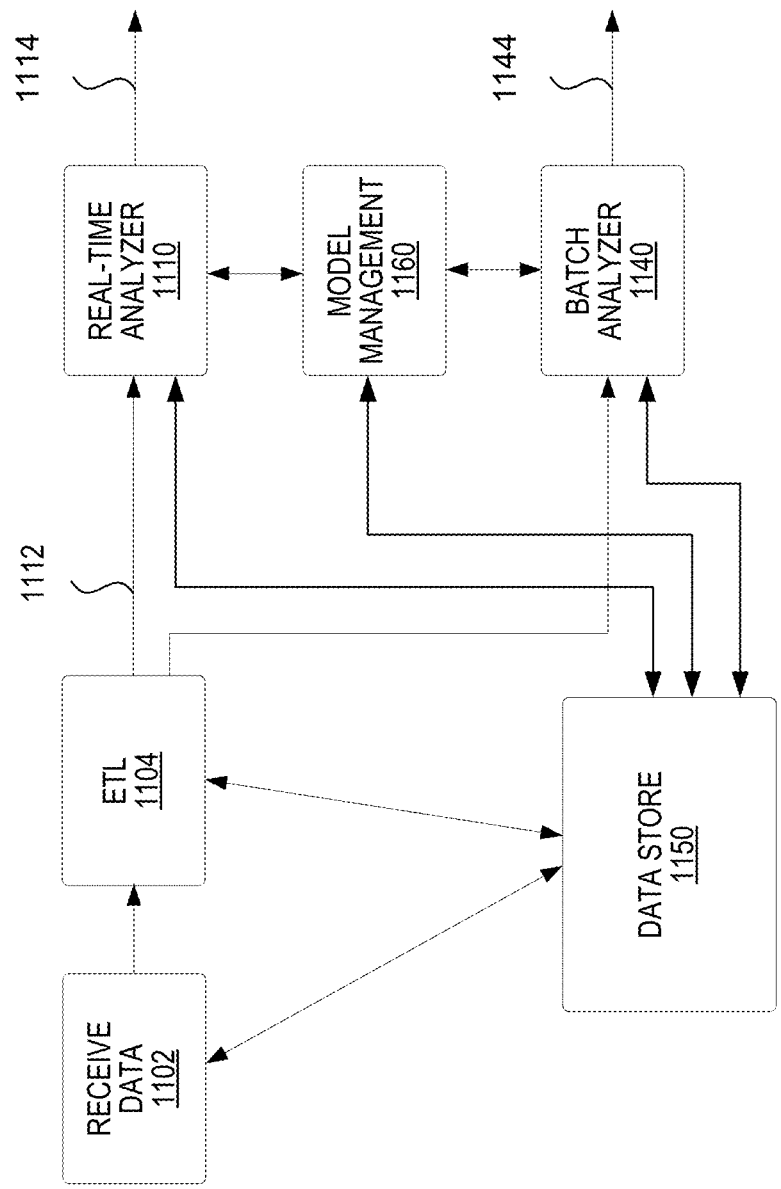
FIG. 11 shows a view of processing of data within an example network security system.

Above the security intelligence layer 1022 is an application layer 1014. The application layer 1014 represents the layer in which application software modules may be implemented. For example, applications part of application layer 1014 may be implemented as one or more client applications 110 or host applications 114 described with respect to FIG. 1. In an example, the output of the rules layer 1012 include anomalies and the output of the machine learning layer 1010 includes anomalies, threat indicators, or threats. This output may be analyzed by the various applications such as a threat detection application 1016, a security analytics application 1018 or other applications 1020. Also, in some embodiments users may provide input via applications in the applications layer to specify rules in the rules layer 1012 or modify machine learning algorithms in the machine learning layer 1010. An example of an applications that may be implemented in the applications layer 1014 is the Splunk® App for Enterprise Security (described below). These layers, modules and their operation will be discussed in greater detail below FIG. 11 shows a conceptual view of the processing of data within network security system 120, according to some embodiments. A receive data block 1102 represents a logical component in which event data and other data are received from one or more data sources. In an example, receive data block 1102 includes application programming interfaces (APIs) for communicating with various data sources. An ETL block 1104 is the data preparation component in which data received from the receive data block 1102 is preprocessed, for example, by adding data or metadata to the event data (a process interchangeably called decoration, enrichment or annotation herein), or otherwise prepared, to allow more effective consumption by downstream data consumers (e.g., machine learning models).

The enriched event data from the ETL block 1104 is then provided to a real-time analyzer 1110 over a real-time processing path 1112 for detecting anomalies, threat indicators and threats. Output 1114 from the real-time analyzer 1110 is provided for action by the human operator, in certain embodiments. It should be noted that the real-time analyzer 1110 operates in real-time by analyzing event data as the event data received by the security system 120.

The event data from the ETL block 1104 is also provided to a batch analyzer 1140 over a batch processing path 1142 for detecting anomalies, threat indicators and threats. However, while the event data is provided to the real-time analyzer 1110 in an unbounded, streaming, record-by-record manner, it is provided to the batch analyzer in the form of batches of event data (i.e., where each batch of event data contains a collection of events that arrived over the batch period). Because the batch analyzer 1140 processes data in batch mode instead of in real-time, in addition to the event data that the real-time analyzer 1110 receives, the batch analyzer 1140 can receive additional historical event data from the security platforms, prior analysis (including the analysis results, the model states, and the supporting data) from the real-time analyzer 1110 (e.g., through a model management component 1160), or prior analysis from other analyzers (real-time or batch) implemented elsewhere in the same or other networks.

Machine learning models are employed to evaluate and analyze data in certain embodiments, that is not necessarily the case in every embodiment. In some cases, the security platform may also adapt more appropriately or more efficiently to the environment by using a combination of other suitable forms of analysis, including rule-based analysis, algorithm-based analysis, statistical analysis, etc. For example, as previously described, in some embodiments, anomalies detected using rule-based analysis can be input and combined with anomalies detected using the real time analyzer 1110 or batch analyzer 1140 to detect threat indicators or threats.

Figure 12:
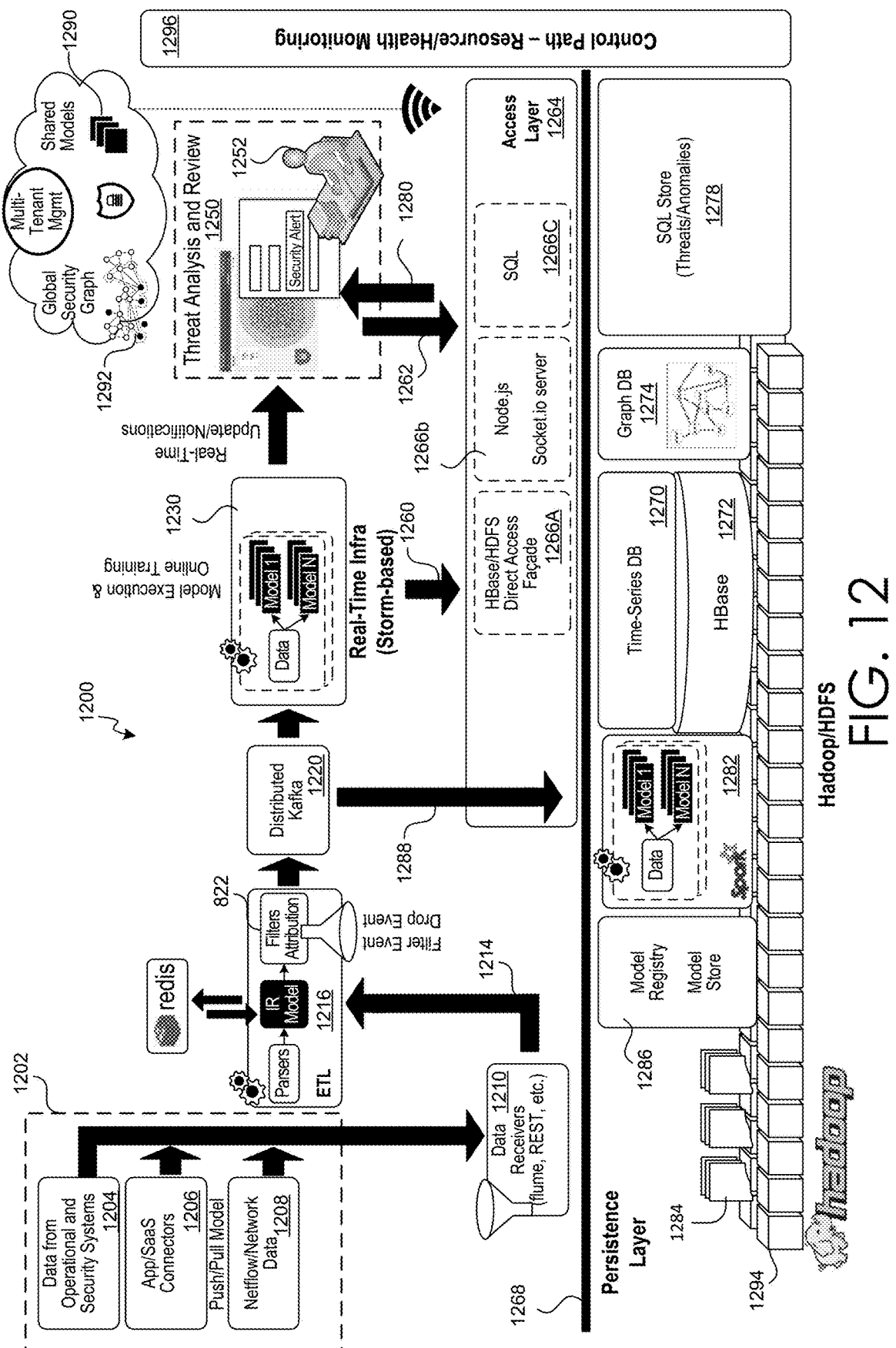
FIG. 12 shows the architecture of an example network security platform.

FIG. 12 illustrates an example of an overall architecture 1200 of a network security system 120. Data sources 1202 represent various data sources that provide data including events (e.g. machine data) and other data, to be analyzed for anomalies and threats. The incoming data can include event data represents events that take place in the network environment. For example, data source 1204 is a source of data pertaining to logs including, for example, user log-ins and other access events. These records may be generated from operational (e.g., network routers) and security systems (e.g., firewalls or security software products). Data source 1206 is a source of data from different types of applications, including software as a service (e.g., Box™). Data source 1206 may use different mechanisms for transmitting the event data, including a push mechanism, a pull mechanism, or a hybrid mechanism. Other data sources which may fall into the data source 1206 category include human resource systems, accounting systems, customer relation databases, and the like. Data source 1208 is a source of network management or analyzer data (e.g., event data related to traffic on a node, a link, a set of nodes, or a set of links). The network management or analyzer data may be obtained from various network operating systems and protocols, such as Cisco Netflow™. The data sources mentioned here are only examples, as other suitable data sources may also be used.

The data sources 1202 provide data to data receivers 1210, which implement various APIs and connectors to receive (or retrieve, depending on the mechanism) the data for the security system 120. The data receivers 1210 may also optionally filter some of the data. For example, to reduce the workload of the security system, a business rule may be set to state that all query events to "www.google.com" should be filtered out as not interesting (e.g., this type of access is determined not to represent any security threat). Technologies employed to implement the data receiver 1210 may include Flume™ and REST™. Flume™ is an open-source distributed service for collecting, aggregating, and moving large amounts of log data. REST™ is an interface for accessing large databases.

The received data can then be provided via a channel 1214 to a semantic processor (or data preparation stage) 1216, which in certain embodiments performs, among other functions, ETL functions. In particular, the semantic processor 1216 may perform parsing of the incoming event data, enrichment (also called decoration or annotation) of the event data with certain information, and optionally, filtering the event data. The semantic processor 1216 introduced here is particularly useful when data received from the various data sources through data receiver 1210 is in different formats, in which case the semantic processor 1216 can prepare the data for more efficient downstream utilization (including, for example, by an event processing engine) while avoiding binding the unstructured data into any particular type of data structure.

A parser in the semantic processor 1216 may parse the various fields of received event data representing an event (e.g., a record related to a log-in event). An identity resolution (IR) component (not shown in FIG. 12) may be optionally provided within the semantic processor 1216 to correlate IP addresses with users, for example. This correlation permits the security system 120 to make certain assumptions about the relationship between an IP address and a user so that, if any event data arrives from that IP address in the future, an assumption regarding which user is associated with that IP address may be made. In some implementations, the event data pertaining to that IP address may be annotated with the identity of the user. Technology used to implement the data preparation functions of the semantic processor 1216 may include Redis™.

An optional filter attribution block 1222 in the semantic processor 1216 removes certain pre-defined events. The attribution filter 1222 in the semantic processor 1216 may further remove events that need not be processed by the security system 120. An example of such an event is an internal data transfer that occurs between two IP addresses as part of a regular file backup. In some embodiments, the functions of semantic processor 1216 are configurable by a configuration file to permit easy updating or adjusting. Examples of configurable properties of the semantic processor 1216 include how to (i) parse events, (ii) correlate between users and IP address, or (iii) correlate between one attribute with another attribute in the event data or an external attribute. The configuration file can also adjust filter parameters and other parameters in the semantic processor 1216.

Data processed by the semantic processor 1216 is sent to a distribution block 1220. The distribution block 1220 can be a messaging mechanism to distribute data to one or both of the real-time processing path and the batch processing path. The real-time processing path is entered via the right-facing arrow extending from the distribution block 1220, whereas the batch processing path is entered via arrow 1288 extending downward from the distribution block 1220.

The real-time processing path includes an analysis module 1230 that receives data from the distribution block 1220. The analysis module 1230 analyzes the data in real-time to detect anomalies, threat indicators, and threats. In certain embodiments, the aforementioned Storm™ platform may be employed to implement the analysis module 1230. In other embodiments, the analysis module could be implemented by using Apache Spark Streaming.

These anomalies, threat indicators and threats may be provided to a user interface (UI) system 1250 for review by a human operator 1252. User interface 1250 may be provided via nay number of applications or other systems. For example, in an embodiment, anomaly, threat, and threat indicator data is output for display via a UI at an enterprise security application (e.g. Splunk® App for Enterprise Security—described below). As an example, a visualization map and a threat alert may be presented to the human operator 1252 for review and possible action. The output of the analysis module 1230 may also automatically trigger actions such as terminating access by a user, terminating file transfer, or any other action that may neutralize the detected threats. In certain embodiments, only notification is provided from the analysis module 1230 to the UI system 1250 for review by the human operator 1252. The event data that underlies those notifications or that gives rise to the detection made by the analysis module 1230 are persistently stored in a database 1278. If the human operator decides to investigate a particular notification, he or she may access from database 1278 the event data (including raw event data and any associated information) that supports the anomalies or threat detection. On the other hand, if the threat detection is a false positive, the human operator 1252 may so indicate upon being presented with the anomaly or the threat. The rejection of the analysis result may also be provided to the database 1278. The operator feedback information (e.g., whether an alarm is accurate or false) may be employed to update the model to improve future evaluation.

Arrow 1260 represents the storing of data supporting the analysis of the anomalies and threats in the real-time path. For example, the anomalies and threats as well as the event data that gives rise to detection of the anomalies and threats may be stored in database 1278 (e.g., an SQL store) using a path represented by the arrow 1260. Additional information such as the version of the models, the identification of the models used, and the time that the detection is made, may also be stored.

The human operator 1252 may review additional information in response to the notification presented by the UI system 1250. The data supporting the analysis of the anomalies and threats may be retrieved from database 1278 via an access layer 1264. Arrow 1262 represents a data retrieval request via the access layer 1264 to one or more of databases 1270, 1272, 1274 and 1278. In some embodiments, event data associated with stored anomalies, threats, and threat indicators may be retrieved from a data intake and security query system 108 in response to a query transmitted to search head 210. The data served up by the databases can be provided to the UI 1250 by means of data pathway 1280. The access layer 1264 includes the APIs for accessing the various databases and the user interfaces in the UI 1250. For example, block 1266A represents the API for accessing the HBase or HDFS (Hadoop File Service) databases. Block 1266B represents the various APIs compatible for accessing servers implementing sockets.io or node.js servers. SQL API 1266C represents the API for accessing the SQL data store 1278, which stores data pertaining to the detected threats and anomalies.

Line 1268 is a conceptual line that separates the batch processing path (below line 868) from the real-time processing path (above line 1268). The infrastructure which may operate in batch mode includes the SQL store 1278 that stores information accessible by scripted query language (SQL), a time series database 1270 that represents the database for storing time stamped data, an HBase 1272 that can be an open-source, distributed, non-relational database system on which databases (e.g., the time serious database 1270) can be implemented, and a GraphDB database 1274 that stores security graphs 1292, which may be based on relationship graphs generated from events. In some embodiments, the GraphDB database 1274 comprises a Neo4j™ graph database.

A security graph, as described further below, is generally a representation of the relationships between entities in the network and any anomalies identified. For example, a security graph may map out the interactions between users, including information regarding which devices are involved, who or what is talking to whom/what, when and how interactions occur, which nodes or entities may be anomalous, and the like. The nodes of the security graph may be annotated with additional data if desired.

A batch analysis module 1282 is the analysis module that processes data in batches. The analysis module 882 may take into account the historical event data stored in databases 1270, 1272, 1274, and 1278 (including "relatively" contemporary event data that is passed from distribution block 1220 to the persistent layer below line 1268 via network channel 1288). In one example, the batch analysis module 1282 may employ third party data 1284. With more time allowance and more data available for analysis, the batch analysis module 1282 may be able to uncover additional anomalies and threats that may not be easily detectable by the real-time analysis module 1230. The model management block 1286 includes a model store and a model registry. The model registry can store model type definitions for machine learning models, and the model store can store model states for machine learning models.

In certain embodiments, the models that are employed for evaluation by one analysis module may be shared with another module. Model state sharing 1290 may improve threat detection by various modules (e.g., two modules belonging to an international network of the same company, but one deployed in Asia and another one deployed in North America; or, one module being used in the real-time path and another in the batch path) as the model state sharing leverages knowledge learned from one module to benefit others. Security graphs 1292 may also be shared among modules, and even across different organizations. For example, activities that give rise to a detection of anomalies or a threat in one enterprise may thus be shared with other enterprises. Hadoop nodes 1294 represent the use of cloud-based big data techniques for implementing the architecture of FIG. 12 to improve scalability as well as the ability to handle a large volume of data. Control path 1296 represents the control software that may be used for monitoring and maintaining the security system 120.

Figure 13:
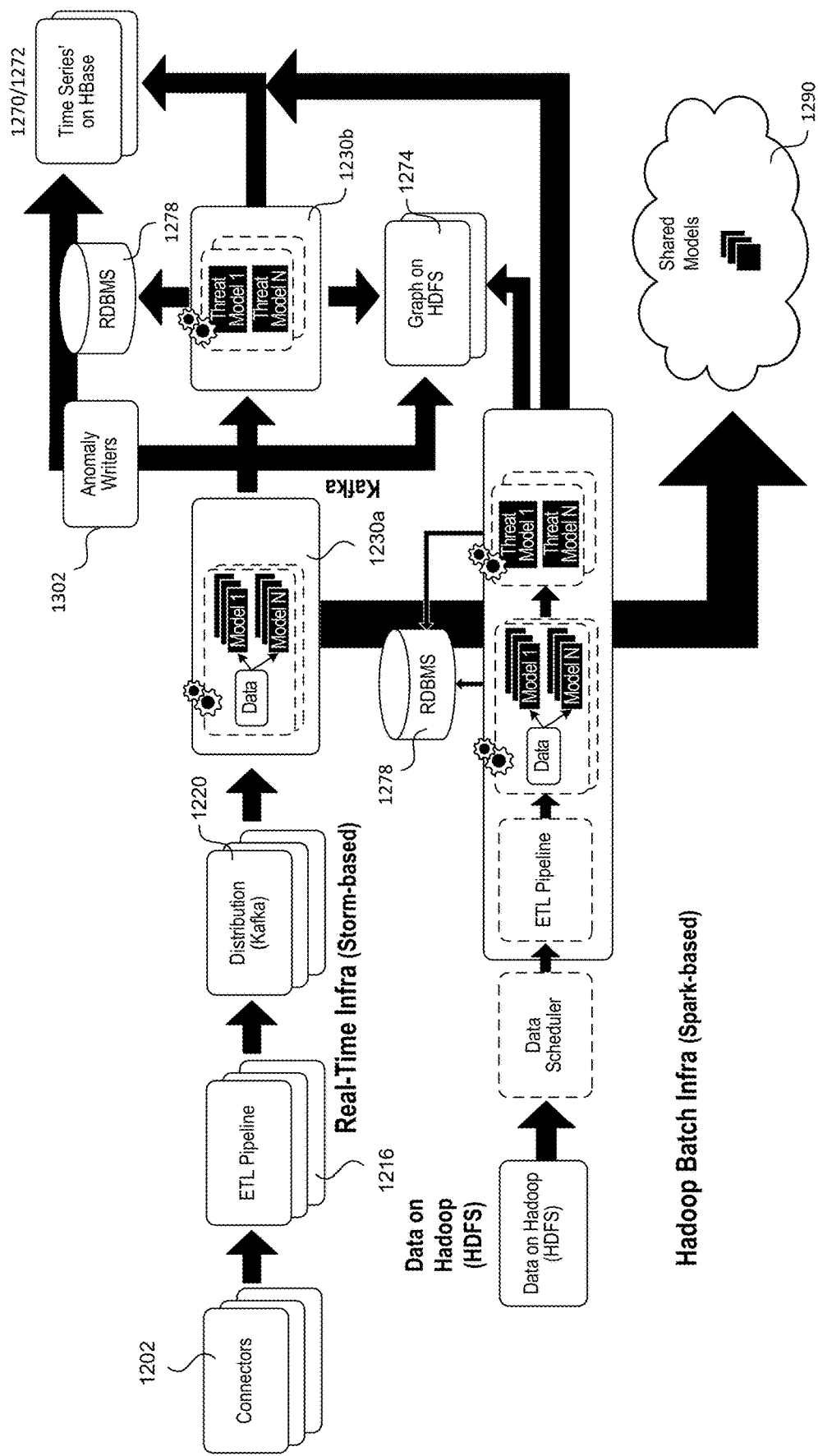
FIG. 13 shows an example implementation of a real-time processing path in an example network security system.

FIG. 13 shows an example implementation of the real-time processing path in greater detail. With reference to both FIGS. 12 and 13, the analysis module 1230 has been expanded as two analysis modules 1230a and 1230b to represent the anomaly detection stage and the threat detection stage, respectively. The analysis module 1230a is responsible for detecting anomalies, and the output of the analysis module 1230a is provided to the analysis module 1230b for detecting threats or threat indicators based on the detected anomalies. In practice, the two stages may be performed by the same module utilizing different models in a staged manner.

The output of analysis module 1230a, representing anomalies detected using machine learning-based models, is provided to an anomaly writer 1302. The anomaly writer 1302 can store the anomalies (e.g., including event data representing an anomalous event and any associated information) in the database 1278. The same anomalies may also be stored in the time series database 1270 and the HBase 1272. The anomalies may also be stored in the graph database 1274. In some embodiments, the anomalies can be stored in graph database 1274 in the form of anomaly nodes in a graph or graphs; specifically, after an event is determined to be anomalous, an event-specific relationship graph associated with that event can be updated (e.g., by the anomaly writer 1302) to include an additional node that represents the anomaly, as discussed further below. Certain embodiments of the security system 120 provide the ability to aggregate, at a specified frequency (e.g., once a day), the individual event-specific relationship graphs from all the processed events in order to compose a composite relationship graph for a given enterprise or associated network. This aforementioned update to an individual event's relationship graph allows the composite relationship graph to include nodes representing anomalies, thereby providing more security-related information. The individual event-specific relationship graph and the composite relationship graph are discussed in more detail below. The information stored may include the anomalies themselves and also relevant information that exists at the time of evaluation. These databases allow rapid reconstruction of the anomalies and all of their supporting data.

The output from the analysis modules 1230b, representing threats, may be stored in the database 1278, the times series database 1270 or the Hbase 1272. As in the case of anomalies, not only are the threats themselves stored, but relevant information that exists at the time of evaluation can also be stored.

Figure 14:
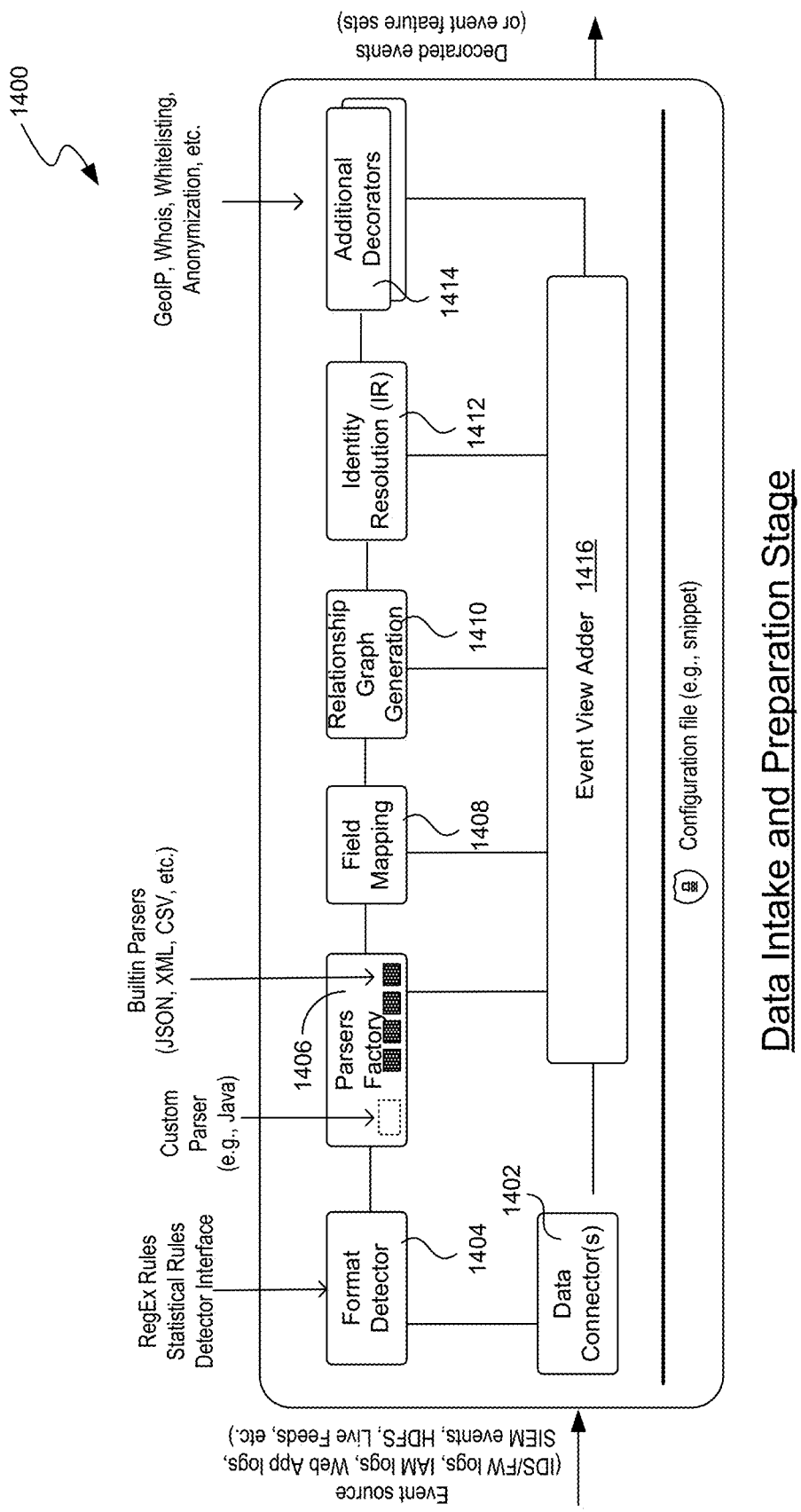
FIG. 14 shows an example implementation of the data intake and preparation stage of the network security platform

FIG. 14 shows an example implementation of a data intake and preparation stage 1400 of the security system 120. The data intake and preparation stage (or engine) 1400 can be an implementation of ETL stage 1216 in FIG. 12. The data intake and preparation stage 1400 can include a number of components that perform a variety of functions disclosed herein. In the example of stage 1400, the data intake and preparation stage of the security system 120 includes a number of data connectors 1402, a format detector 1404, a number of parsers 1406, a field mapper 1408, a relationship graph generator 1410, an identity resolution module 1412, a number of decorators 1414, and event view adder 1416. These components (e.g., sets of instructions) need not be implemented as separate software programs, procedures or modules, and thus various subsets of these components may be combined or otherwise rearranged in various embodiments. Also, the components shown in FIG. 14 are only one example of the data intake and preparation stage components that can be used by the security system 120; the data intake and preparation stage could have more or fewer components than shown, or a different configuration of components.

The various components shown in FIG. 14 can be implemented by using hardware, software, firmware or a combination thereof, including one or more signal processing or application specific integrated circuits. The components in the stage 1400 are shown arranged in a way that facilitates the discussion herein; therefore, any perceivable sequence in the stage 1400 is merely an example and can be rearranged. Any step in the stage 1400 may be performed out-of-sequence or in parallel to the extent that such rearrangement does not violate the logic dependency of the steps. One or more steps described for the stage 1400 may be optional, depending on the deployed environment. The data output from the data intake and preparation stage 1400 can also be referred to herein as "decorated events" or "event feature sets." A decorated event includes the raw machine data associated with an event, plus any decoration, enrichment, information, or any other suitable intelligence that is generated based upon or extracted from the event during the data intake and preparation stage. In some embodiments, because of the computationally intensive processes that the data intake and preparation stage may perform, the data intake and preparation engine may be implemented separately from the rest of the stages in the security system 120, for example, on a standalone server or on dedicated nodes in a distributed computer cluster.

Various data connectors 1402 can be employed by the security system 120 (e.g., at the data intake stage) to support various data sources. Embodiments of the data connectors 1402 can provide support for accessing/receiving indexed data, unindexed data (e.g., data directly from a machine at which an event occurs), data from a third-party provider (e.g., threat feeds such as Norse™, or messages from AWS™ CloudTrail™), or data from a distributed file system (e.g., HDFS™). Hence, the data connectors 1402 enable the security system 120 to obtain events (e.g. containing machine data) from various different data sources. Some example categories of such data sources include:

(1) Identity/Authentication: e.g., active directory/domain controller, single sign-on (SSO), human resource management system (HRMS), virtual private network (VPN), domain name system (DNS), or dynamic host configuration protocol (DHCP);

(2) Activity: e.g., web gateway, proxy server, firewall, Netflow™, data loss prevention (DLP) server, file server, or file host activity logs;

(3) Security Products: e.g., endpoint security, intrusion prevention system, intrusion detection system, or antivirus;

(4) Software as a Service (SaaS) or Mobile: e.g., AWS™ CloudTrail™, SaaS applications such as Box™ or Dropbox™, or directly from mobile devices; and (5) External Threat Feeds: e.g., Norce™, TreatStream™, Financial Services Information Sharing and Analysis Center (FS-ISAC)™, or third-party blacklisted IP/domains.

Depending on the embodiment, external threat feeds may directly feed to the security system 120, or indirectly through one or more security products that may be coexisting in the environment within which the security system 120 is deployed. As used herein, the term "heterogeneous event" refers to the notion that incoming events may have different characteristics, such as different data formats, different levels of information, and so forth. Heterogeneous events can be a result of the events originating from different machines, different types of machines (e.g., a firewall versus a DHCP server), being in a different data format, or a combination thereof.

The data connectors 1402 can implement various techniques to obtain machine data from the data sources. Depending on the data source, the data connectors 1402 can adopt a pull mechanism, a push mechanism, or a hybrid mechanism. For those data sources (e.g., a query-based system, such as Splunk®) that use a pull mechanism, the data connectors 1402 actively collect the data by issuing suitable instructions to the data sources to grab data from those data sources into the security system 120. For those data sources (e.g., ArcSignt™) that use a push mechanism, the data connectors 1402 can identify an input (e.g., a port) for the data sources to push the data into the system. The data connectors 1402 can also interact with a data source (e.g., Box™) that adopts a hybrid mechanism. In one embodiment of the data connectors 1402 for such hybrid mechanism, the data connectors 1402 can receive from the data source a notification of a new event, acknowledges the notification, and at a suitable time communicate with the data source to receive the event.

For those data connectors 1402 that may issue queries, the queries can be specifically tailored for real-time (e.g., in terms of seconds or less) performance. For example, some queries limit the amount of the anticipated data by limiting the query to a certain type of data, such as authentication data or firewall related data, which tends to be more relevant to security-related issues. Additionally or alternatively, some queries may place a time constraint on the time at which an event takes place.

Moreover, in some examples, the data connectors 1402 can obtain data from a distributed file system such as HDFS™. Because such a system may include a large amount of data (e.g., terabytes of data or more), it is preferable to reduce data movement so as to conserve network resources. Therefore, some embodiments of the data connectors 1402 can generate a number of data processing jobs, send the jobs to a job processing cluster that is coupled to the distributed file system, and receive the results from the job processing cluster. For example, the data connectors 1402 can generate MapReduce™ jobs, and issue those jobs to a job processing cluster (e.g., YARN™) that is coupled to the distributed file system. The output of the job processing cluster is received back into the security system 120 for further analysis, but in that case, no or very little raw machine data is moved across the network. The data is left in the distributed file system. In some examples, the generated jobs are user behavior analysis related.

Optionally, after the data connectors 1402 obtain/receive the data, if the data format of the data is unknown (e.g., the administrator has not specified how to parse the data), then the format detector 1404 can be used to detect the data format of the input data. For example, the format detector 1404 can perform pattern matching for all known formats to determine the most likely format of a particular event data. In some instances, the format detector 1404 can embed regular expression rules or statistical rules in performing the format detection. Some examples of the format detector 1404 employ a number of heuristics that can use a hierarchical way to perform pattern matching on complex data format, such as an event that may have been generated or processed by multiple intermediate machines. In one example, the format detector 1404 is configured to recursively perform data format pattern matching by stripping away a format that has been identified (e.g., by stripping away a known event header, like a Syslog header) in order to detect a format within a format.

However, using the format detector 1404 to determine what data format the input data may be at run time may be a time- and resource-consuming process. At least in the cybersecurity space, it is typical that the formats of the machine data are known in advance (e.g., an administrator would know what kind of firewall is deployed in the environment). Therefore, as long as the data source and the data format are specified, the data intake and preparation stage can map the data according to known data formats of a particular data source, without the need of performing data format detection. In certain embodiments, the security system 120 can prompt (e.g., through a user interface) the administrator to specify the data format or the type of machine(s) the environment includes, and can automatically configure, for example, the parsers 1406 in the data intake and preparation stage for such machines.

Further, the security system 120 provides a way to easily supporting new data format. Some embodiments provide that the administrator can create a new configuration file (e.g., a configuration "snippet") to customize the data intake and preparation stage for the environment. For example, for a particular data source, the configuration file can identify, in the received data representing an event, which field represents a token that may correspond to a timestamp, an entity, an action, an IP address, an event identifier (ID), a process ID, a type of the event, a type of machine that generates the event, and so forth. In other examples (e.g., if a new data format is binary), then the security system 120 allows an administrator to leverage an existing tokenizer/parser by changing the configuration file, or to choose to implement a new, customized parser or tokenizer.

In a number of implementations, through the configuration file (e.g., snippet), the administrator can also identify, for example, field mappings, decorators, parameters for identity resolution (IR), or other parameters of the data intake and preparation stage. The configuration snippet can be monitored and executed by the data intake and preparation engine on the fly to allow an administrator to change how various components in the data intake and preparation engine functions without the need to recompile codes or restart the security system 120.

After receiving data by the data connectors 1402, the parsers 1406 parse the data according to a predetermined data format. The data format can be specified in, for example, the configuration file. The data format can be used for several functions. The data format can enable the parser to tokenize the data into tokens, which may be keys, values, or more commonly, key-value pairs. Examples of supported data format include machine data output as a result of active-directory activity, proxy activity, authentication activity, firewall activity, web gateway activity, virtual private network (VPN) connection activity, an intrusion detection system activity, network traffic analyzer activity, or malware detection activity.

Each parser can implement a set of steps. Depending on what type of data the data intake and preparation stage is currently processing, in some embodiments, the initial steps can include using regular expression to perform extraction or stripping. For example, if the data is a system log (syslog), then a syslog regular expression can be first used to strip away the packet of syslog (i.e., the outer shell of syslog) to reveal the event message inside. Then, the parser can tokenize the event data into a number of tokens for further processing.

The field mapper 1408 can map the extracted tokens to one or more corresponding fields with predetermined meanings. For example, the data format can assist the field mapper 1408 to identify and extract entities from the tokens, and more specifically, the data format can specify which of the extracted tokens represent entities. In other words, the field mapper 1408 can perform entity extraction in accordance with those embodiments that can identify which tokens represent entities. An entity can include, for example, a user, a device, an application, a session, a uniform resource locator (URL), or a threat. Additionally, the data format can also specify which tokens represent actions that have taken place in the event. Although not necessarily, an action can be performed by one entity with respect to another entity; examples of an action include use, visit, connect to, log in, log out, and so forth. In yet another example, the filed mapper 1108 can map a value extracted to a key to create a key-value pair, based on the predetermined data format.

The entity extraction performed by the field mapper 1404 enables the security system 120 to gain potential insight on the environment in which the security system is operating, for example, who the users are, how many users there may be in the system, how many applications that are actually being used by the users, or how many devices there are in the environment.

2.13.2 Enterprise Security Application

The SPLUNK® ENTERPRISE platform provides various schemas, dashboards and visualizations that simplify developers' task to create applications with additional capabilities. One such application is the SPLUNK® APP FOR ENTERPRISE SECURITY, which performs monitoring and alerting operations and includes analytics to facilitate identifying both known and unknown security threats based on large volumes of data stored by the SPLUNK® ENTERPRISE system. SPLUNK® APP FOR ENTERPRISE SECURITY provides the security practitioner with visibility into security-relevant threats found in the enterprise infrastructure by capturing, monitoring, and reporting on data from enterprise security devices, systems, and applications. Through the use of SPLUNK® ENTERPRISE searching and reporting capabilities, SPLUNK® APP FOR ENTERPRISE SECURITY provides a top-down and bottom-up view of an organization's security posture.

The SPLUNK® APP FOR ENTERPRISE SECURITY leverages SPLUNK® ENTERPRISE search-time normalization techniques, saved searches, and correlation searches to provide visibility into security-relevant threats and activity and generate notable events for tracking. The App enables the security practitioner to investigate and explore the data to find new or unknown threats that do not follow signature-based patterns.

Conventional Security Information and Event Management (SIEM) systems that lack the infrastructure to effectively store and analyze large volumes of security-related data. Traditional SIEM systems typically use fixed schemas to extract data from pre-defined security-related fields at data ingestion time and storing the extracted data in a relational database. This traditional data extraction process (and associated reduction in data size) that occurs at data ingestion time inevitably hampers future incident investigations that may need original data to determine the root cause of a security issue, or to detect the onset of an impending security threat.

In contrast, the SPLUNK® APP FOR ENTERPRISE SECURITY system stores large volumes of minimally processed security-related data at ingestion time for later retrieval and analysis at search time when a live security threat is being investigated. To facilitate this data retrieval process, the SPLUNK® APP FOR ENTERPRISE SECURITY provides pre-specified schemas for extracting relevant values from the different types of security-related event data and enables a user to define such schemas.

The SPLUNK® APP FOR ENTERPRISE SECURITY can process many types of security-related information. In general, this security-related information can include any information that can be used to identify security threats. For example, the security-related information can include network-related information, such as IP addresses, domain names, asset identifiers, network traffic volume, uniform resource locator strings, and source addresses. The process of detecting security threats for network-related information is further described in U.S. Pat. No. 8,826,434, entitled "SECURITY THREAT DETECTION BASED ON INDICATIONS IN BIG DATA OF ACCESS TO NEWLY REGISTERED DOMAINS", issued on 2 Sep. 2014, U.S. Pat. No. 9,215,240, entitled "INVESTIGATIVE AND DYNAMIC DETECTION OF POTENTIAL SECURITY-THREAT INDICATORS FROM EVENTS IN BIG DATA", issued on 15 Dec. 2015, U.S. Pat. No. 9,173,801, entitled "GRAPHIC DISPLAY OF SECURITY THREATS BASED ON INDICATIONS OF ACCESS TO NEWLY REGISTERED DOMAINS", issued on 3 Nov. 2015, U.S. Pat. No. 9,248,068, entitled "SECURITY THREAT DETECTION OF NEWLY REGISTERED DOMAINS", issued on 2 Feb. 2016, U.S. Pat. No. 9,426,172, entitled "SECURITY THREAT DETECTION USING DOMAIN NAME ACCESSES", issued on 23 Aug. 2016, and U.S. Pat. No. 9,432,396, entitled "SECURITY THREAT DETECTION USING DOMAIN NAME REGISTRATIONS", issued on 30 Aug. 2016, each of which is hereby incorporated by reference in its entirety for all purposes. Security-related information can also include malware infection data and system configuration information, as well as access control information, such as login/logout information and access failure notifications. The security-related information can originate from various sources within a data center, such as hosts, virtual machines, storage devices and sensors. The security-related information can also originate from various sources in a network, such as routers, switches, email servers, proxy servers, gateways, firewalls and intrusion-detection systems.

During operation, the SPLUNK® APP FOR ENTERPRISE SECURITY facilitates detecting "notable events" that are likely to indicate a security threat. These notable events can be detected in a number of ways: (1) a user can notice a correlation in the data and can manually identify a corresponding group of one or more events as "notable;" or (2) a user can define a "correlation search" specifying criteria for a notable event, and every time one or more events satisfy the criteria, the application can indicate that the one or more events are notable. A user can alternatively select a pre-defined correlation search provided by the application. Note that correlation searches can be run continuously or at regular intervals (e.g., every hour) to search for notable events. Upon detection, notable events can be stored in a dedicated "notable events index," which can be subsequently accessed to generate various visualizations containing security-related information. Also, alerts can be generated to notify system operators when important notable events are discovered.

Figure 15A:
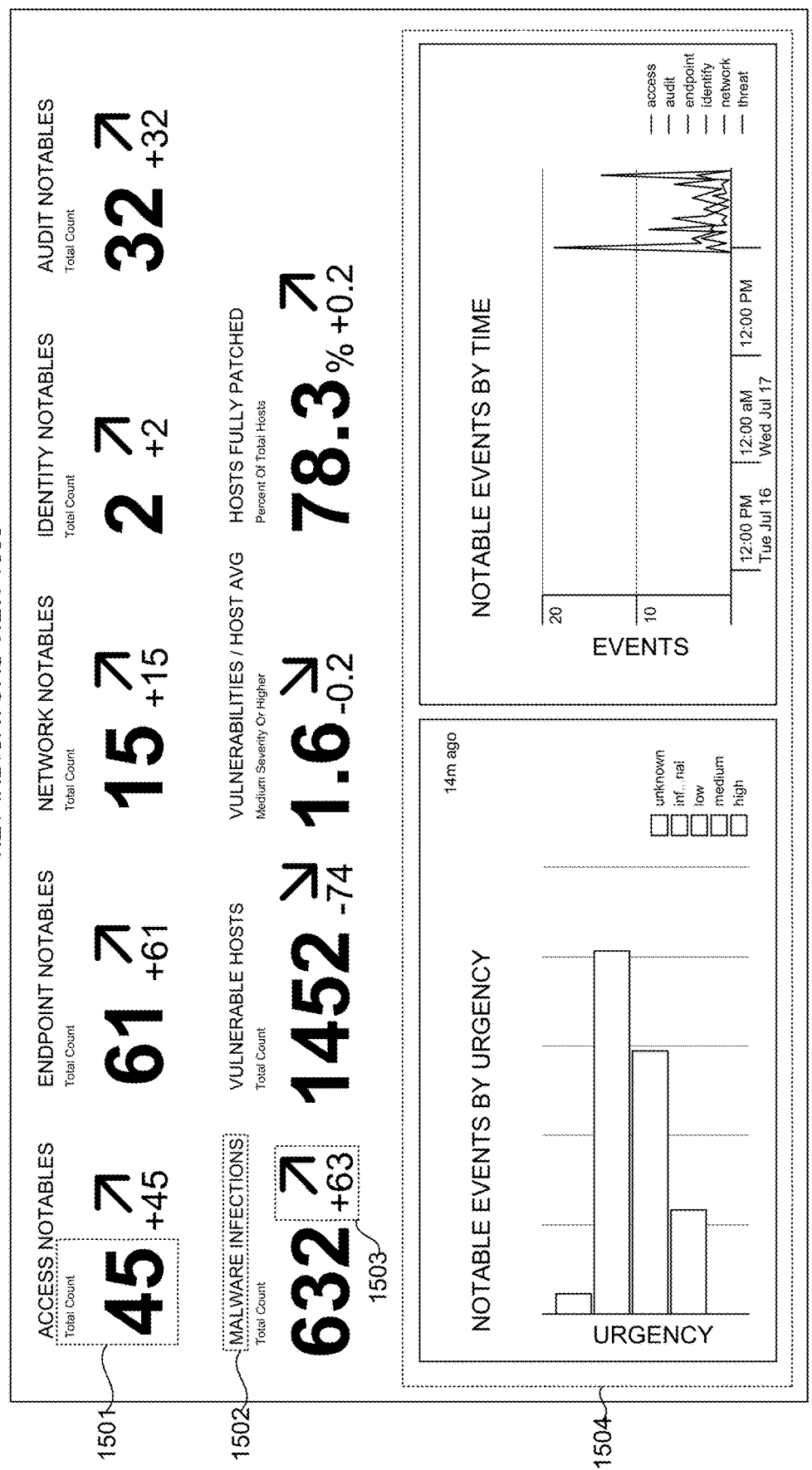
FIG. 15A illustrates a key indicators view in accordance with the disclosed embodiments.
Figure 15B:
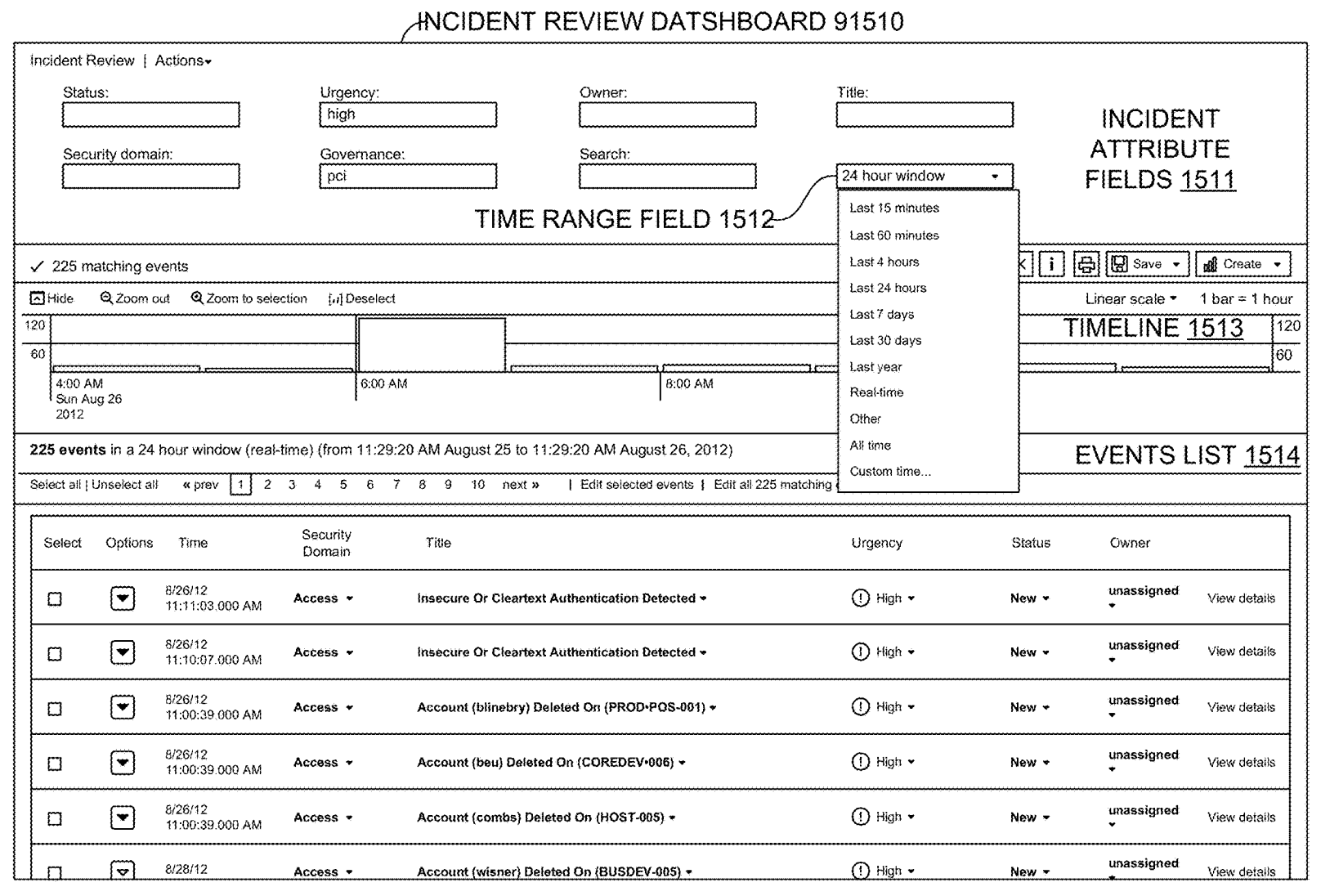

The SPLUNK® APP FOR ENTERPRISE SECURITY provides various visualizations to aid in discovering security threats, such as a "key indicators view" that enables a user to view security metrics, such as counts of different types of notable events. For example, FIG. 15A illustrates an example key indicators view 1500 that comprises a dashboard, which can display a value 1501, for various security-related metrics, such as malware infections 1502. It can also display a change in a metric value 1503, which indicates that the number of malware infections increased by 63 during the preceding interval. Key indicators view 1500 additionally displays a histogram panel 1504 that displays a histogram of notable events organized by urgency values, and a histogram of notable events organized by time intervals. This key indicators view is described in further detail in pending U.S. patent application Ser. No. 13/956,338, entitled "KEY INDICATORS VIEW", filed on 31 Jul. 2013, and which is hereby incorporated by reference in its entirety for all purposes. These visualizations can also include an "incident review dashboard" that enables a user to view and act on "notable events." These notable events can include: (1) a single event of high importance, such as any activity from a known web attacker; or (2) multiple events that collectively warrant review, such as a large number of authentication failures on a host followed by a successful authentication. For example, FIG. 15B illustrates an example incident review dashboard 1510 that includes a set of incident attribute fields 1511 that, for example, enables a user to specify a time range field 1512 for the displayed events. It also includes a timeline 1513 that graphically illustrates the number of incidents that occurred in time intervals over the selected time range. It additionally displays an events list 1514 that enables a user to view a list of all of the notable events that match the criteria in the incident attributes fields 1511. To facilitate identifying patterns among the notable events, each notable event can be associated with an urgency value (e.g., low, medium, high, critical), which is indicated in the incident review dashboard. The urgency value for a detected event can be determined based on the severity of the event and the priority of the system component associated with the event.

2.13.3. IT Service Monitoring

As previously mentioned, the SPLUNK® ENTERPRISE platform provides various schemas, dashboards and visualizations that make it easy for developers to create applications to provide additional capabilities. One such application is SPLUNK® IT SERVICE INTELLIGENCE™, which performs monitoring and alerting operations. It also includes analytics to help an analyst diagnose the root cause of performance problems based on large volumes of data stored by the SPLUNK® ENTERPRISE system as correlated to the various services an IT organization provides (a service-centric view). This differs significantly from conventional IT monitoring systems that lack the infrastructure to effectively store and analyze large volumes of service-related event data. Traditional service monitoring systems typically use fixed schemas to extract data from pre-defined fields at data ingestion time, wherein the extracted data is typically stored in a relational database. This data extraction process and associated reduction in data content that occurs at data ingestion time inevitably hampers future investigations, when all of the original data may be needed to determine the root cause of or contributing factors to a service issue.

In contrast, a SPLUNK® IT SERVICE INTELLIGENCE™ system stores large volumes of minimally-processed service-related data at ingestion time for later retrieval and analysis at search time, to perform regular monitoring, or to investigate a service issue. To facilitate this data retrieval process, SPLUNK® IT SERVICE INTELLIGENCE™ enables a user to define an IT operations infrastructure from the perspective of the services it provides. In this service-centric approach, a service such as corporate e-mail may be defined in terms of the entities employed to provide the service, such as host machines and network devices. Each entity is defined to include information for identifying all of the event data that pertains to the entity, whether produced by the entity itself or by another machine, and considering the many various ways the entity may be identified in raw machine data (such as by a URL, an IP address, or machine name). The service and entity definitions can organize event data around a service so that all of the event data pertaining to that service can be easily identified. This capability provides a foundation for the implementation of Key Performance Indicators.

One or more Key Performance Indicators (KPIs) are defined for a service within the SPLUNK® IT SERVICE INTELLIGENCE™ application. Each KPI measures an aspect of service performance at a point in time or over a period of time (aspect KPI's). Each KPI is defined by a search query that derives a KPI value from the machine data of events associated with the entities that provide the service. Information in the entity definitions may be used to identify the appropriate events at the time a KPI is defined or whenever a KPI value is being determined. The KPI values derived over time may be stored to build a valuable repository of current and historical performance information for the service, and the repository, itself, may be subject to search query processing. Aggregate KPIs may be defined to provide a measure of service performance calculated from a set of service aspect KPI values; this aggregate may even be taken across defined timeframes and/or across multiple services. A particular service may have an aggregate KPI derived from substantially all of the aspect KPI's of the service to indicate an overall health score for the service.

SPLUNK® IT SERVICE INTELLIGENCE™ facilitates the production of meaningful aggregate KPI's through a system of KPI thresholds and state values. Different KPI definitions may produce values in different ranges, and so the same value may mean something very different from one KPI definition to another. To address this, SPLUNK® IT SERVICE INTELLIGENCE™ implements a translation of individual KPI values to a common domain of "state" values. For example, a KPI range of values may be 1-100, or 50-275, while values in the state domain may be critical,' warning,' normal,' and informational'. Thresholds associated with a particular KPI definition determine ranges of values for that KPI that correspond to the various state values. In one case, KPI values 95-100 may be set to correspond to 'critical' in the state domain. KPI values from disparate KPI's can be processed uniformly once they are translated into the common state values using the thresholds. For example, "normal 80% of the time" can be applied across various KPI's. To provide meaningful aggregate KPI's, a weighting value can be assigned to each KPI so that its influence on the calculated aggregate KPI value is increased or decreased relative to the other KPI's.

One service in an IT environment often impacts, or is impacted by, another service. SPLUNK® IT SERVICE INTELLIGENCE™ can reflect these dependencies. For example, a dependency relationship between a corporate e-mail service and a centralized authentication service can be reflected by recording an association between their respective service definitions. The recorded associations establish a service dependency topology that informs the data or selection options presented in a GUI, for example.

(The service dependency topology is like a "map" showing how services are connected based on their dependencies.) The service topology may itself be depicted in a GUI and may be interactive to allow navigation among related services.

Entity definitions in SPLUNK® IT SERVICE INTELLIGENCE™ can include informational fields that can serve as metadata, implied data fields, or attributed data fields for the events identified by other aspects of the entity definition. Entity definitions in SPLUNK® IT SERVICE INTELLIGENCE™ can also be created and updated by an import of tabular data (as represented in a CSV, another delimited file, or a search query result set). The import may be GUI-mediated or processed using import parameters from a GUI-based import definition process. Entity definitions in SPLUNK® IT SERVICE INTELLIGENCE™ can also be associated with a service by means of a service definition rule. Processing the rule results in the matching entity definitions being associated with the service definition. The rule can be processed at creation time, and thereafter on a scheduled or on-demand basis. This allows dynamic, rule-based updates to the service definition.

During operation, SPLUNK® IT SERVICE INTELLIGENCE™ can recognize so-called "notable events" that may indicate a service performance problem or other situation of interest. These notable events can be recognized by a "correlation search" specifying trigger criteria for a notable event: every time KPI values satisfy the criteria, the application indicates a notable event. A severity level for the notable event may also be specified. Furthermore, when trigger criteria are satisfied, the correlation search may additionally or alternatively cause a service ticket to be created in an IT service management (ITSM) system, such as a systems available from ServiceNow, Inc., of Santa Clara, Calif.

SPLUNK® IT SERVICE INTELLIGENCE™ provides various visualizations built on its service-centric organization of event data and the KPI values generated and collected. Visualizations can be particularly useful for monitoring or investigating service performance. SPLUNK® IT SERVICE INTELLIGENCE™ provides a service monitoring interface suitable as the home page for ongoing IT service monitoring. The interface is appropriate for settings such as desktop use or for a wall-mounted display in a network operations center (NOC). The interface may prominently display a services health section with tiles for the aggregate KPI's indicating overall health for defined services and a general KPI section with tiles for KPI's related to individual service aspects. These tiles may display KPI information in a variety of ways, such as by being colored and ordered according to factors like the KPI state value. They also can be interactive and navigate to visualizations of more detailed KPI information.

SPLUNK® IT SERVICE INTELLIGENCE™ provides a service-monitoring dashboard visualization based on a user-defined template. The template can include user-selectable widgets of varying types and styles to display KPI information. The content and the appearance of widgets can respond dynamically to changing KPI information. The KPI widgets can appear in conjunction with a background image, user drawing objects, or other visual elements, that depict the IT operations environment, for example. The KPI widgets or other GUI elements can be interactive so as to provide navigation to visualizations of more detailed KPI information.

SPLUNK® IT SERVICE INTELLIGENCE™ provides a visualization showing detailed time-series information for multiple KPI's in parallel graph lanes. The length of each lane can correspond to a uniform time range, while the width of each lane may be automatically adjusted to fit the displayed KPI data. Data within each lane may be displayed in a user selectable style, such as a line, area, or bar chart. During operation a user may select a position in the time range of the graph lanes to activate lane inspection at that point in time. Lane inspection may display an indicator for the selected time across the graph lanes and display the KPI value associated with that point in time for each of the graph lanes. The visualization may also provide navigation to an interface for defining a correlation search, using information from the visualization to pre-populate the definition.

SPLUNK® IT SERVICE INTELLIGENCE™ provides a visualization for incident review showing detailed information for notable events. The incident review visualization may also show summary information for the notable events over a time frame, such as an indication of the number of notable events at each of a number of severity levels. The severity level display may be presented as a rainbow chart with the warmest color associated with the highest severity classification. The incident review visualization may also show summary information for the notable events over a time frame, such as the number of notable events occurring within segments of the time frame. The incident review visualization may display a list of notable events within the time frame ordered by any number of factors, such as time or severity. The selection of a particular notable event from the list may display detailed information about that notable event, including an identification of the correlation search that generated the notable event.

SPLUNK® IT SERVICE INTELLIGENCE™ provides pre-specified schemas for extracting relevant values from the different types of service-related event data. It also enables a user to define such schemas.

2.14. Computer Processing Systems

Techniques described in this disclosure can be implemented using one or more conventional physical processing devices. FIG. 16 is a block diagram showing an example of such a processing device, e.g., a computer system 1600. Multiple instances of such a computer system may be used to implement any of the aforementioned systems including networked computer system 100.

In an illustrative embodiment, computer system 1600 includes one or more processor(s) 1610, memory 1620, one or more input/output (I/O) devices 1630, a network adapter 1640, and a storage adapter 1650, all interconnected by an interconnect 1660. Memory 1620 includes storage locations that are addressable by processor(s) 1610 and adapters 1640 and 1650 for storing software program code and data structures associated with the techniques introduced here. Memory 1620 may include multiple physically distinct memory devices, which may be all of the same type or of different types (e.g., volatile memory such as SRAM or DRAM, non-volatile memory such as flash, etc.). Processor(s) 1610 and adapters 1640 and 1650 may, in turn, include processing elements or logic circuitry configured to execute the software code and manipulate the data structures. It will be apparent to those skilled in the art that other processing and memory implementations, including various machine-readable storage media, may be used for storing and executing program instructions pertaining to the techniques introduced here.

Network adapter 1640 includes one or more ports to couple computer system 1600 with one or more other devices over one or more point-to-point links, local area networks (LANs), wide area networks (WANs), the global Internet, virtual private networks (VPNs) implemented over a public network, or the like. Network adapter 1640 can include the mechanical components and electrical circuitry needed to connect storage server 1600 to a network. One or more systems can communicate with other systems over the network by exchanging packets or frames of data according to pre-defined protocols, such as TCP/IP.

Storage adapter 1650 interfaces with an operating system running on processor(s) 1610 to access information on attached storage devices. The information may be stored on any type of attached array of writable storage media, such as hard disk drives, magnetic tape, optical disk, flash memory, solid-state drives, RAM, MEMs or any other similar media adapted to store information. Storage adapter 1650 includes a plurality of ports having I/O interface circuitry that couples with disks or other storage related devices over an I/O interconnect arrangement.

Embodiments of the techniques introduced here include various steps and operations, which have been described above. A variety of these steps and operations may be performed by hardware components or may be embodied in machine-executable instructions, which may be used to cause one or more general-purpose or special-purpose processors programmed with the instructions to perform the steps. Alternatively, the steps may be performed by a combination of hardware, software, or firmware.

Embodiments of the techniques introduced here may be implemented, at least in part, by a computer program product which may include a non-transitory machine-readable medium having stored thereon instructions that may be used to program/configure a computer or other electronic device to perform some or all of the operations described above. The machine-readable medium may include, for example, magnetic hard disk drives, compact disc read-only memories (CD-ROMs), magneto-optical disks, floppy disks, ROMs, RAMs, various forms of erasable programmable read-only memories (EPROMs), magnetic or optical cards, flash memory, or other type of machine-readable medium suitable for storing electronic instructions. Moreover, embodiments of the present invention may also be downloaded as a computer program product, wherein the program may be transferred from a remote computer to a requesting computer by way of data signals embodied in a carrier wave or other propagation medium via a communication link.

3.0 Entity Fingerprinting

Figure 17:
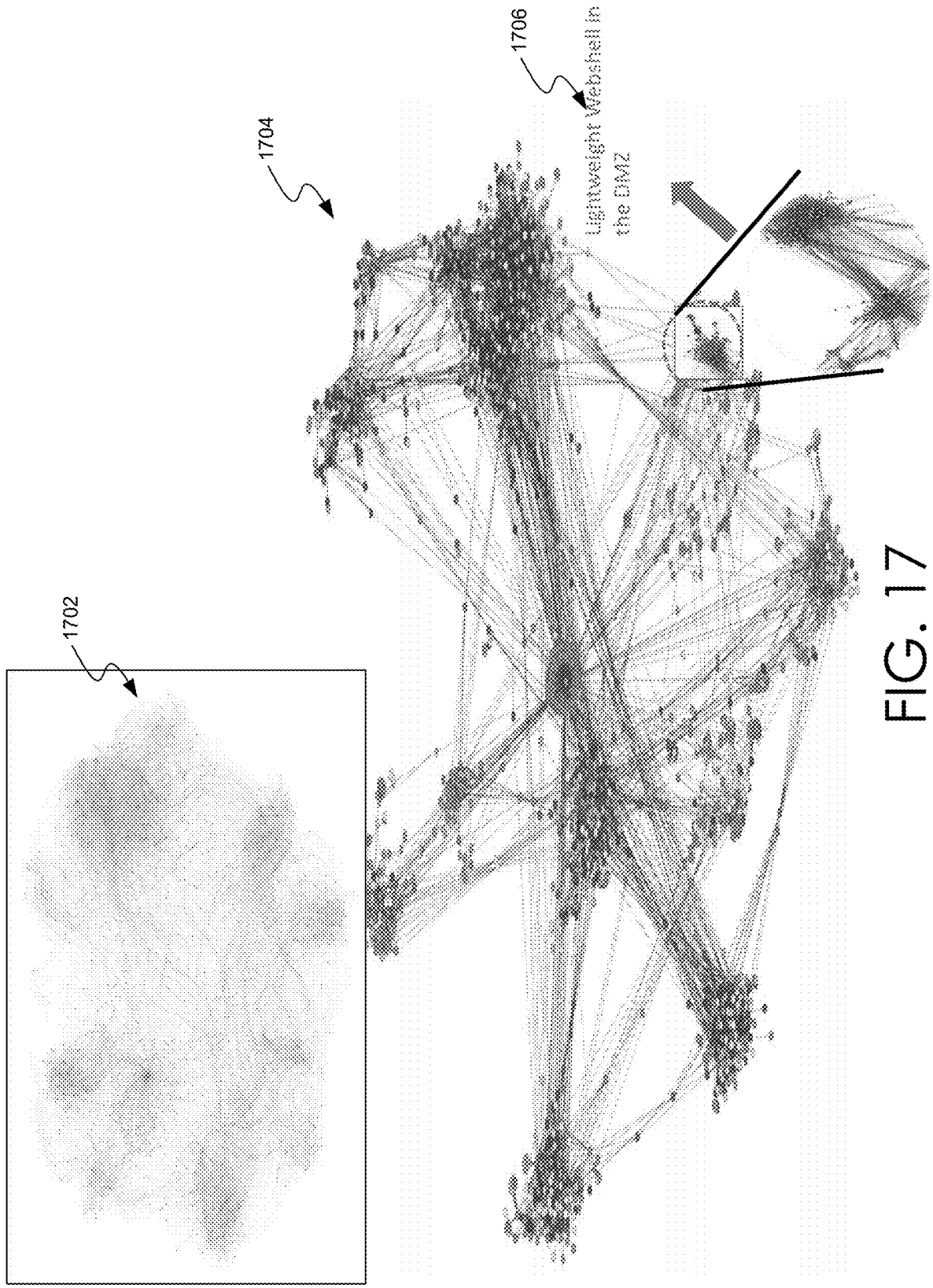
FIG. 17 shows a high level representation of interconnected entities communicating in an example IT environment.

As previously discussed, an entity fingerprinting process can be employed to address issues related to shadow IT. Shadow IT refers to situations where information technology systems and solutions are built and used inside organizations without explicit organizational approval. The embodiments disclosed here can analyze events (e.g., containing machine data) reflecting activity in an IT environment to identify entities associated with the activity, information about the entities, and the logical structure (i.e., topology) of the IT environment in which they are operating. Once entities are profiled and the topology of the IT environment is discovered, this information can be modeled and used to detect anomalous communications activity within the IT environment. For example, FIG. 17 shows a high level representation 1702 of many interconnected nodes (i.e., entities) communicating in an example IT environment. Without further detail, this representation of the IT environment provides little to no insight into what types of entities are active in the IT environment, what type of activity is present in the IT environment, or whether the activity is normal, anomalous, or even malicious. Using the techniques described herein, the activity (as indicated in event machine data) can be analyzed to provide a clearer picture 1704 of the types of entities active in the environment and where they are located in a logical arrangement (i.e., a topology) of the IT environment. Further, as indicated at detail 1706, this information can be used to detect anomalous activity, for example, in the form of communications indicative of a webshell attack in a demilitarized zone (DMZ) area of an IT environment.

Figure 18:
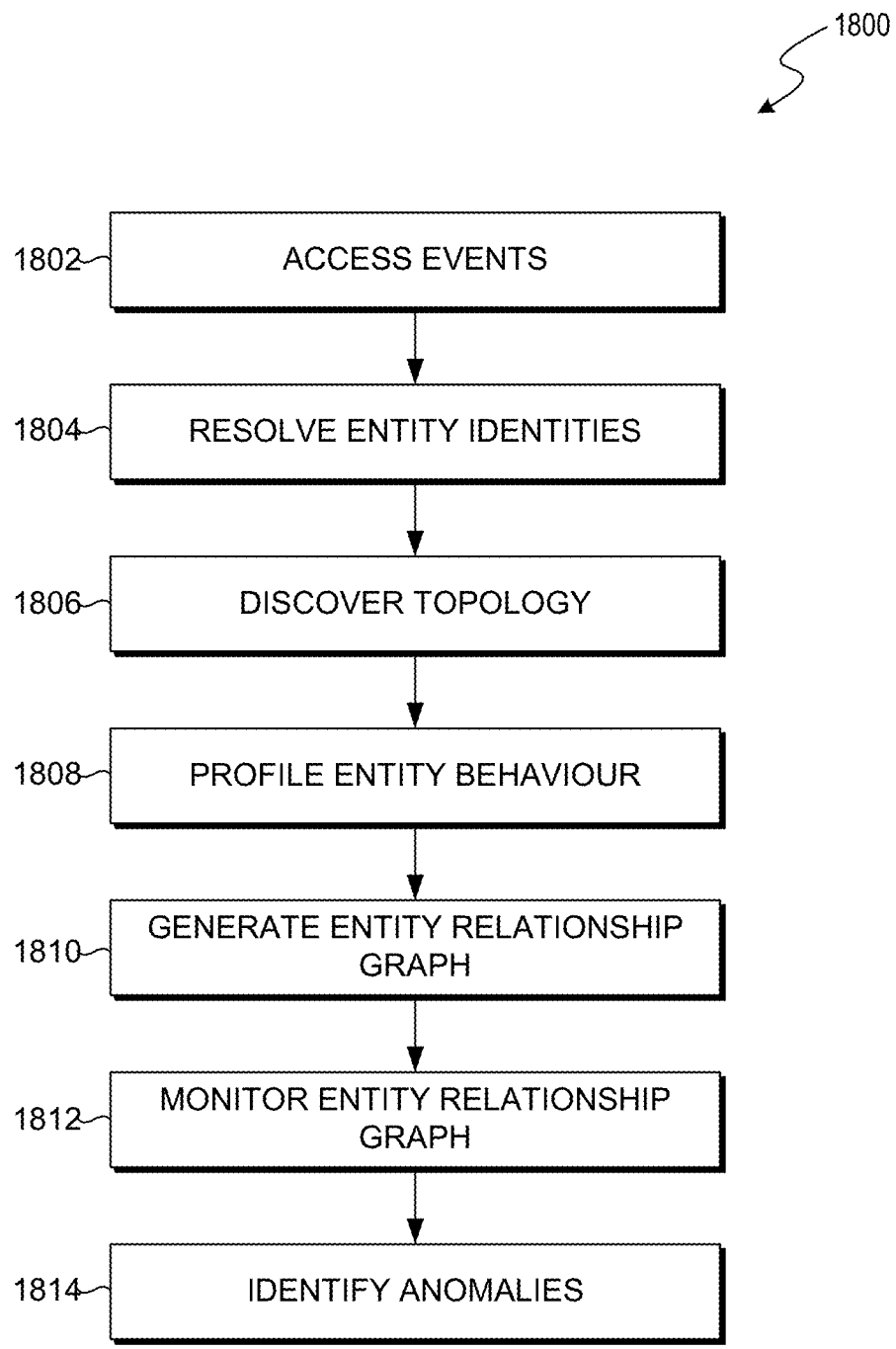
FIG. 18 shows a flow chart that describes at an example process for fingerprinting entities based on their activities in an IT environment.

FIG. 18 is a flow chart that describes at a high level an example process 1800 for implementing the techniques described herein.

In some embodiments, process 1800 begins at step 1802 with accessing data associated with entity activity, for example in the form of events.

Next, this data is analyzed during an identity resolution stage at step 1804 to resolve the identity for a particular entity. This can include attributing a suitable identifier for the entity to at least some of the accessed events.

Next, during a topology discovery stage at step 1806, entity activity is analyzed to determine how entities associated with the IT environment are logically located within the environment. For example, the logical arrangement may be based on a layer of the Open Systems Interconnection (OSI) model. In some embodiments, the logical arrangement can be discovered by analyzing the activity inferences can be made regarding whether the entity is operating in a local area network (LAN), in a wide area network (WAN), in a DMZ, or external to the IT environment.

Next, at step 1808, during a behavioral profiling stage, the activity of identified entities is analyzed, and in some cases, the entities are associated with certain classes of entities (e.g. server, laptop, printer, IOT device, etc.). In some embodiments, this step may include an additional step or sub step in which the activity is analyzed to determine if a particular entity is behaving as a client or server with respect to another entity. This information can be contained in behavioral profiles generated for identified entities.

Next, at step 1810, information regarding the identified entities, their behavior, and the topology of the IT environment is captured and organized in the form of a generated entity relationship graph. For example, in some cases the entity relationship graph may include multiple nodes representing the identified entities. The graph may further include edges connecting the nodes representing interaction between the entities. In some embodiments, the edges can include directionality (e.g., in the form of an arrow pointing to one of two nodes) that indicates the normal flow of activity between the two nodes. For example, an entity relationship graph may contain directional edges indicating normal activity between client to server, server to client, server to server (DMZ to LAN), client to client (LAN to LAN), etc.

A generated entity relationship graph can, at step 1812, be monitored for changes to detect anomalies (step 1814). For example, in an embodiment, anomalies are detected when the directionality of an edge connecting two nodes in the graph shifts (e.g., reverses) indicating an abnormal flow of activity.

Note that process 1800 described above is an example provided for illustrative purposes. In some embodiments, other processes may have fewer or more steps than are shown in FIG. 18 and may reorder the steps differently than as shown. For example, in some embodiments the steps of identity resolution, topology discovery and behavioral profiling may be part of a single overall processing step that determines the types of entities in a given IT environment and how they are related to each other based at least in part on their activity.

Figure 19:
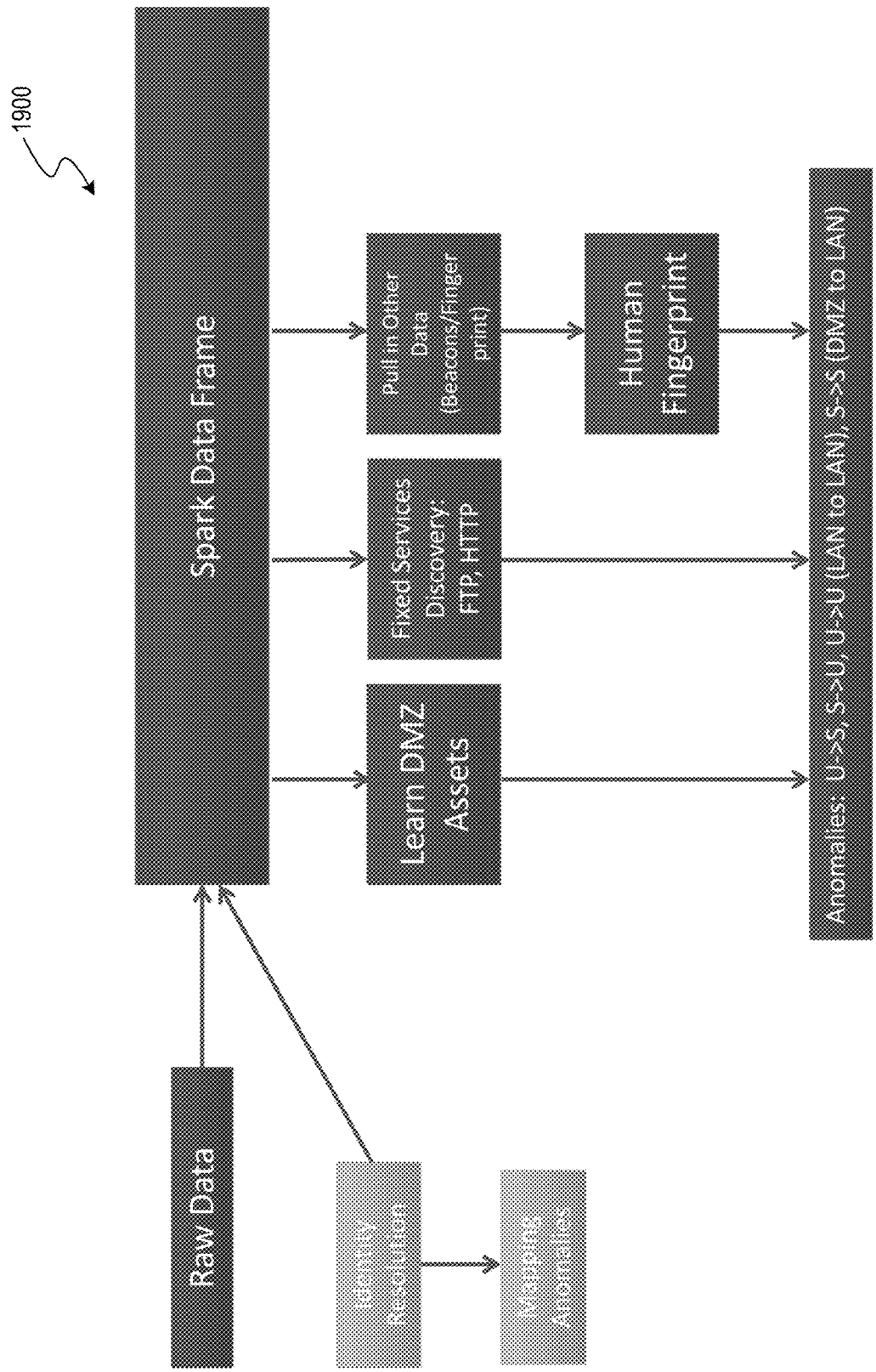
FIG. 19 shows a flow diagram that illustrates how raw machine data related to activity in an IT environment can be processed to detect anomalies.

FIG. 19 shows a flow diagram 1900 that illustrates how, in an embodiment, raw machine data reflecting activity in an IT environment can be processed. Examples of data include events that are accessed from a data intake and query system 108. The data can be processed using machine learning based processing engines, for example, implemented in an Apache Spark™ based data processing framework. Note that the Spark data processing framework illustrated in FIG. 19 is an example. In some embodiments, processing of events to performed certain techniques (e.g., as described with respect to FIG. 18) can be performed in data intake and query system 108 and/or the network security system 120. For example, in some embodiments, one or more of the process steps described with respect to FIG. 18 may be performed in any of a real time processing path or batch processing patch of a network security system 120 described in more detail with respect to FIGS. 11-14.

3.1 Identity Resolution

Identity resolution can be the first step in gaining insight into entities in an IT environment, particularly in environments that include a dynamic host configuration protocol (DHCP) service (i.e., to provide non-static IP addresses). In such environments, a device operating on a network may be associated with multiple different IP addresses over time. Naively attributing certain patterns of behavior to a particular IP address may lead to incorrect analysis. Accordingly, an identity resolution process can be employed to map identifiers (e.g., a MAC address or an IP address) to a certain entity (e.g., a device) which can remain valid for a period of time. By mapping identifiers to a particular entity, the identity of the particular entity can be attributed to certain events as they are accessed. For example, activity by a particular entity may be reflected, in a first event, as associated with a particular IP address and, in a second event, as associated with a particular MAC address. Without resolving the identity of the particular entity, the two events may appear to be attributable to different entities. However, by mapping the particular IP address to the particular MAC address, the activity reflected in both events can be attributed to the particular entity. Identity resolution mapping can be dynamically updated as the time goes by and more events are accessed. As the IT environment changes, an identity resolution module can derive new mapping arrangements. For example, the same IP address can become associated with a different MAC address. Note that, for the particular case of DHCP services, it is generally easier to estimate when a particular version of a device resolution model should expire, because a DHCP service setting typically includes explicit lease expiration provisions.

Figure 20:
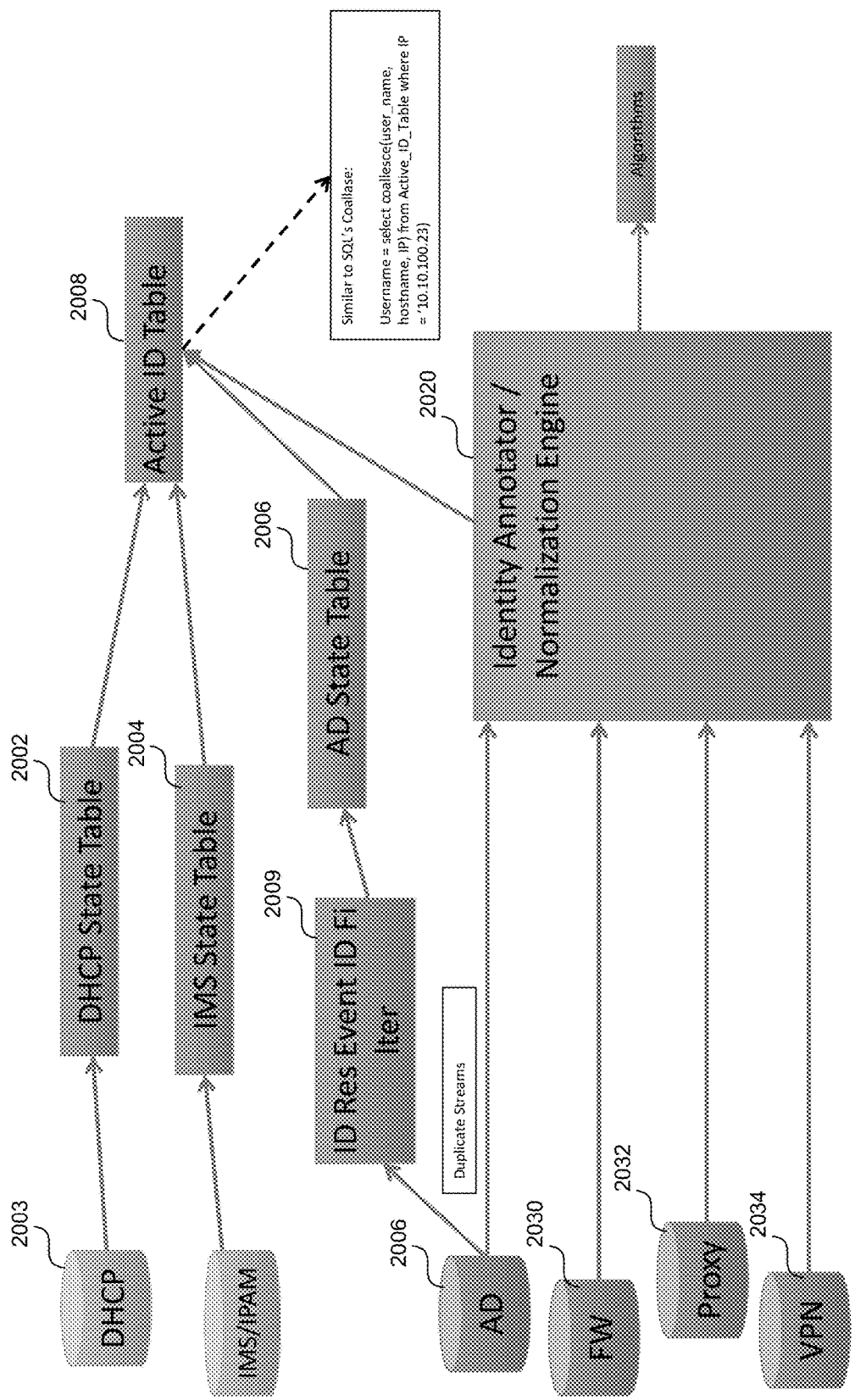
FIG. 20 shows an example workflow for entity identity resolution.

FIG. 20 shows an example workflow for entity identity resolution, according to some embodiments. As shown in FIG. 20, multiple state tables, for example a DHCP state table 2002, IP multimedia subsystem (IMS) state table 2004 and an active directory (AD) state table 2006 may be maintained that include identifiers for a plurality of entities in a given IT environment. In some embodiments these identifiers may be logged as certain entities (e.g. devices) connect to a given network. For example, a DHCP service database 2003 may include a list of non-static IP address assigned to connected clients that is dynamically updated as the IP address leases are assigned and released. Similarly, asset identifiers may be pulled or received from an active directory database 2007. In some cases identifiers may be filtered before placement in any of the active state tables. For example, information from AD database 2006 may be passed through an event ID filter 2009 so that only relevant information is placed in the active AD state table 2006. In some embodiments identifiers for entities active in an IT environment can be pulled from the raw data included in events accessed, for example from a data intake and query system 108.

Figure 21:
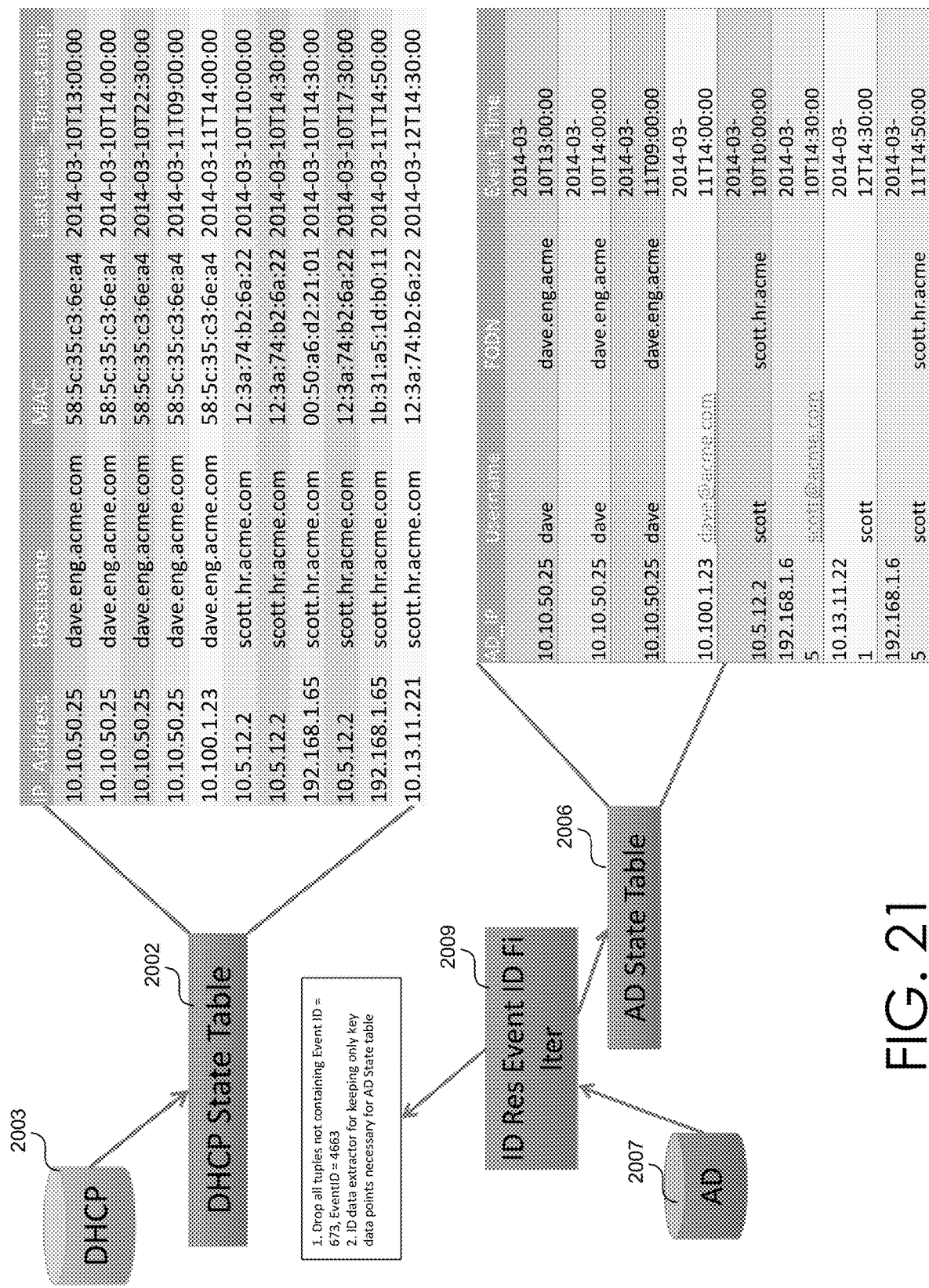
FIG. 21 shows another example workflow for entity identity resolution.
Figure 22:
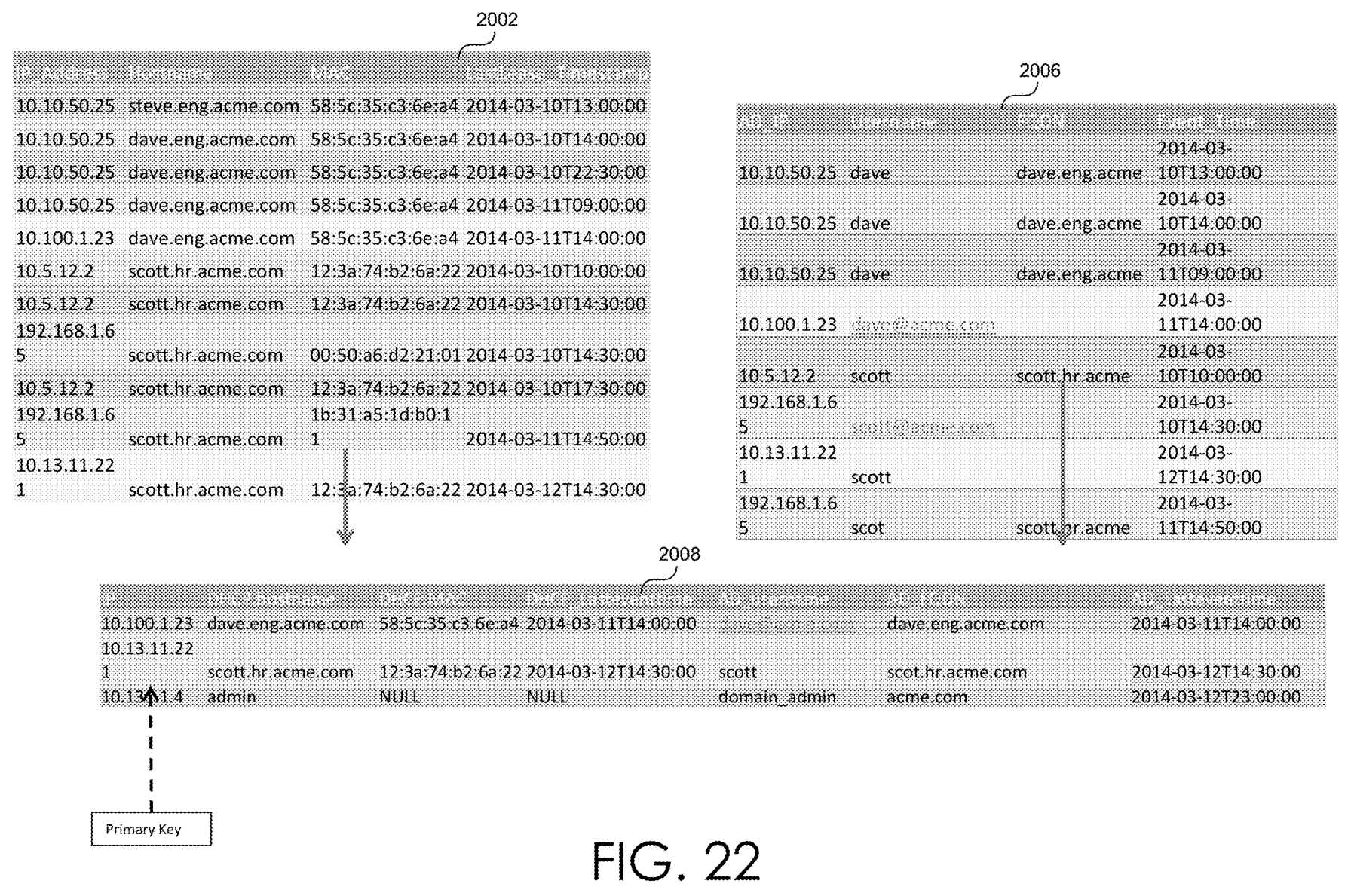

As further shown in FIG. 20, the multiple identifier state tables from disparate sources are then aggregated into a main active ID state table 2008 that may associate multiple identifiers (e.g., an IP address, a MAC address, a domain name, etc.) with a single entity active in the IT environment. For example, FIG. 21 shows the contents of an example DHCP state table 2002 and an example AD state stable 2006 that includes multiple disparate identifiers for the same entities. As shown in FIG. 22, the DHCP state table 2002 and an AD state stable 2006 can be aggregated into the active ID state table 2008, in some cases in real time as events are received. Returning to FIG. 20, the active ID state table 2008 can be further annotated with entity identifiers pulled or received from multiple other sources. For example, an identity annotator/normalization engine 2020 can annotate the active ID state table 2008 with data (e.g., in the form of events or raw machine data) from firewall services 2030, proxy services 2032, and/or virtual private network (VPN) services 2034.

In the context of the network security system 120, a process for identity resolution may be performed during a data intake and preparation stage the identity resolution module 1412 described with respect to FIG. 14. Specifically, after the entities are identified in the tokens, the identity resolution module 1412 is operable to perform an identity resolution process, which enables keeping track of which identifiers are associated with which entities across an IT environment.

In the context of computer security and especially unknown threat detection, information about entity behavior can be very important. However, as previously discussed, not all events/activities/logs include comprehensive entity information. Consider a typical firewall event as an example. Except for a few advanced firewall products, many typical firewalls may not know and do not record certain entity information. Accordingly, such firewall products are not able to accurately attribute a particular user to an event. Therefore, many times even when a particular communication is determined to be malicious, traditional security products are unable to attribute the malicious behavior to a particular user. Embodiments disclosed here provide that, when logs or device-level events do not capture the user information, the identity resolution module 1412 in the data intake and preparation stage can attribute those events (and behaviors) to the right user. Similarly, the identity resolution module 1412 can attribute events to the multiple identifiers associated with a single entity (e.g. a device).

The identity resolution module 1412 can gain the knowledge by observing the system environment (e.g., based on authentication logs), thereby building the intelligence to make an educated identity resolution determination. That is to say, the identity resolution module 1412 is able to develop entity identity intelligence specific and relevant to the system's environment without receiving explicit user identity information.

To facilitate this fact-based identity resolution functionality in a security system 120, the identity resolution module 1412 can utilize a machine learning model to generate and track a probability of associations between multiple identifiers. Specifically, after the identifiers are extracted from an event (e.g., by the field mapper 1408), the identity resolution module 1412 can identify whether the event includes a user identifier or a machine identifier, and can create or update the probability of association accordingly. The model initiated by the identity resolution module 1412 can, in some embodiments, obtain the information it needs, e.g., obtaining machine identifiers in an event, through one or more interfaces. A machine identifier is an identifier that can be associated with a machine, a device, or a computing system; for example, a machine identifier can be a media access control (MAC) address, or an Internet Protocol (IP) address. Different machine identifiers can be generated by the same machine. A user identifier is an identifier that can be associated with a user; for example, a user identifier can be a user login identifier (ID), a username, or an electronic mail address. Although not illustrated in FIG. 14, some embodiments of the identity resolution module 1412 can resolve a user identity of a particular user by, for example, querying a database using a user identifier as a key. The database, which may be a human resource management system (HRMS), can have records indicating a number of user identifiers that are registered to the user identity. Note that, in some alternative embodiments, a user identifier may be directly treated as a user for simpler implementation, even though such implementation may not be an ideal one because behaviors of the same user may not be detected because the user has used different user identifiers.

More specifically, a machine learning model can have different phases, for example, a training phase (after initiation and before ready) and an active phase (after ready and before expiration). In a training phase of a machine learning model, if an event that is received involves both a user and a machine identifier (e.g., if the event data representing the event has both a user identifier and a machine identifier), then machine learning model that is employed by the identity resolution module 1412 can use this event to create or update the probability of association between the user and the machine identifier. For example, when an authentication event is received (e.g., when a user logs into a particular machine) and involves a user (e.g., identified by a user identifier such as a username) and a machine identifier, the model learns that the user is now associated with the machine identifier, at least for a period of time until the user logs out or times out from the particular machine.

As more events are received, the model can become increasingly better trained about the probability of association between the user and the machine identifiers. In some embodiments, the machine learning models used for identification resolution may be entity specific. In other words, each identified entity may be associated with a separate machine learning based model for identity resolution. It is also noted that the machine learning models used in identity resolution are generally simpler than those models that would be used for anomaly and threat detection. In many embodiments, the models that are used in the identity resolution or device resolution are time-sequenced probabilistic graphs, in which the probability changes over time.

According to a number of embodiments, the models that are used to generate and track the probability of association between each user and possible machine identifiers are time-dependent, meaning that a result from the models has a time-based dependence on current and past inputs. The time dependence is useful to capture the scenario where a device is first assigned or given to a particular user, and is subsequently reassigned to a different user, which happens often in a large organization. To achieve this, in some embodiments, the identity resolution module 1412 can initiate, for a given user, different versions of the machine learning model at different point of time, and each version may have a valid life time. As events related to the given user arrive, versions of a machine learning model are initiated, trained, activated, (optionally) continually updated, and finally expired.

The models can be trained and, in some implementations, continually updated after their activation, by relevant events when the events are received. An example of a relevant event is an authentication event, which inherently involves a user (e.g., which may be represented by a user identifier) and a number of machine identifiers (e.g., an IP address or a MAC address). Depending on the model, other criteria for an event to be considered relevant for model training or updating purposes may include, for example, when a new event includes a particular machine identifier, a particular user identifier, or the recency of the new event. Moreover, some models may assign a different weight to the new event based on what type of event it is. For example, given that the new event is an authentication event, some models assign more weight to a physical login type of authentication event than to any other type of authentication event (e.g., a remote login).

Depending on the particular deployment, the machine learning model can be considered trained and ready when one or more criteria are met. In one example, a version of the model can be considered trained when a certain number of events have gone through that version of the model. In another example, a version of the model can be considered trained when a certain time period has passed after the version of the model is initiated. Additionally or alternatively, a version of the model is considered trained when a certain number of criteria are met (e.g., when the model becomes sufficiently similar to another model). Additional details of machine learning models that can be employed (including training, readiness, activation, and expiration) by various engines and components in the security platform are discussed in other sections of this disclosure.

After a version of a model is sufficiently trained (e.g., when the probability of association exceeds a confidence threshold, which depends on the model's definition and can be tuned by the administrator for the environment), the identity resolution module 1412 then can activate the version of the model. Thereafter, when a new event arrives, if the new event meets certain criteria for the identity resolution, the identity resolution module 1412 can create a user association record (e.g., in memory) indicative that the new event is associated with a particular user. The criteria for the identity resolution can include, for example, when the new event includes a machine identifier (regardless of whether it also includes a user identifier), or when the new event is received during a time period which the version is active. It is observed that the identity resolution technique is especially useful to help identify an event that includes only a machine identifier but no user identifier.

Based on this user association record, the identity resolution module 1412 can annotate the new event to explicitly connect the new event to the particular user. For example, the identity resolution module 1412 can add, as a field, the particular user's name to the new event in its associated event data. Alternatively, the identity resolution module 1412 can annotate the new event by adding a user identifier that belongs to the particular user. In addition, the identity resolution module 1412 can send the user association record to a cache server that is implemented based on Redis™.

With the fact-based identity resolution techniques disclosed herein, a security system has the ability to attribute an event that happens on a device to a user, and to detect behavioral anomalies and threats based on that attribution. The security system can achieve this without the need of maintaining an explicit look-up file and irrespective of what the data source is (i.e., regardless of whether a data source for an event includes a user identifier or not).

Although not illustrated in FIG. 14, an embodiment of the data intake and preparation stage can also implement a device resolution module to create an association between one machine identifier and another. In a manner similar to how the identity resolution module 1412 tracks the possibility of association between a user and a machine identifier, the device resolution module can track the possibility of association between a first machine identifier and a second machine identifier. Thereafter, when a new event is received, if the event includes the first machine identifier but not the second, the device resolution module can create a machine association record indicative that the new event having the first machine identifier is associated with the second machine identifier. Optionally, the machine identifier can be translated into a more user-friendly machine name, such as "Tony's Laptop."

3.2 Topology Discovery

During a topology discovery stage, activity is analyzed to determine how entities associated with the IT environment are logically located within the environment. For example, the logical arrangement may be based on a layer of the Open Systems Interconnection (OSI) model. In such an embodiment, inferences can be made based on activity about whether an identified entity is operating, for example, within a local area network (LAN), wide area network (WAN), a demilitarized zone (DMZ), or external to the IT environment. In other words, discovering the topology of an IT environment may include inferring the logical relationships between the entities interacting in the IT environment based on their activity.

Entities operating in an IT environment generally should behave in certain patterns depending on their type and their location within the topology. For example, the DMZ in an IT environment essentially refers to the edge of the LAN at the firewall. If a particular IT environment includes a web server operating in the DMZ, a risk of attack (e.g., webshell attack) may exist. Accordingly, it is important to monitor for anomalous communications to an or from such a web server to effectively detect such an attack. This requires knowing that entity activity indicated in accessed events is associated with such a web server and that the web server is operating in the DMZ, so to speak.

As mentioned, monitoring the behavior of certain entities can uncover insight into their location with a topology of an IT environment. Take for example an identifier such as an IP address. In some embodiments, a topology discovery stage process may include tracking source/destination behavior for a given IP address. For example, how many hosts talk to the entity associated with the IP address (In degree) and how may hosts are talked to by the entity associated with the IP address (out degree). Similarly, the frequency of serving as a destination entity and the frequency of serving as a source entity can be tracked for different time periods to reveal the normal state of operation for the entity. In some cases, IP subnet behavior can be tracked for certain entities (e.g., the number of LAN to LAN interactions and/or the number of LAN to WAN interactions).

Once the entity is identified as being located in a particular topology zone (e.g. the DMZ), the next step is to determine what type of entity it is. As mentioned an entity may refer to an number of different categories of things including devices, users, services, applications, etc. However, even within a particular type category (e.g., devices), entities can be associated with a number of commonly occurring classes including, but not limited to, desktop computers, laptop computers, smart phones, tablets, servers (MS, *nix, web, printer, etc.), printers, and IOT devices (e.g., biomedical devices, energy meters, etc.).

In some embodiments, the classes of assets in a given IT environment may be predefined or user defined based on known behavioral characteristics. For example, a server may be distinguishable from a client device based on communications flow characteristics (e.g., byte distribution ratios). Similarly, devices may be distinguishable based on application layer characteristics. For example, server may be associated with netbios updates and may interact with a number of unique domains every day. Conversely, a client-side device may exhibit non-uniform activity patterns through applications such as Facebook, Twitter, etc.

In some embodiments, machine-learning may be applied to data included in events to determine a set of classes of entities active in an IT environment. For example, machine-learning based clustering algorithms, such as k-means, can be applied to a set of entities to classify them into a certain number of clusters. The number of clusters will depend on how the clustering algorithms are applied; however, this process can be made dynamic to arrive at a stable number of classifications that are effective in a given context.

Following the topology discovery stage, you are left with a set of topology labels (e.g., LAN, WAN, DMZ, or external) and entity labels (e.g., desktop computers, laptop computers, smart phones, tablets, servers (MS, *nix, web, printer, etc.), printers, and IOT devices (e.g., biomedical devices, energy meters, etc.). In some embodiments, these lists of labels are automatically generated during the topology discovery stage, but can also be made user configurable to allow for adding of different topology labels and/or entity labels.

In some embodiments, an appropriate topology and/or entity label may be applied to an identified entity, for example, during a behavioral profiling stage described below. In other words, a topology label and/or entity class label may be tied to a suitable entity identifier determined during the identity resolution stage.

As would be expected, IT environments do not typically remain static. As entities connect and disconnect, and organizations and architectures shift, the topology of the environment similarly changes. Accordingly, in some embodiments, the topology (including the topology labels and entity labels) is updated as additional events are received and processed.

As previously discussed, the end goal of entity fingerprinting may in some cases be to detect anomalous activity. However, information associated with an environment topology may in itself be useful. For example, information about the entities in an IT environment and their logical location within the environment would be useful to an admin user managing the IT environment. Accordingly, in some embodiments, information associated with the topology may be output to a user, for example, via a graphical user interface. For example, a graphical representation of an entity relationship graph similar to as shown in FIG. 17 may be output to a user via a graphical user interface. In some embodiments the output may be interactive allowing the user to explore the topology of the IT environment.

3.3 Behavioral Profiling

During a behavioral profiling stage, the activity of identified entities is analyzed and in some cases the entities are associated with certain classes of entities (e.g., server, laptop, printer, IOT device, etc.). As previously mentioned, these entity classes may have been determined during a topology discovery stage described above.

Figure 23:
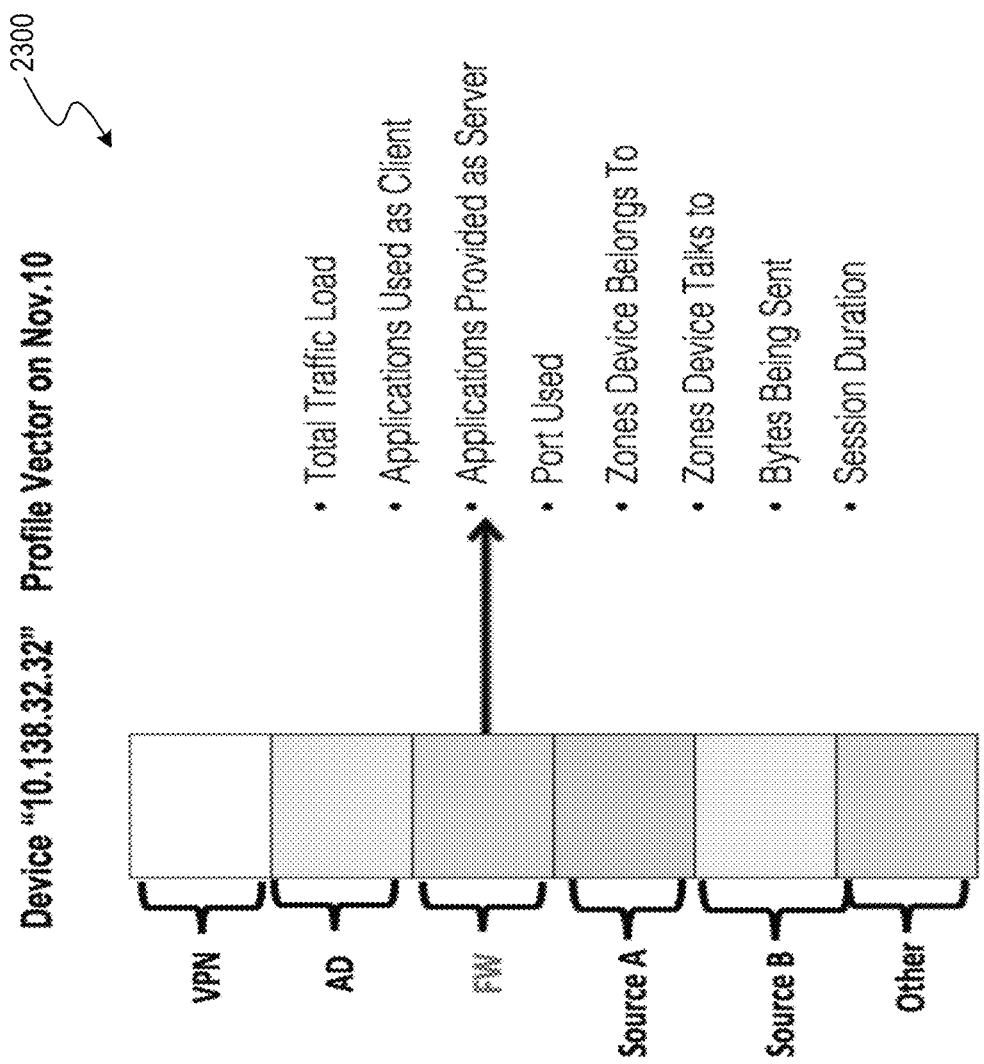
FIG. 23 shows an example behavioral profile in the form of a vector for an identified entity in an IT environment.

An entity behavioral profile may include a vector having a plurality of values indicative of characteristics for certain features. For example, FIG. 23 shows an example behavioral profile 2300 in the form of a vector for a device identified by a particular IP address, "10.138.32.32." The values included in a behavioral profile for a particular entity may be based on an analysis of raw machine data indicative of activity by the entity over a period of time. For example, as shown in FIG. 23, values included in a behavioral profile may include information associated with any of traffic load, applications used as a client, applications provided as a server, port uses, zones belonged to, zones talked to, bytes sent, session duration, etc.

The behavioral profile of a tracked entity (e.g., a device) can be used to determine what type of entity classification the tracked entity falls under. Recall that the classes of entities occurring in a particular IT environment may be predefined, user defined, or in some cases discovered using machine learning, for example, during a topology discovery stage. In any case, the behavioral profile for a particular entity can be compared to a representative profile for a group of entities associated with a particular entity class to determine if a match exits. For example, in some embodiments the behavioral profile may be represented in the form of a histogram that charts baseline values for a particular entity for multiple dimensions (e.g., any of those described with respect to FIG. 23). This histogram for the particular entity can then be compared to a histogram charting baseline values for similar dimensions for groups of entities previously associated with a particular class of entities.

As a result of the behavioral profile stage, an identified entity (e.g., as associated with a particular identifier) can be associated with one or more of a plurality of classes of entities. For example, as previously mentioned, classes may include desktop computers, laptop computers, smart phones, tablets, servers (e.g., MS, *nix, web, printer, etc.), printers, and IOT devices (e.g., biomedical devices, energy meters, etc.). Once the classification of an entity is determined, an entity label may be applied to the entity's behavioral profile to indicate that the entity is associated with a certain class.

Additional Examples of functionality related to behavioral profiling are described in U.S. patent application Ser. No. 15/418,464, entitled "SECURITY MONITORING OF NETWORK CONNECTIONS USING METRICS DATA", filed on 27 Jan. 2017, and which is hereby incorporated by reference in its entirety for all purposes.

3.4 Client/Server Relationship Discovery

As described above, by analyzing activity in an IT environment (e.g. by processing received events), a system in accordance with the present teachings can identify entities active in the IT environment, can discover how these identified entities are located within a topology of the IT environment, and can determine what the identified entities are. Using this information an entity relationship graph can be generated that represents the many identified entities in an IT environment and their relationships (e.g., based on interaction).

FIGS. 24 and 25 describe an example entity relationship discovery and recordation technique, which can be implemented in the data intake and preparation stage described with respect to FIG. 14. To facilitate description, FIGS. 24 and 25 are explained below with reference to FIG. 14. The entity relationship discovery and recordation technique can be performed by, for example, the relationship graph generator 1410. Specifically, after the entities are identified, the relationship graph generator 1410 is operable to identify a number of relationships between the entities, and to explicitly record these relationships between the entities, for example, in the form of entity relationship graphs. Some implementations of the relationship graph generator 1410 generate a single relationship graph for each event; such an event-specific relationship graph may also be called a "mini-graph." In some embodiments the graph generator 1410 is operable to generate an overall composite graph (e.g., composed of multiple mini-graphs) reflecting the entity relationships based on a plurality of accessed events. Further, some implementations incorporate the generated relationship graphs into the data of events associated with the relationships, in the form of a data structure representing the relationship graph. A graph in the context of this description includes a number of nodes and edges. Each node in the relationship graph represents one of the entities involved in the event, and each edge represents a relationship between two of the entities. In general, any event involves at least two entities with some relationship between them (e.g., a device and a user who accesses the device) and therefore can be represented as an event-specific relationship graph.

The graph generator 1410 can identify a relationship between entities involved in an event based on the actions that are performed by one entity with respect to another entity. For example, the graph generator 1410 can identify a relationship based on comparing the action with a table of identifiable relationships. Such a table of identifiable relationship may be customizable and provides the flexibility to the administrator to tailor the system to his data sources (described above). Possible relationships can include, for example, "connects to," "uses," "runs on," "visits," "uploads," "downloads," "successfully logs onto," "restarts," "shuts down," "unsuccessfully attempts to log onto," "attacks," and "infects." Also, the identified relationship between the entities can be indicative of the action, meaning that the identifiable relationship can include the action and also any suitable inference that can be made from the action. For example, an event that records a GET command (which is an action) may indicate that the user is using a machine with a certain IP address to visit a certain website, which has another IP address. In practice, however, the number of identifiable relationships can be directly correlated to the size of the graph, which may impact the security platform's responsiveness and performance. Also, identifiable relationships can include a relationship between entities of the same type (e.g., two users) or entities of different types (e.g., user and device).

In some embodiments, specific details on how to construct the edges and the identifiable relationships are recorded in a configuration file (e.g., snippet). For example, a portion of the configuration file can specify, for the relationship graph generator 1410, that an edge is to be created from an entity "srcUser" to another entity "sourceIP," with a relationship that corresponds to an event category to which the event belongs, such as "uses."

FIG. 24 illustrates raw machine data 2400 (e.g. as included in an event) received by the data intake and preparation stage. The raw machine data 2400, representing occurring activity may be part of log data generated by a web gateway server. The web gateway is located where network traffic in and out the environment goes through, and therefore can log the data transfer and web communication from a system inside the environment. The particular event as represented by the event data 2400 indicates that, at a particular point of time identified by the timestamp, the user "psibbal" uses the IP address "10.33.240.240" to communicate with an external IP address "74.125.239.107," and transfers 106 bytes of data. The status code of that event is "200," and the event is a TCP event where the HTTP status is "GET." As illustrated, the data 2400 also includes a significant amount of additional information.

Using the aforementioned techniques (e.g., the parsers 1406, and the field mapper 1408), the graph generator 1410 can readily identify that the event represented in the FIG. 24 involves a number of entities, such as the user "psibbal," the source IP "10.33.240.240," the destination IP "74.125.239.107," and an URL "sample.site.com." The graph generator 1410 also identifies that an action "GET" is involved in the event. Accordingly, the graph generator 1410 can compare the action to the table of identifiable actions, identify one or more relationships between the entities, and create an event-specific relationship graph 2500 based on the event. As shown in FIG. 25, the relationship graph 2500 includes the entities that are involved in the events. Each entity is represented by a different node. The relationship graph 2500 also includes edges that link the nodes representing entities. The identified relationships between the entities are the edges in the graph 2500. The relationship graph 2500 can be stored in known data structures (e.g., an array) suitable for representing graphs that have nodes and edges.

Note, however, that the components introduced here (e.g., the graph generator 1410) may be tailored or customized to the environment in which the platform is deployed. As described above, if the network administrator wishes to receive data in a new data format, he can edit the configuration file to create rules (e.g., in the form of functions or macros) for the particular data format including, for example, identifying how to tokenize the data, identifying which data are the entities in the particular format, and/or identifying the logic on how to establish a relationship. The data input and preparation stage then can automatically adjust to understand the new data format, identify identities and relationships in event data in the new format, and create event relationship graphs therefrom.

Then, in some embodiments, the graph generator 1410 attaches the relationship graph 2500 to associated events. For example, the graph 2500 may be recorded as an additional field of the in an associated event. In alternative embodiments, the relationship graph 2500 can be stored and/or transferred individually (i.e., separate from events) to subsequent nodes in the security platform. After additional processes (e.g., identity resolution, sessionization, and/or other decorations) in the data intake and preparation stage, the relationship graph 2500 can be sent to a distributed messaging system, which may be implemented based on Apache Kafka™.

A messaging system (e.g., Apache Kafka™) can also accumulate or aggregate, over a predetermined period of time (e.g., one day), multiple relationship graphs that are generated from the events as the events are accessed. As such, at the messaging system, the relationship graphs (mini-graphs) for all events, or at least for multiple events, can be combined into a larger, composite relationship graph. For example, a computer program or a server can be coupled to the messaging system to perform this process of combining individual relationship graphs into a composite relationship graph, which can also be called an enterprise security graph. The composite relationship graph can be stored, for example, as multiple files, one file for each of multiple predetermined time periods. The time period depends on the environment (e.g., the network traffic) and the administrator. In some implementations, the composite relationship graph is stored (or "mined" in data mining context) per day; however, the graph mining time period can be a week, a month, and so forth.

In some embodiments, event-specific relationship graphs are merged into the composite relationship graph on an ongoing basis, such that the composite relationship graph continuously grows over time. However, in such embodiments it may also be desirable to remove ("age out") data deemed to be too old, from the composite relationship graph, periodically or from time to time.

In some embodiments, the nodes and edges of the composite graph are written to time namespaces partitioned graph files. Then, each smaller segment can be merged with a master partition (e.g., per day). The merge can combine similar nodes and edges into the same record, and in some embodiments, can increase the weight of the merged entity nodes. Note that the exact order of the events' arrival becomes less important, because even if the events arrive in an order that is not the same as how they actually took place, as long as the events have timestamps, they can be partitioned into the correct bucket and merged with the correct master partition. Some implementations provide that the composite graphs can be created on multiple nodes in a parallelized fashion.

In this manner, this composite relationship graph can include all identified relationships among all identified entities involved in the events that take place over the predetermined period of time. As the number of events received by the security platform increases, so does the size of this composite relationship graph. Therefore, even though a relation graph from a single event may not carry much meaning from a security detection and decision standpoint, when there are enough events and all the relationship graphs from those events are combined into a composite relationship graph, the composite relationship graph can provide a good indication of the behavior of many entities, and the quality/accuracy of this indication increases over time as the composite relationship graph grows. Then, the subsequent processing stages (e.g., the complex processing engine) can use models to perform analytics on the composite relationship graph or on any particular portion (i.e., "projection", discussed further below) of the composite relationship graph. In some embodiments, the composite relationship graph is persistently stored using a distributed file system such as HDFS™.

In some embodiments, when various individual events' relationship graphs (along with their associated decorated events) are stored in the messaging system but have not yet been combined to create the composite relationship graph, each such event's relationship graph can be further updated with any information (e.g., anomalies) that is discovered by downstream processes in the security platform. For example, if an event is found to be an anomalous, then the relationship graph associated with that anomalous event can be updated to include this information. In one example, the individual relationship graph of that anomalous event is revised to include an anomaly node (along appropriate edges), so that when the composite relationship graph is created, it can be used to determine what other entities might be involved or affected by this anomaly.

At least in some embodiments, the composite graph enables security system 120 to perform analytics on entity behaviors, which can be a sequence of activities, a certain volume of activities, or can be custom defined by the administrator (e.g., through a machine learning model). By having an explicit recordation of relationships among the events, the relationship graph generator 1410 can enable the analytics engines to employ various machine learning models, which may focus on different portions or aspects of the discovered relationships between all the events in the environment, in order to detect anomalies or threats.

Figure 26:
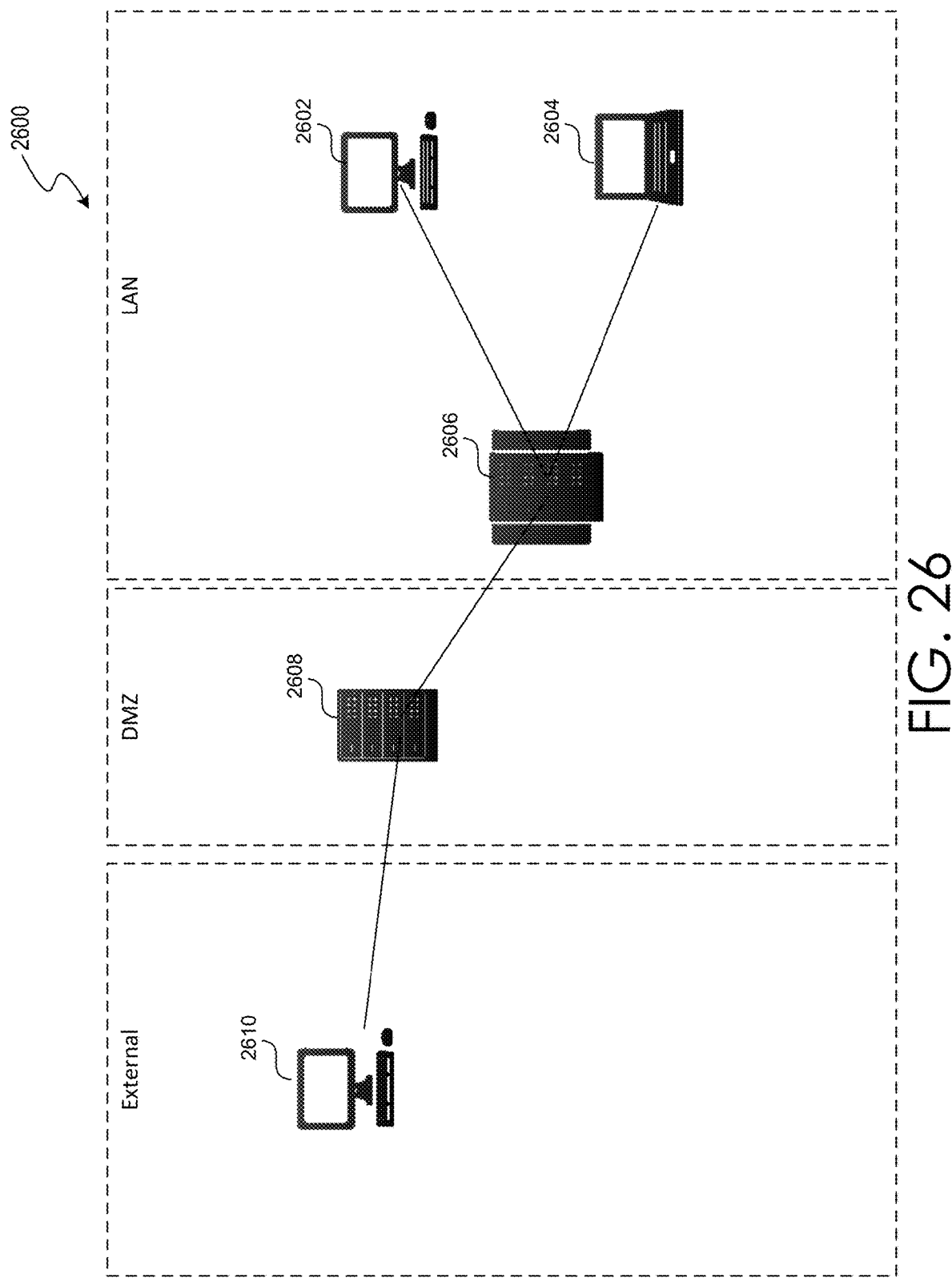
FIG. 26 shows an example representation of an entity relationship graph including a plurality of nodes and edges connecting the plurality of nodes.

FIG. 26 shows an example representation of an entity relationship graph 2600 similar to the graph 2500 shown in FIG. 25. Note that the example graph 2500 shown in FIG. 25 is event-specific and reflects the activity indicated by the machine data in event 2400 shown in FIG. 24. Conversely, the entity relationship graph 2600 shown in FIG. 26 may represent a comprehensive graph that takes into account relationships between the entities as well as the type of entity and the location of the entity within the topology of an IT environment. As mentioned, in some embodiments a graph similar to graph 2600 may be composed of multiple event-specific mini-graphs. As with graph 2500, entity relationship graph 2600 includes a plurality of nodes and edges connecting the plurality of nodes. In the example graph 2600, the plurality of nodes represent identified entities in an IT environment. For example, graph 2600 includes a node 2610 representing a computer external to the IT environment, a node 2608 representing a web server in the DMZ, a node 2606 representing a server in the LAN, and nodes 2602 and 2604 representing computers in the LAN. Again, information regarding the entities (e.g. identity, type, location within topology) associated with the depicted nodes may have been gathered or inferred during the previously described stages. Note that the example representation of an entity relationship graph 2600 shown in FIG. 26 is simplified for clarity and is not necessarily indicative of the structure of such a graph in practice.

The edges connecting the nodes in the graph represented in FIG. 26 indicate some level of interaction (e.g. in the form of transmitted data, messages, etc.) between entities, but not necessarily whether the interaction is of interest or concern. Accordingly, in some embodiments, during a client/server relationship discovery stage, the interactions between entities can be analyzed (e.g. by processing events) to baseline certain interactions, particularly those that indicate client server relationships. Establishing baselines for entity interactions can in some cases rely on analysis of the bytes flowing between the entities. For example, by analyzing communications between entities (e.g. total bytes transferred between devices, the ratio of bytes transferred, time of the transfers, average packet sizes for the transfers, the rate at which data is transferred, etc.) a system in accordance with the present teaching may establish a baseline direction of communication that is perhaps indicative of a client server relationship between entities. Note that this analysis may depend on the previously determined classification associated with the entity as well. In other words, analysis of interactions may be weighted based on the previously determine entity types in establishing interaction baselines.

Figure 27:
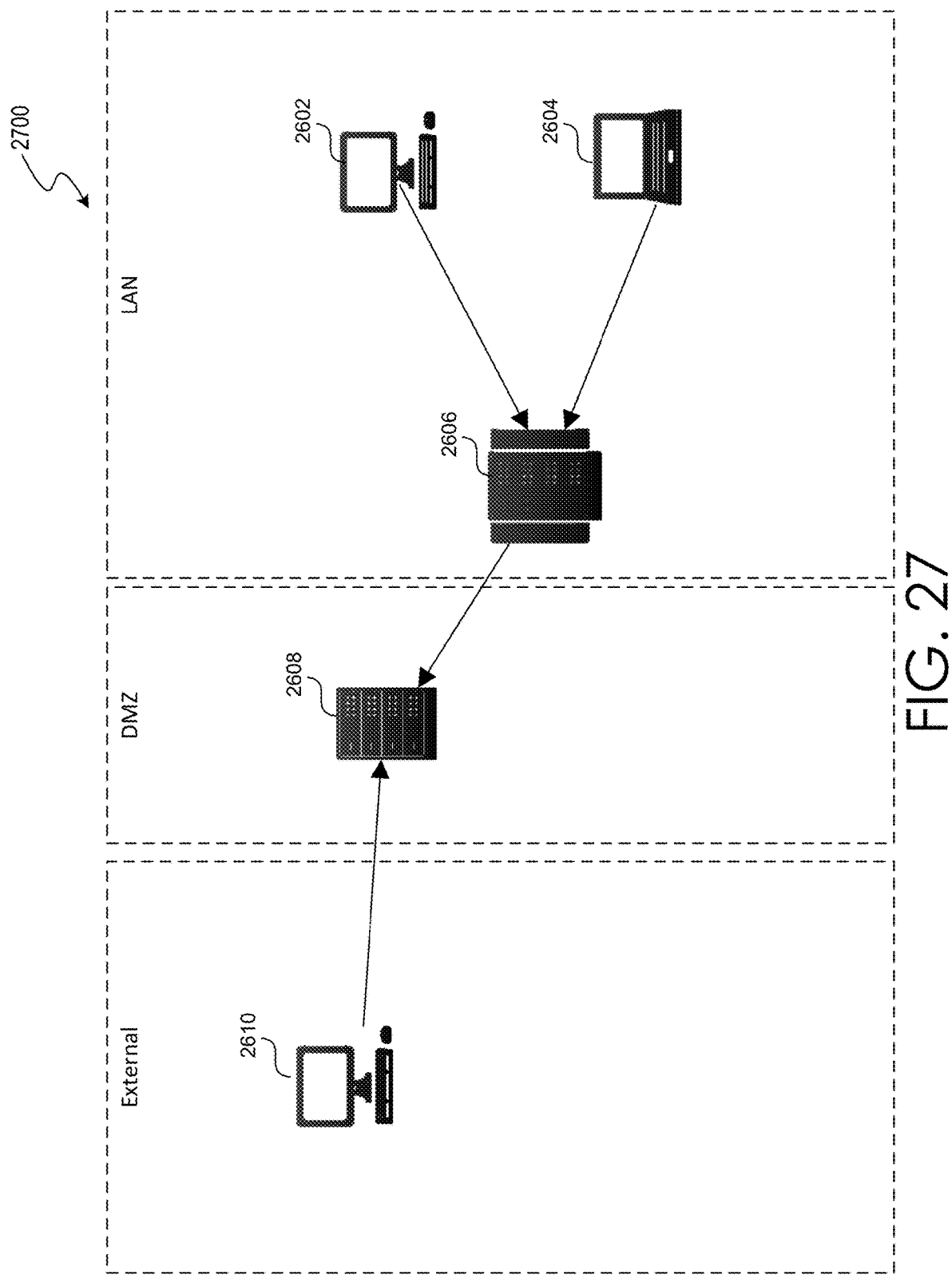
FIG. 27 shows an example representation of the entity relationship graph of FIG. 26 with directionality applied to the edges connecting the nodes.

In some embodiments an interaction baseline between entities can be represented in an entity relationship graph by adding directionality to the edge connecting the entities. For example, FIG. 27 shows a representation of an entity relationship graph 2700 similar to graph 2600 depicted in FIG. 26 except that the edges connecting the nodes are now represented as arrows indicating a baseline directionality in communication between nodes, for example, based on a client-server relationship analysis. Note that directionality of the edges depicted in FIG. 27 are exemplary and provided for illustrative purposes. Baseline directionality of edges connecting nodes in a graph representative of another IT environment will differ based on the particular activity associated with that environment.

3.5 Monitoring an Entity Relationship Graph

Certain types of malicious attacks can present themselves in the form of rare communications between certain entities. For example, a webshell is a specific type of attack that is usually tied to a concerted campaign in which a malicious actor operating outside of an IT environment establishes a backdoor at a vulnerable device operating in the DMZ (e.g., a web server) instead of directly trying to attack LAN devices protected behind a firewall. In such a webshell attack, the malicious actor may inject a lightweight PHP script into a vulnerable web service in the DMZ. This script effectively establishes a beach head for the malicious actor, thereby allowing them to move laterally into the LAN to attack systems or access sensitive information.

The previously described entity relationship graph can be monitored to detect such anomalous activity. As previously described with respect to FIG. 27, an entity relationship graph may include nodes representing entities with edges connecting the nodes representing relationship between the entities. The edges can include directionality in the form of arrows representing baseline interaction between the entities. Accordingly, the graph can be monitored to detect interactions that do not conform with certain established baselines and are therefore indicative of anomalous activity. For example, in some embodiments this process may include monitoring communications (e.g., by processing events) for specific instance of interactions that do not conform with established baselines.

In some embodiments this may include monitoring an entity relationship graph for changes in established baselines, for example a flip in directionality of an edge connecting multiple nodes. In some embodiments, monitoring of the graph may focus particularly are certain segments and entity types, for example web servers operating in the DMZ. In any case, an entity relationship graph can be monitored to detect anomalies on certain rare paths including, but not limited to, client to server anomalies, server to client anomalies, client to client (LAN to LAN) anomalies, and server to server (DMZ to LAN) anomalies.

In some embodiments, once detected, indications of these anomalies can be output to a user via user interface. For example, indications of detected anomalies can be output as notable events via an interface similar to as depicted with respect to FIGS. 15A-15B. In some embodiments detected anomalies can be processed using machine learning based models in a real time or batch processing pipeline along with other detected anomalies to identify threat indicators and possibly confirm active threats to the security of the IT environment.

What is claimed is:

1. A method comprising:
   receiving events associated with activity by a plurality of entities in an information technology (IT) environment, wherein each event of the plurality of events includes a portion of raw machine data that reflects activity in the IT environment and that is produced by a component of the IT environment, wherein each event is associated with a timestamp extracted from the raw machine data;
   accessing an entity relationship graph indicative of relationships and activity between a plurality of entities in the IT environment;
   wherein the entity relationship graph includes:
      a first node representative of a first entity of the plurality of entities;
      a second node representative of a second entity of the plurality of entities; and
      an edge connecting the first node to the second node, the edge including a directionality indicative of a direction of communication between the first entity and the second entity;
   updating the entity relationship graph based on the events;
   determining that the first entity and/or the second entity is operating in a particular logical location in a topology of the IT environment;
   monitoring the edge connecting the first node to the second node in response to determining that the first entity and/or the second entity is operating in the particular logical location in the topology of the IT environment;
   detecting a change in a characteristic of the edge; and
   detecting an anomaly in response to detecting the change in the characteristic of the edge.

2. The method of claim 1, wherein the characteristic of the edge is the directionality of the edge, and wherein the anomaly is detected in response to detecting a change in the directionality of the edge.

3. The method of claim 1, wherein the characteristic of the edge is indicative of a particular relationship between the first entity and the second entity, and wherein the anomaly is detected in response to detecting a change in the particular relationship between the first entity and the second entity.

4. The method of claim 1,
   wherein the characteristic of the edge is indicative of a first client-server relationship between the first entity and the second entity, wherein the first client-server relationship is indicative that the first entity is a client and the second entity is a server, and
   wherein the anomaly is detected in response to detecting a change in the first client-server relationship to a second client-server relationship between the first entity and the second entity, wherein the second client-server relationship is indicative that the first entity is a server and the second entity is a client.

5. The method of claim 1, wherein the characteristic of the edge is indicative of a particular communication between the first entity and the second entity, and wherein the anomaly is detected in response to detecting a change in the particular communication that does not conform with the directionality of the edge.

6. The method of claim 1, wherein the anomaly is indicative of anomalous communication between a particular entity of the plurality of entities and the at least one other entity of the plurality of entities.

7. The method of claim 1, wherein the anomaly is indicative of anomalous communication by the first entity and/or the second entity.

8. The method of claim 1, wherein the anomaly is indicative of a web shell attack.

9. The method of claim 1, further comprising:
   analyzing communication between the first entity and the second to establish a baseline for communications between the first entity and the second entity; and
   setting the directionality of the edge based on the established baseline for communication between the first entity and the second entity.

10. The method of claim 1, further comprising:
    determining a topology of the IT environment by processing a set of events indicative of activity in the IT environment; and
    generating the entity relationship graph based on the topology of the IT environment.

11. The method of claim 1, further comprising:
updating the entity relationship graph to further include:
   a third node indicative of the detected anomaly; and
   a second edge connecting the third node to the first node or the second node.

12. The method of claim 1, further comprising:
determining, based on activity by a particular entity of the plurality of entities, a logical location of the particular entity in a topology of the IT environment;
wherein the logical location of the particular entity is any one of the logical locations from a set of logical locations including:
   local area network (LAN);
   demilitarized zone (DMZ);
   wide area network (WAN); or
   external.

13. The method of claim 1, further comprising:
monitoring on a portion of the entity relationship graph associated with a particular logical location in a topology of the IT environment.

14. The method of claim 1, further comprising:
determining a topology of the IT environment; and
monitoring the edge connecting the first node to the second node based on the topology of the IT environment.

15. The method of claim 1, further comprising:
determining, based on a topology of the IT environment, that the first entity and/or the second entity is web server and that the web server is operating in a DMZ associated with the IT environment; and
the edge connecting the first node to the second node in response to determining that the first entity and/or the second entity is a web server and that the web server is operating in the DMZ associated with the IT environment.

16. The method of claim 1, further comprising:
outputting, via a user interface, an indication of the detected anomaly.

17. The method of claim 1, further comprising:
outputting, via a user interface, a notable event associated with the detected anomaly.

18. The method of claim 1, further comprising:
receiving events associated with activity by the plurality of entities in the IT environment, wherein each event includes a portion of raw machine data that reflects activity in the IT environment and that is produced by a component of the IT environment, wherein each event is associated with a timestamp extracted from the raw machine data; and
processing the events to generate the entity relationship graph.

19. The method of claim 1, further comprising:
receiving events associated with activity by the plurality of entities in the IT environment, wherein each event includes a portion of raw machine data that reflects activity in the IT environment and that is produced by a component of the IT environment, wherein each event is associated with a timestamp extracted from the raw machine data; and
extracting an identifier from the events; and
associating the identifier with the first entity or the second entity.

20. The method of claim 1, further comprising:
associating an identifier to with the first entity or the second entity;
wherein the identifier includes any one or more of: a domain name, a uniform resource locater (URL), uniform resource identifier (URI), a unique identifier (UID), an Internet Protocol (IP) address, a Media Access Control (MAC) address, a device identification, or a user identification.

21. The method of claim 1, wherein the entity relationship graph is a composite entity relationship graph that is generated based on a plurality of event-specific entity relationship graphs.

22. The method of claim 1, wherein the entity relationship graph is a composite entity relationship graph, the method further comprising:
receiving events associated with activity by the plurality of entities in the IT environment, wherein each event includes a portion of raw machine data that reflects activity in the IT environment and that is produced by a component of the IT environment, wherein each event is associated with a timestamp extracted from the raw machine data;
generating a plurality of event-specific entity relationship graphs by processing the events, each of the plurality of event-specific entity relationship graphs associated with a different one of the events; and
generating the composite entity relationship graph based on the plurality of event-specific entity relationship graphs.

23. The method of claim 1, further comprising:
generating anomaly data indicative of the detected anomaly; and
processing the anomaly data using a machine learning model to identify security threat to the IT environment.

24. The method of claim 1, wherein the entity relationship graph is persistently stored in a distributed file system.

25. The method of claim 1, wherein the plurality of entities include any of:
   a device;
   an application;
   a user; or
   data.

26. The method of claim 1, wherein the first entity and second entity are different types of entities.

27. A computer system comprising:
a processor; and
a storage device having instructions stored thereon, which when executed by the processor cause the computer system to:
   receive events associated with activity by a plurality of entities in an information technology (IT) environment, wherein each event of the plurality of events includes a portion of raw machine data that reflects activity in the IT environment and that is produced by a component of the IT environment, wherein each event is associated with a timestamp extracted from the raw machine data;
   access an entity relationship graph indicative of relationships and activity between a plurality of entities in the IT environment;
   wherein the entity relationship graph includes:
      a first node representative of a first entity of the plurality of entities;
      a second node representative of a second entity of the plurality of entities; and
      an edge connecting the first node to the second node, the edge including a directionality indicative of a direction of communication between the first entity and the second entity;
   update the entity relationship graph based on the events;

determine that the first entity and/or the second entity is operating in a particular logical location in a topology of the IT environment;

monitor the edge connecting the first node to the second node in response to determining that the first entity and/or the second entity is operating in the particular logical location in the topology of the IT environment;

detect a change in a characteristic of the edge; and detect an anomaly in response to detecting the change in the characteristic of the edge.

28. A non-transitory computer-readable medium containing instructions, execution of which in a computer system causes the computer system to:

receive events associated with activity by a plurality of entities in an information technology (IT) environment, wherein each event of the plurality of events includes a portion of raw machine data that reflects activity in the IT environment and that is produced by a component of the IT environment, wherein each event is associated with a timestamp extracted from the raw machine data;

access an entity relationship graph indicative of relationships and activity between a plurality of entities the IT environment;

wherein the entity relationship graph includes:
    a first node representative of a first entity of the plurality of entities;
    a second node representative of a second entity of the plurality of entities; and
    an edge connecting the first node to the second node, the edge including a directionality indicative of a direction of communication between the first entity and the second entity;

update the entity relationship graph based on the events;

determine that the first entity and/or the second entity is operating in a particular logical location in a topology of the IT environment;

monitor the edge connecting the first node to the second node in response to determining that the first entity and/or the second entity is operating in the particular logical location in the topology of the IT environment;

detect a change in a characteristic of the edge; and detect an anomaly in response to detecting the change in the characteristic of the edge.

\* \* \* \* \*